(12) United States Patent
Song et al.

(10) Patent No.: US 9,801,044 B2
(45) Date of Patent: Oct. 24, 2017

(54) APPARATUS AND METHOD FOR ACCESSING WIRELESS NETWORK

(71) Applicants: Seong-Wook Song, Seoul (KR); Dong-Hyun Kim, Seoul (KR); Jong-Han Lim, Seoul (KR)

(72) Inventors: Seong-Wook Song, Seoul (KR); Dong-Hyun Kim, Seoul (KR); Jong-Han Lim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/706,916

(22) Filed: May 7, 2015

(65) Prior Publication Data

US 2015/0334554 A1 Nov. 19, 2015

Related U.S. Application Data

(60) Provisional application No. 61/992,525, filed on May 13, 2014.

(30) Foreign Application Priority Data

Feb. 11, 2015 (KR) ........................ 10-2015-0021177

(51) Int. Cl.
*H04B 7/00* (2006.01)
*H04M 1/66* (2006.01)
(Continued)

(52) U.S. Cl.
CPC ........... *H04W 8/183* (2013.01); *H04W 4/005* (2013.01); *H04W 8/205* (2013.01); *H04W 12/06* (2013.01);
(Continued)

(58) Field of Classification Search
CPC ..... H04W 8/183; H04W 8/205; H04W 76/00; H04W 84/20; G06F 21/34
(Continued)

(56) References Cited

U.S. PATENT DOCUMENTS 8,478,816 B2 7/2013 Parks et al.
8,706,035 B2 4/2014 Yaqub et al.
(Continued)

FOREIGN PATENT DOCUMENTS

CN 101198136A A 6/2008
EP 1449395 A2 8/2004
(Continued)

OTHER PUBLICATIONS

European Search Report in Related European Application 15167459.5-1870 Dated Jul. 31, 2015.

*Primary Examiner* — Simon Nguyen
(74) *Attorney, Agent, or Firm* — Volentine & Whitt, PLLC

(57) ABSTRACT

A method of using subscriber identification information stored in mobile user equipment (UE) to connect to a communication service over a public wireless network in the UE, establishing a communication link between the UE and a device, generating network access information (NAI) associated with the communication service in the UE, and sending the NAI from the UE to the device via the communication link. The method further comprises connecting the communication service in the device using the NAI and terminating the connection of the communication service in the UE.

18 Claims, 37 Drawing Sheets

(51) Int. Cl.
*H04M 3/16* (2006.01)
*H04M 1/00* (2006.01)
*H04W 8/18* (2009.01)
*H04W 8/20* (2009.01)
*H04W 12/06* (2009.01)
*H04W 84/18* (2009.01)
*H04L 29/06* (2006.01)
*H04W 4/00* (2009.01)
*H04W 84/20* (2009.01)
*H04W 8/26* (2009.01)

(52) U.S. Cl.
CPC ......... *H04L 63/0853* (2013.01); *H04W 4/008* (2013.01); *H04W 8/26* (2013.01); *H04W 84/18* (2013.01); *H04W 84/20* (2013.01)

(58) Field of Classification Search
USPC ....... 455/41.1–41.3, 410–411, 558, 507, 517
See application file for complete search history.

(56) References Cited

U.S. PATENT DOCUMENTS

| | | | |
|---|---|---|---|
| 2010/0029200 A1* | 2/2010 | Varriale | G06F 21/34 455/41.1 |
| 2010/0107186 A1* | 4/2010 | Varriale | H04H 60/23 725/31 |
| 2011/0028126 A1 | 2/2011 | Lim et al. | |
| 2012/0238216 A1* | 9/2012 | Hallowell | H04W 84/18 455/41.3 |
| 2013/0132854 A1* | 5/2013 | Raleigh | G06F 3/0482 715/738 |
| 2013/0260674 A1* | 10/2013 | Shimada | H04W 76/02 455/39 |
| 2013/0337743 A1* | 12/2013 | Holtmanns | H04W 76/02 455/39 |
| 2014/0057558 A1* | 2/2014 | Cooper | H04W 12/06 455/41.1 |
| 2015/0065053 A1* | 3/2015 | Cho | H04W 4/008 455/41.2 |
| 2015/0181503 A1* | 6/2015 | Nasir | H04W 48/02 455/411 |
| 2015/0229639 A1* | 8/2015 | Abdulrahiman | H04L 63/0853 455/411 |
| 2015/0289124 A1* | 10/2015 | Palin | H04W 8/005 455/41.2 |

FOREIGN PATENT DOCUMENTS

| | | |
|---|---|---|
| EP | 2451132 A1 | 5/2012 |
| WO | WO0221867 A2 | 3/2002 |

\* cited by examiner

| | | INTERNATIONAL MOBILE SUBSCRIBER IDENTITY (IMSI) | ~221 |
| | | TEMPORARY MOBILE SUBSCRIBER IDENTITY (TMSI) | ~223 |
| | SUBSCRIBER IDENTIFICATION INFORMATION (SII) | INTEGRATED CIRCUIT CARD IDENTIFICATION (ICCID) | ~225 |
| NETWORK ACCESS INFORMATION (NAI) | | MASTER KEY (K) | ~227 |
| | | GLOBALLY UNIQUE TEMPORARY IDENTIFIER (GUTI) | ~229 |
| | NETWORK STATUS INFORMATION (NSI) | PWN CELL IDENTIFICATION INFORMATION | ~231 |
| | | RADIO RESOURCE CONTROL (RRC) STATUS INFORMATION | ~233 |
| | | SUBSCRIBER TRACKING AREA (TA) INFORMATION | ~235 |
| | | NON-ACCESS STRATUM (NAS) STATUS INFORMATION | ~237 |

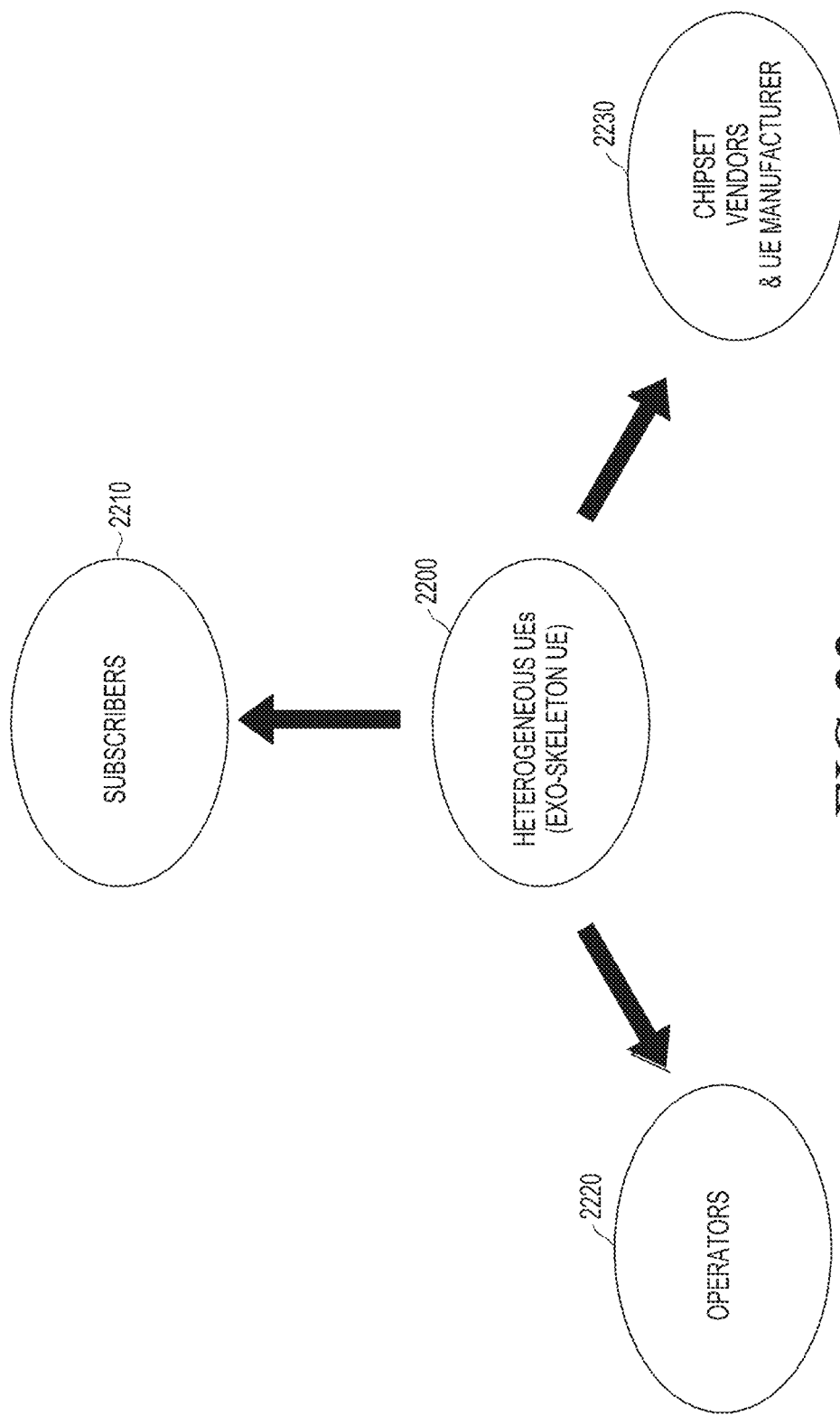

APPARATUS AND METHOD FOR ACCESSING WIRELESS NETWORK

CROSS-REFERENCE TO RELATED APPLICATIONS

This application claims priority under 35 U.S.C. §119 to U.S. Provisional Patent No. 61/992,525 filed on May 13, 2014, and Korean Patent Application No. 10-2015-0021177 filed on Feb. 11, 2015, the subject matters of which are hereby incorporated by reference.

BACKGROUND

Embodiments of the inventive concept relate generally to apparatuses and methods capable of accessing a wireless network. More particularly, certain embodiments of the inventive concept relate to semiconductor devices, Systems-on-Chip and user equipment (UE) capable of accessing a wireless network and transferring related net access information (NAI) to other devices. Certain other embodiments of the inventive concept relate to methods enabling (or facilitating) access by a device to a wireless network and transferring related NAI to other devices.

A wireless network is system of inter-operated components that enable (or support) one or more wireless communication service(s) between two or more devices. The request for, registration of, identification of, use of, and termination of a wireless communication service is a complicated process involving multiple wireless-capable devices, as well as wireless components (e.g., base station(s), servers, radio channel equipment, mobility management equipment, software resources, etc.) associated with a wireless network. Under certain circumstances, limited resources within a wireless network may restrict the number users and/or quality of service for users seeking access one to wireless communication service(s).

A number of public wireless networks (PWN), such as those established and maintained by mobile phone companies, mobile wireless broadband systems, and/or satellite systems, which are each capable of providing communication services based on cellular communication protocol(s) are examples of contemporary wireless networks. Each PWN restricts access to its offered communication services to authorized UE. Hence, authorized UE may be considered a subscriber terminal by the PWN, and a service provider that manages and operates the PWN may provide subscriber identification information (SII) to respective subscriber terminals. Thereafter, the SII may be used by the subscriber terminals to establish authorized access to the PWN.

The SII may be stored in a subscriber identification module (SIM) that is built in, or may be inserted/de-inserted (e.g., in the form of a so-called "SIM card") into a subscriber terminal. Data associated SII and related subscriber terminal information stored on the SIM may be protected using one or more data encryption methods. The subscriber terminal may use or access the communication services over the PWN using the SII stored in the SIM.

In electronic and communication industries, various attempts have been made to produce UE equipped with wired/wireless communication functions. One example is the so-called Internet of Things (IoT) or Internet of Everything (IoE). IoT or IoE refers to an environment where the things of everyday life are connected via a wired/wireless network in order to share information. Hence, the IoT or IoE approach may be used to connect devices over the network allowing them to share information across a variety of technical fields including smart home appliances, smart homes (e.g., remote metering, heating/cooling management, home solar systems, home security systems) healthcare, and smart cars.

Increasingly, a subscriber may desire to access the PWN using not just a single fixed UE, but a variety of UE, including mobile UE. Thus, in certain instances, the subscriber may be required to remove a SIM from a first UE that has access to the PWN and insert the SIM in a second UE so that the second UE may have access to the PWN. This process is labor intensive, there is no continuity in data use, and more than one UE cannot access the PWN at the same time using the same SII.

In some instances, the subscriber may purchase a SIM, however and in whatever form provided, for each UE. This incurs extra cost for each SIM purchased, there is a de-synchronization between different UE that may cause data/communication loss, and each UE may have a different wireless capability.

A subscriber may desire to access (e.g., upload data to and download data from) the PWN through a variety of UE at the same time without the need of purchasing a separate SIM for each UE. In other words, one subscriber may desire to freely access one or more PWN using one or more UE at the same time, using one set of SII. Accordingly, there is a general need for an apparatus and method to allow a subscriber to freely access a PWN using multiple UE.

SUMMARY

In one embodiment of the inventive concept, a method comprises using subscriber identification information (SII) stored in a master device to connect to a communication service over a public wireless network (PWN) in the master device, establishing a communication link between the master device and a slave device, generating network access information (NAI) associated with the communication service in the master device, and sending the NAI from the master device to the slave device via the communication link.

In another embodiment of the inventive concept, a method comprises connecting a communication service in a master device storing the access authorization credentials, generating network status information (NSI) in the master device associated with the connecting of the communication service, deriving NAI in the master device from the authorization credentials and the NSI, establishing a communication link between the master device and slave device, sending the NAI from the master device to the slave device via the communication link, connecting the communication service in the slave device using the NAI, and terminating the communication service in the master device.

In yet another embodiment of the inventive concept, a method comprises connecting a first communication service in a first master device storing first access authorization credentials, generating first network status information (1NSI) in the first master device associated with the connecting of the first communication service, deriving first networking accessing information (1NAI) from the first access authorization credentials and the 1NSI, establishing a first communication link between the first master device and slave device, sending the 1NAI from the first master device to the slave device via the first communication link and storing the 1NAI in the slave device, completing the same process with the second master device and 2NAI with the second communication link, connecting the first communication service in the slave device using the 1NAI, and terminating the first communication service in the first master device.

In yet another embodiment of the inventive concept, a method comprises using SII stored in a master device to connect to a communication service over a PWN in the master device, establishing a communication link between the master device and the slave device, sending NAI associated with the communication service from the master device to the slave device via the communication link, connecting the communication service in the slave device using the NAI, terminating the connection of the communication service in the master device, sending a release request from the master device to the slave device via the communication link requesting the slave device to release connection of the communication service, and in response to the release request, terminating the communication service in the slave device and re-connecting the communication service in the master device.

In yet another embodiment of the inventive concept, a mobile user equipment comprises a memory that stores software components, an application processor that controls operation of the user equipment, a connectivity unit that establishes a communication link between the user equipment and a device, and a communication processor that connects a communication service over a PWN.

These and other embodiments of the inventive concept can support a variety of user equipment in accessing a wireless network.

BRIEF DESCRIPTION OF THE DRAWINGS

Several embodiments of the inventive concept are illustrated by way of example.

FIG. 2 is a table listing examples of possible components of network access information.

FIG. 22 illustrates the effects expected by an embodiment of the present disclosure.

DETAILED DESCRIPTION

Figure 1:
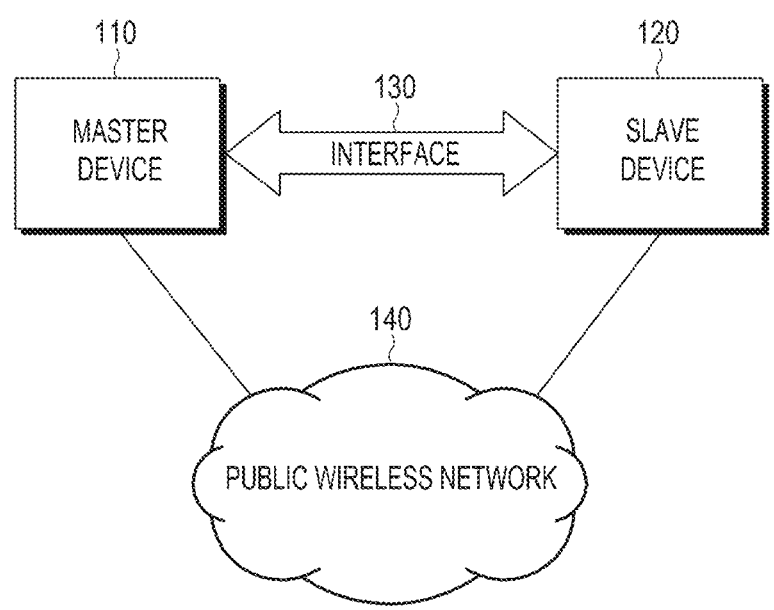
FIG. 1 is a block diagram generally illustrating a wireless communication environment according to an embodiment of the inventive concept.

Certain embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the concept of example embodiments to those of ordinary skill in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The described embodiments relate generally to supporting connection of user equipment (UE) to a wireless network. For example, in certain embodiments a master device may send network access information (NAI) to a slave device in order to connect a communication service in the slave device using the NAI.

UE according to various embodiments of the inventive concept may refer to a device that is assembled to include electronic components, elements and the like, making it possible to support communication services by predetermined communication resources. For example, UE may include components needed to establish a communication service with another UE or to acquire access to a public wireless network. Such components may be variously implemented in hardware, firmware and/or software.

In certain embodiments of the inventive concept, UE may be functionally and/or physically implemented as a smart phone, tablet Personal Computer (PC), mobile phone, video phone, e-book reader, desktop PC, laptop PC, netbook computer, workstation, server, Personal Digital Assistant (PDA), Portable Multimedia Player (PMP), MP3 player, mobile medical device, camera, wearable device (e.g., electronic eyeglasses, Head-Mounted-Device (HMD), electronic cloth, electronic bracelet, electronic necklace, electronic accessory (or appcessory), electronic tattoo, smart mirror, or smart watch).

In other embodiments of the inventive concept, UE may be implemented as part of a smart home appliance. Smart home appliance may include, for example, a television (TV), Digital Video Disk (DVD) player, Blu-ray player, audio device, refrigerator, air conditioner, thermostat, vacuum cleaner, oven, microwave oven, washer, air purifier, set-top box, home automation control panel, security control panel, TV box (e.g., Samsung HomeSync™, Apple TV™, or Google TV™), game consoles (e.g., Xbox™ or PlayStation™), electronic dictionary, electronic key, camcorder, or electronic picture frame.

In certain embodiments of the inventive concept, UE may be implemented as a medical device (e.g., portable medical measuring devices such as a blood glucose meter, heart rate meter, blood pressure meter, body temperature meter, Magnetic Resonance Angiography (MRA), Magnetic Resonance Imaging (MRI), Computed Tomography (CT), medical camcorder, ultrasonic device, etc. In certain embodiments of the inventive concept, UE may be implemented as a navigation device, Global Positioning System (GPS) receiver, Event Data Recorder (EDR), Flight Data Recorder (FDR), car infotainment device, marine electronic equipment (e.g., a marine navigation system, a gyro compass, and the like), avionics, security equipment, car head unit, industrial or domestic robot, Automatic Teller's Machine (ATM), Point of Sales (POS) devices, an IoT device (e.g., a light bulb, various sensors associated with an electricity or gas meter, sprinkler system, fire alarm, thermostat, street lamp, toaster, fitness equipment, hot water tank, heater, boiler, etc.), and the like.

In certain embodiments of the inventive concept, UE may be implemented as part of furniture or a building structure. UE according to various embodiments of the inventive concept may be any one or a combination of the above-described devices and systems.

Alternatively, UE according to certain embodiments of the inventive concept may be a flexible UE. Thus, it will be apparent to those of ordinary skill in the art that UE according to various embodiments of the present disclosure is not limited to the above-described devices, and may include new UE that may be provided with the development of technologies.

UE according to various embodiments will now be described with reference to accompanying drawings. The term 'user' as used herein may refer to the person who uses the UE, or the device (e.g., artificial intelligence UE) that uses the UE. The term 'subscriber' as used herein may refer to a user of communication services provided over a PWN where the user is uniquely assigned SII.

Figure (FIG.) 1 is a block diagram illustrating in one example a wireless communication environment according to various embodiments of the inventive concept.

Referring to FIG. 1, a master device 110 and a slave device 120 may be connected by an interface 130. The interface may be hardwired-based or wireless-based and may be a communication path between the master device 110 and the slave device 120. The communication path may form a communication link. The interface 130 is not limited to a particular communication scheme. For example, the interface 130 may be implemented based on at least one protocol for wired communication and/or wireless communication. The communication link may include one or more of a local area network (LAN), Wi-Fi, near field communication (NFC), radio frequency (RF), wired communication, cellular link, Bluetooth (BT), global positioning system (GPS), cable, infrared link, Internet, long term evolution (LTE), and WiMax.

The master device 110 and the slave device 120 may connect to a communication service over a public wireless network (PWN) 140. The master device 110 may be a portable UE. The communication service may be a cellular voice/data service. Connecting of the cellular voice/data service in the portable UE may include registering the portable UE with a mobility management entity (MME) of the PWN 140. The PWN 140 may provide wireless communication services based on one or more of LTE, LTE-advanced (LTE-A), code division multiple access (CDMA), wideband CDMA (WCDMA), universal mobile telecommunications system (UMTS), wireless broadband (WiBro), or global system for mobile communication (GSM).

The master device 110 is a subscriber terminal authorized to access the PWN 140, whereas the slave device 120 is subscriber terminal that is not inherently authorized to access the PWN 140. For example, in certain embodiments of the inventive concept, since the slave device 120 lacks the NAI required to access the PWN 140—because it does not have a connected subscriber identification module (SIM) providing the necessary subscriber identification information (SII)—it may not obtain access to the PWN 140 until a SIM is connected.

However, in certain embodiments of the inventive concept, the master device 110 is capable of both (1) using internally stored SII (e.g., SII stored in a connected SIM) to generate NAI sufficient to connect a communication service in the master device 110 over the PWN 140, and (2) transferring the generated NAI associated with the communication service to the slave device 120 via the communication link. The slave device 120 may thereafter use the NAI to connect to the communication service in the slave device 120 over the PWN 140. Once the communication service is connected in the slave device 120, the communication service in the master device 110 is terminated. One possible relationship between SII and corresponding NAI is shown in FIG. 2.

FIG. 2 is a table listing possible components of network access information (NAI) in the context of certain embodiments of the inventive concept.

Referring to FIG. 2, the NAI 210 may include one or more components of SII 220 and one or more components of network status information (NSI) 230. Hence a descriptive reference to NAI 210 hereafter may refer to one or more components of SII 220 and/or one or more components of NSI 230. In this regard, the SII 220 is stored in SIM even when the UE is powered off. The PWN 140 requests the SII 220 to verify whether the user is a subscriber or not. All information used to access the PWN 140 and stored in the SIM is SII 220. The SII 220 may comprise partial SIM information. Further, as previously noted, the SIM may be stored on a SIM card that is configured to be physically inserted into and thereafter removed from the master device 110. A slave device 120 may not have a SIM card. The information recorded in a SIM may be protected by encryption or the like. The master device 110 may read and use the SII 220 stored on a SIM connected to the master device 110 in order to connect the communication service over the PWN 140. The SII 220 may comprise a plurality of SII components and the NAI 210 may comprise at least one of the plurality of SII components or information derived from at least one of the plurality of SII components The SII 220 may include one or more of international mobile subscriber identity (IMSI) 221, temporary mobile subscriber identity (TMSI) 223, integrated circuit card identification (ICCID) 225, master key (K) 227, and globally unique temporary identifier (GUTI) 229. The SIM may also store local area identity (LAI), operator-specific emergency number, short message service center (SMSC) number, service provider name (SPN), service dialing numbers (SDN), advice-of-charge parameters, and value added service (VAS) applications.

The IMSI 221 is an example of SII 220 and may be stored in the SIM when the SIM is purchased. The IMSI 221 is used to identify the subscriber of the PWN 140. The same value for the IMSI 221 may be stored in the SII 220 and on the PWN 140. The IMSI is rarely used except for certain instances (e.g., when the phone is switched on).

The TMSI 223 is used instead of IMSI 221 for security reasons. The TMSI 223 is provided to the master device 110 from the PWN 140 upon connecting the communication service in the master device 110. The TMSI 223 is changed by the PWN 140 from time to time.

The ICCID 225 is an example of unique identification information and is used to identify the SIM. The K 227 is a master key for authentication and the same value may be stored in the SIM and in the PWN 140. The GUTI 229 is an example of temporary identification information. The GUTI 229 includes the TMSI 223.

The communication service connected in the master device 110 may generate corresponding NSI 230. The NAI 210 may comprise the NSI 230. The NSI 230 may be stored in the master device 110 before terminating the communication service in the master device 110. The NSI 230 may be stored in the slave device 120 when the NAI 210 is sent from the master device 110 to the slave device 120. After terminating the connection of the communication service in the master device 110, updated NSI may be generated and stored in the slave device 120 in accordance with the connection of the communication service in the slave device 120. The updated NSI may be sent to the master device 110 via the communication link 130 and the NSI 230 stored in the master device 110 may be updated using the updated NSI from the slave device 120. The NSI 230 may include one or more of PWN cell identification information 231, radio resource control (RRC) status information 233, subscriber tracking area (TA) information 235, and non-access stratum (NAS) status information 237.

The PWN cell identification information 231 may be used to indicate to which cell the UE currently belongs. When the user moves the UE to an adjacent PWN cell, the PWN cell identification information 231 will change.

The RRC status information 233 may be used by the slave device 120 to make a seamless connection to the PWN 140 and may be used to indicate the current communication status of the master device 110 or slave device 120. When a UE is turned ON but is not performing any communication behavior (e.g., downloading data), the RRC state of the UE may be referred to as RRC Idle Mode (e.g., 'RRC_idle') and when the UE is used for actual communication, the RRC state may be referred to as RRC Connected Mode (e.g., 'RRC_connected').

The subscriber TA information 235 may be used to indicate where the subscriber is currently located.

The NAS information 237 may be used by the slave device 120 for authentication for access over the PWN 140 and may be used for encryption of connection between the PWN 140 and the master device 110 or slave device 120. NAS information 237 is an example of access status information and is the information for NAS protocol which is in charge of mobility management, identification, authentication, etc.

The NSI 230 may include information about the status of the communication service established by the master device 110 over the PWN 140, and information defining the status of the access to the PWN 140 by the master device 110. The slave device 120 may require the NSI 230 for the slave device 120 to take over all or part of the communication service connected to the master device 110.

Returning to FIG. 1, the slave device may not have the NAI 210 needed to access the PWN 140, even though the slave device 120 has a communication processor capable of accessing a communication service over the PWN 140. The slave device 120 may access the communication service over the PWN 140 if the slave device has the NAI 210.

For example, if the slave device 120 can obtain NAI 210 provided from the master device 110, the slave device 120 may access the communication service over the PWN 140 using the provided NAI 210.

The slave device 120 may form a communication link to the master device 110 through interface 130 and obtain NAI 210 provided from the master device 110 using the communication link. The NAI 210 may be the information that the slave device 120 requires to access the communication service over the PWN 140. The slave device 120 may access the PWN 140 using the NAI 210 provided from the master device 110.

If access by multiple UE is requested using the information associated with the same subscriber, the PWN 140 will authorize only one UE to obtain access via a predetermined verification procedure. For example, if the master device 110 and slave device 120 attempt to access the PWN 140 at the same time, the PWN 140 will usually award access priority to the master device 110, and if the slave device 120 is already connected to the PWN 140 when the master device requests access, the PWN 140 may release PWN 140 access by the slave device 120.

Figure 3:
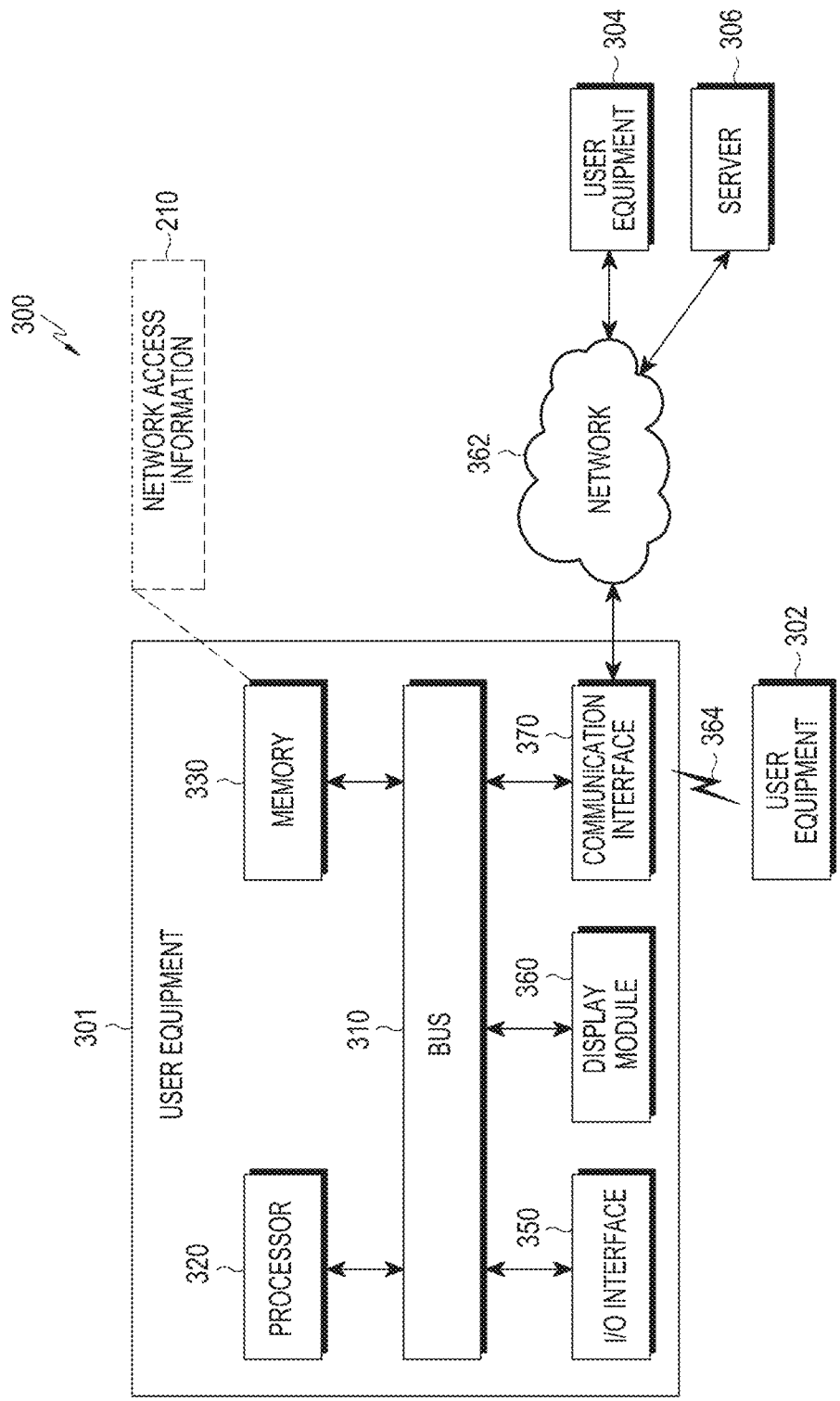
FIG. 3 is a block diagram illustrating a network environment according to an embodiment of the inventive concept.

FIG. 3 is a block diagram further illustrating in one example user equipment that may be used in a network environment according to certain embodiments of the inventive concept.

Referring to FIG. 3, a UE 301 in a network environment 300 in various embodiments will be described. The UE 301 may include a bus 310, a processor 320, a memory 330, an input/output (I/O) interface 350, a display module 360, and a communication interface 370. In some embodiments, the UE 301 may exclude at least one of the above components, or may further include at least one other component. In some embodiments at least one of the above components may be divided into more than one component.

For example, the communication interface 370 may include an interface 130 comprising a communication link to facilitate communication between the master device 110 and the slave device 120 and the communication interface may also comprise a communication processor to facilitate connection from a UE to the PWN 140.

The bus 310 may include, for example, a circuit that connects the components 310 to 370 with each other, and transmits communication signals (e.g., control messages and/or data) between the components 310 to 370.

The processor 320 may include one or more of a central processing unit (CPU), an application processor (AP), and a communication processor (CP). The processor 320 may, for example, execute operation or data processing concerning control and/or communication of at least one other component of the UE 301.

Here, the processor 320 may maintain overall control as required to provide a communication service over a PWN 140. The processor 320 may perform differentiated control depending on whether the UE 301 has access rights to the PWN 140. If the UE 301 has access rights to the PWN 140, the processor 320 will perform control associated with a master device (e.g., the master device 110). On the contrary, if the UE 301 does not have access rights to the PWN 140, the processor 320 will perform control associated with a slave device (e.g., the slave device 120).

Assuming that the UE 301 has access rights to the PWN 140 (e.g., the UE 301 is a master device), the processor 320 may access the PWN 140 using the SII 220 as read by the processor 320 in order to control access to the wireless communication service. In addition, the processor 320 may form a communication link to another UE (e.g., a UE 302 or 304) via the communication interface 370, and provide NAI 210 to another UE (e.g., the UE 302 or 304) via the formed communication link.

Assuming that the UE 301 does not have access rights to the PWN 140 (i.e., the UE is a slave device), the processor 320 may form a communication link to another UE (e.g., the UE 302 or 304) via the communication interface 370, and receive NAI 210 provided from another UE (e.g., the UE 302 or 304) via the formed communication link. In this case, the processor 320 may access the PWN 140 using the NAI 210 provided from another UE (e.g., the UE 302 or 304) in order to establish and maintain a wireless communication service.

The memory 330 may include volatile memory and/or non-volatile memory (NVM). The memory may further include in a functional sense a (e.g., the SIM card connected to a master device 110). The memory 330 may be used to store (e.g.,) various command(s) and/or data related to at least one other component of the UE 301. In one embodiment, the memory 330 may store NAI 210. The NAI 210 may be stored in the memory 330 to be used to access the PWN 140.

The I/O interface 350 may, for example, serve as an interface capable of sending command(s) and/or data received from the user or another external UE to other component(s) of the UE 301. The I/O interface 350 may output the command or data received from other component(s) of the UE 301 to the user or another external UE.

The display module 360 may include, for example, a Liquid Crystal Display (LCD) display, Light Emitting Diode (LED) display, Organic LED (OLED) display, Micro Electro-Mechanical Systems (MEMS) display, or electronic paper display. The display module 360 may, for example, display a variety of content (e.g., texts, images, videos, icons, symbols, or the like) for the user. The display module 360 may include a touch screen, and may receive a touch input, a gesture input, a proximity input, or a hovering input, which is made by, for example, and electronic pen or a part of the user's body.

The communication interface 370 may establish communication between, for example, the UE 301 and the external UE (e.g., the first external UE 302, the second external UE 304, or a server 306). For example, the communication interface 370 may be connected to a network 362 through wired or wireless communication, to communicate with the external UE (e.g., the second external UE 304 or the server 306). The communication interface 370 may communicate with the external UE (e.g., the first external UE 302) through wireless or wired communication 364.

The communication interface 370 may support a wireless communication service by being connected to the network 362 (e.g., the PWN 140). The communication interface may access the network using the SII 220 or the NAI 210.

The communication interface 370 may set up a communication link to the external UE (e.g., the first external UE 302, the second external UE 304, or the server 306), and perform communication to obtain the NAI 210 from the external UE (e.g., the first external UE 302, the second external UE 304, or the server 306) via the set communication link.

The wireless or wired communication 364 may include at least one of, for example, LTE, LTE-A, CDMA, WCDMA, UMTS, WiBro and GSM, as a cellular communication protocol. The wireless or wired communication 364 may be wired and may include at least one of, for example, Universal Serial Bus (USB), High Definition Multimedia Interface (HDMI), Recommended Standard 232 (RS-232) and Plain Old Telephone Service (POTS). The network 362 may include at least one of a telecommunications network which is, for example, a computer network (e.g., Local Area Network (LAN) or Wideband Local Area Network (WLAN)), the Internet, and a telephone network.

Each of the first external UE 302 and second external UE 304 may be equal to the UE 301 in type or different from the UE 301 in type (e.g., receiver performance). In one embodiment, the server 306 may be a group of one or more servers. In various embodiments, all or some of the operations executed in the UE 301 may be executed in other UE (e.g., UE 302 and 304, or the server 306). In one embodiment, if the UE 301 should perform any function or service automatically or by request, the UE 301 may additionally request another UE (e.g., UE 302 and 304, or the server 306) to perform one or more functions related thereto instead of the UE 301 executing the one or more functions or services on its own. Another UE (e.g., UE 302 and 304, or the server 306) may execute the requested one or more functions and/or services, and provide the results to the UE 301. The UE 301 may provide the requested one or more functions and/or services by using the received results intact or by additionally processing the received results. To this end, for example, cloud computing, distributed computing, or client-server computing may be used.

Figure 4:
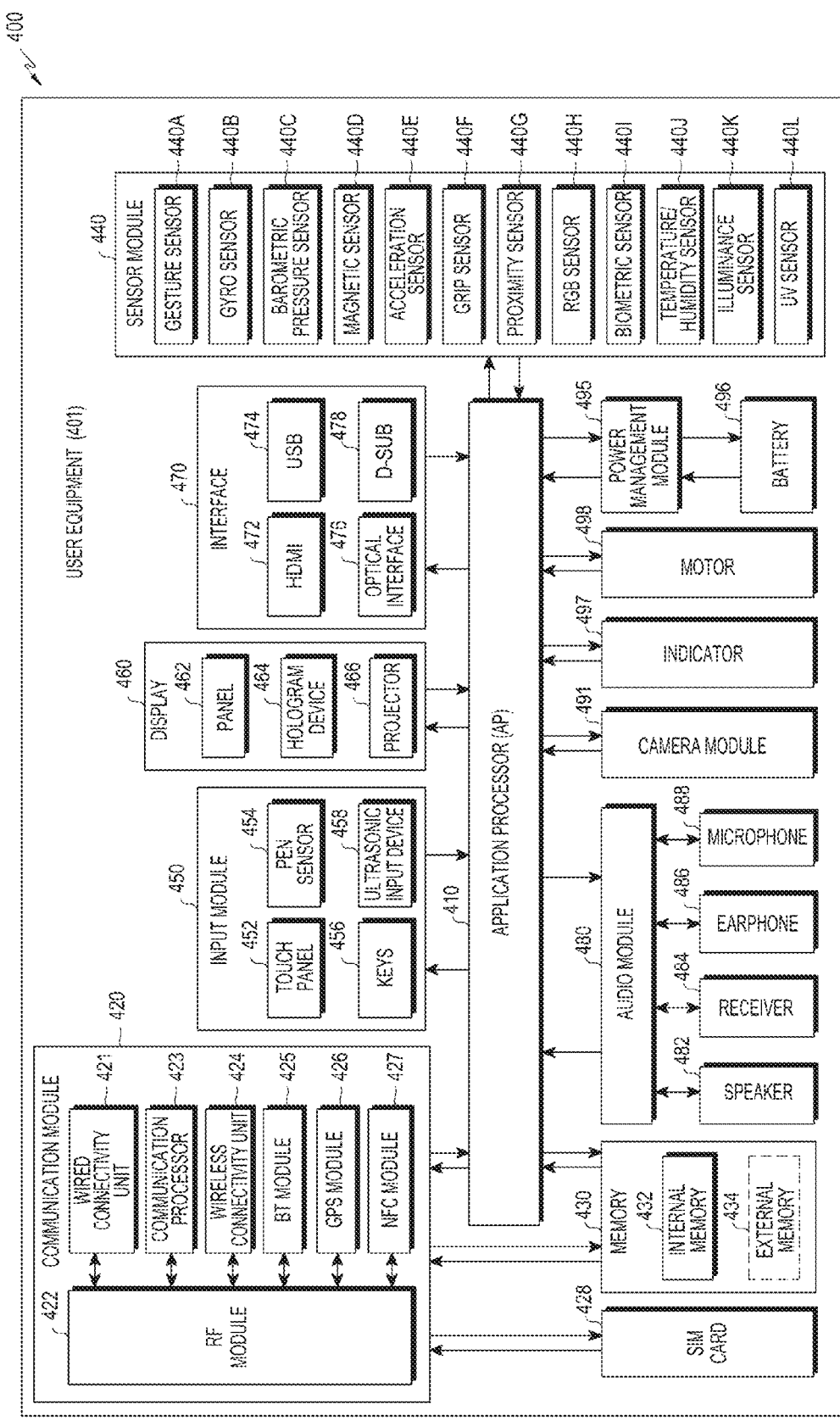
FIG. 4 is a block diagram further illustrating in one example user equipment according to an embodiment of the inventive concept.

FIG. 4 is a block diagram further illustrating in another example user equipment that may be used in a network environment according to certain embodiments of the inventive concept.

Referring to FIG. 4, UE 401 may include, for example, all or part of the UE 301 illustrated in FIG. 3. The UE may include one or more AP 410, communication module 420, SIM card 428, memory 430, sensor module 440, input device 450, display 460, interface 470, audio module 480, camera module 491, power management module 495, battery 496, indicator 497, motor 498, and the like.

The AP 410 may control multiple hardware or software components connected to the AP 410 by driving, for example, the operating system (OS) or application programs, and may perform various data processing and calculations. The AP 410 may be implemented as, for example, a system on chip (SoC). In one embodiment, the AP 410 may further include a graphic processing unit (GPU) and/or an image signal processor (ISP). The AP 410 may include at least some of the components (e.g., communication processor 423) illustrated in FIG. 4. The AP 410 may load, in a volatile memory, the command or data received from at least one of other components (e.g., a non-volatile memory (NVM)), process the loaded data, and store a variety of data in the NVM. The application processor 410 may control operation of the UE 401 by selectively executing the operating system components, driver components, and application components. The application processor 430 may send the NAI 210.

The communication module 420 may be equal or similar in structure to the communication interface 370 in FIG. 3. The communication module 420 may include, for example, a wired connectivity unit 421, a communication processor 423, a wireless connectivity unit 424, a BT module 425, a GPS module 426, an NFC module 427, and a Radio Frequency (RF) module 422.

The communication module 420 may connect a communication service over a PWN 140 using the SII 220, execute the mobile state transfer layer to generate NAI 210, and store the NAI 210 to the memory 430.

The communication processor 423 may provide, for example, voice call services, video call services, text services, Internet service, or the like over the communication network. In one embodiment, the communication processor 423 may perform an identification and authentication operation of the UE 401 in the communication network using the SII 220 and/or the NAI 210 recorded in SIM (e.g., the SIM card 428). The NAI 210 may be provided from another UE (e.g., UE 302 and 304) and recorded in an allocated area in the memory 330.

The communication processor 423 may perform at least some of the functions that the AP 410 can provide.

Each of the wireless connectivity unit 424, the BT module 425, the GPS module 426, and the NFC module 427 may include a processor for processing the data that is transmitted/received through, for example, the module itself. In one embodiment, any one of the wireless connectivity unit 424, the BT module 425, and the NFC module 427 may be used for communication with another UE (e.g., UE 302 and 304). Any one of the wireless connectivity unit 424, the BT module 425, and the NFC module 427 may obtain NAI 210 to be used during an access to the PWN 140 by communication with another UE (e.g., UE 302 and 304).

In some cases, at least some (e.g., at least two) of the communication processor 423, the wireless connectivity unit 424, the BT module 425, the GPS module 426, and the NFC module 427 may be incorporated into the integrated chip (IC) or IC package.

The RF module 422 may, for example transmit/receive communication signals (e.g., RF signals). The RF module 422 may include, for example, a transceiver, a Power Amp Module (PAM), a frequency filter, a Low Noise Amplifier (LNA), an antenna, or the like. In another embodiment, at least one of the communication processor 423, the wireless connectivity unit 424, the BT module 425, the GPS module 426, and the NFC module 427 may transmit/receive RF signals through a separate RF module.

The SIM card 428 may include, for example, a card equipped with a SIM and/or an embedded SIM, which may include unique identification information (e.g., ICCID 225) or information to identify the subscriber (e.g., IMSI 221). The SIM card 428 may comprise part of the memory 430.

The memory 430 may include, for example, an internal memory 432 or an external memory 434. The internal memory 432 may include at least one of, for example, a volatile memory (e.g., Dynamic RAM (DRAM), Static RAM (SRAM), Synchronous Dynamic RAM (SDRAM), etc.), a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory (e.g., NAND flash or NOR flash), etc.), a hard drive, and a Solid State Drive (SSD).

The external memory 434 may include further include a flash drive (e.g., Compact Flash (CF), Secure Digital (SD), Micro Secure Digital (Micro-SD), Mini Secure Digital (Mini-SD), Extreme Digital (xD), etc.), or a memory stick. The external memory 434 may be functionally and/or physically connected to the UE 401 through a variety of interfaces.

In one embodiment, the internal memory 432 or the external memory 434 included in the memory 430 may store NAI 210 obtained from another UE (e.g., UE 302 and 304). For example, the NAI 210 may include NSI 230, entire or partial SIM information (e.g., SII 220), and the like. The NAI 210 may include RRC status information 233, NAS status information 237, and the like. The RRC status information 233 is to be used by another UE (e.g., UE 302 and 304) to make a seamless connection to the PWN 140. The NAS information 237 is to be used by another UE (e.g., UE 302 and 304), for authentication for its access to the PWN 140. The partial SIM information may include an ICCID 225, an IMSI 221, a GUTI 229, a TMSI 223, and the like.

The memory 430 may store software components including operating system components, driver components, application components, and protocol stack components including a mobile state transfer layer.

The sensor module 440 may, for example, measure physical quantities or detect an operating state of the UE 401, and convert the measured or detected information into an electrical signal. The sensor module 440 may include at least one of, for example, a gesture sensor 440A, a gyro sensor 440B, a barometric pressure sensor 440C, a magnetic sensor 440D, an acceleration sensor 440E, a grip sensor 440F, a proximity sensor 440G, a color sensor (e.g., Red/Green/Blue (RGB) sensor) 440H, a biometric sensor 440I, a temperature/humidity sensor 440J, an illuminance sensor 440K, and an Ultra Violet (UV) sensor 440L. Additionally or alternatively, the sensor module 440 may include, for example, one or more of an electronic nose (E-nose) sensor, an electromyography (EMG) sensor, electroencephalogram (EEG) sensor, electrocardiogram (ECG) sensor, an Infra Red (IR) sensor, an iris sensor, and a fingerprint sensor.

The sensor module 440 may further include a control circuit for controlling at least one sensor belonging thereto. In some embodiments, the UE 401 may further include a processor that is configured to control the sensor module 440, as a part of the AP 410 or separately, so the UE 401 may control the sensor module 440 while the AP 410 is in a sleep state.

The input device 450 may include, for example, a touch panel 452, a (digital) pen sensor 454, a key 456, or an ultrasonic input device 458. The touch panel 452 may recognize a touch input in at least one of, for example, a capacitive way, a resistive way, an infrared way and an ultrasonic way. The touch panel 452 may further include a control circuit. The touch panel 452 may further include a tactile layer, to provide tactile feedbacks to the user.

The (digital) pen sensor 454 may be, for example, a part of a touch panel or may include a separate recognition sheet. The key 456 may include, for example, a physical button, an optical key, or a keypad. The ultrasonic input device 458 may check data by detecting sound waves with a microphone (MIC) 488 in the UE 401, using an input tool that generates ultrasonic signals.

The display 460 (e.g., the display module 360) may include a panel 462, a hologram device 464, or a projector 466. The panel 462 may be equal or similar in structure to the display module 360 in FIG. 3. The panel 462 may be implemented in, for example, a flexible way, a transparent way, or a wearable way. The panel 462, together with the touch panel 452, may be configured as one module. The hologram device 464 may display stereoscopic images in the air using the interference of light. The projector 466 may display images by projecting the light onto a screen. The screen may be disposed on an inner or outer surface of the UE 401. In one embodiment, the display 460 may further include a control circuit for controlling one or more of the panel 462, the hologram device 464 or the projector 466.

The interface 470 may include, for example, an HDMI 472, a USB 474, an optical interface 476, or a D-subminiature (D-sub) 478. The interface 470 may be, for example, incorporated into the communication interface 370 illustrated in FIG. 3. Additionally or alternatively, the interface 470 may include, for example, a Mobile High-definition Link (MHL) interface, a Secure Digital (SD) card/Multi-Media Card (MMC) interface, or an Infrared Data Association (IrDA) interface.

The audio module 480 may convert, for example, sounds and electrical signals bi-directionally. At least some of the components of the audio module 480 may be incorporated into, for example, the I/O interface 350 illustrated in FIG. 3. The audio module 480 may process the sound information that is received or output through, for example, a speaker (SPK) 482, a receiver 484, an earphone 486, or the microphone 488.

The camera module 491, which is, for example, a device capable of shooting or capturing still images and videos, may include one or more image sensors (e.g., a front sensor, a rear sensor or the like), a lens, an ISP, or a flash (e.g., LED or xenon lamp) in one embodiment.

The power management module 495 may, for example, manage the power of the UE 401. In one embodiment, the power management module 495 may include a power management integrated circuit (PMIC), a charger integrated circuit (IC), or a battery or fuel gauge. The PMIC may have a wired charging scheme and a wireless charging scheme. The wireless charging scheme may include, for example, a magnetic resonance scheme, a magnetic induction scheme, an electromagnetic wave scheme, or the like, and the power management module 495 may further include an additional circuit for wireless charging (e.g., a loop coil, a resonance circuit, a rectifier, or the like). The battery gauge may measure, for example, the remaining capacity, the charging voltage and current, or the temperature of the battery 496. The battery 496 may include, for example, a rechargeable battery and/or a solar battery.

The indicator 497 may indicate specific states (e.g., a boot state, message state, charging state, or the like) of the UE 401 or a part (e.g., the AP 410) thereof. The motor 498 may convert an electrical signal into mechanical vibrations, and may generate vibration or haptic effects. Although not shown, the UE 401 may include a processing unit (e.g., GPU) for support of a mobile TV. The processing unit for support of a mobile TV may process the media data that is based on, for example, digital multimedia broadcasting (DMB), digital video broadcasting (DVB), media flow, or the like.

Each of the above-described components of the UE 401 according to various embodiments of the present disclosure may be configured as one or more components, and the name of the component may vary depending on the type of the UE. In various embodiments, the UE may be configured to include at least one of the above-described components, and the UE may exclude some of the components, or may further include additional other components. Some of the components of the UE according to various embodiments of the present disclosure may be configured as one entity by being combined, thereby making it possible to perform in the same way the functions of the components, which were performed before the components were combined.

Figure 5:
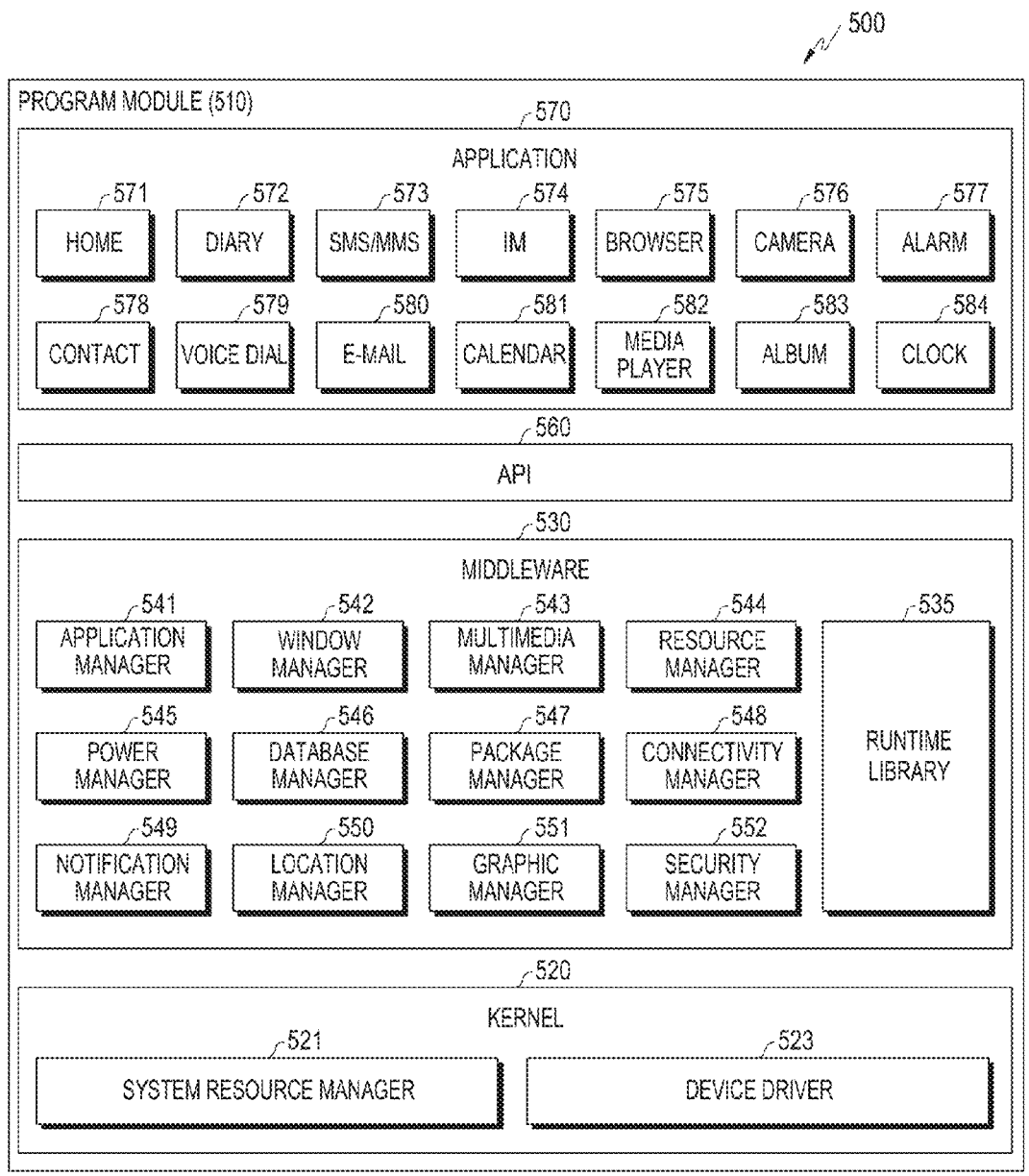
FIG. 5 is a block diagram further illustrating in one example a program module according to certain embodiments of the inventive concept.

FIG. 5 is a block diagram further illustrating in one example a program module that may be used in certain embodiments of the inventive concept.

Referring to FIG. 5, a program module 510 may include an operating system (OS) for controlling resources related to the UE (e.g., the UE 401) and/or various applications running in the OS. The OS may include, for example, Android™, iOS™, Windows™ Symbian™, Tizen™, Bada™, or the like.

The program module 510 may include a kernel 520, middleware 530, API 560, and/or application 570. At least a part of the program module 510 may be preloaded in the UE, or downloaded from a server (e.g., the server 306). One or more of the kernel 520, middleware 530, and API 560 may be functionally "called" by the OS.

The kernel 520 may include, for example, a system resource manager 521 or device driver 523. The system resource manager 521 may be used to perform control, allocation or recovery for system resources. In one embodiment, the system resource manager 521 may include a process manager, a memory manager, a file system manager, or the like. The device driver 523 may include, for example, a display driver, a camera driver, a Bluetooth driver, a shared memory driver, a USB driver, a keypad driver, a Wi-Fi driver, an audio driver, or an inter-process communication (IPC) driver.

The middleware 530 may, for example, be used as an intermediary so that the API 560 or application program 570 may communicate with the kernel 520 to exchange data. The middleware 530 may provide, for example, the function that the application 570 requires in common, or may provide various functions to the application 570 through the API 560 so that the application 570 may efficiently use the limited system resources in the UE. In one embodiment, the middleware 530 may include at least one of a runtime library 535, an application manager 541, a window manager 542, a multimedia manager 543, a resource manager 544, a power manager 545, a database manager 546, a package manager 547, a connectivity manager 548, a notification manager 549, a location manager 550, a graphic manager 551, and a security manager 552.

The runtime library 535 may include, for example, a library module that a complier uses to add a new function through a programming language while the application 570 is executed. The runtime library 535 may perform I/O management, memory management, or functions for arithmetic functions.

The application manager 541 may manage, for example, a life cycle of at least one of the applications 570. The window manager 542 may manage GUI resources used on the screen. The multimedia manager 543 may determine the format required for playback of various media files, and perform encoding or decoding of a media file using a codec for the format. The resource manager 544 may manage a source code for at least one of the applications 570, and resources for a memory or storage space.

The power manager 545 may manage the battery or power by operating together with, for example, the basic input/output system (BIOS), and provide power information required for an operation of the UE. The database manager 546 may create, search or change the database to be used by at least one of the applications 570. The package manager 547 may manage installation or update of the application that is distributed in the form of a package file.

The connectivity manager 548 may manage wireless connectivity of, for example, Wi-Fi or Bluetooth. The notification manager 549 may be used to display or notify an event such as message arrival, appointment and proximity alert, in a manner that does not interfere with the user. The location manager 550 may be used to manage location information of the UE. The graphic manager 551 may be used to manage the graphic effects to be provided to the user, or a user interface associated therewith. The security manager 552 may be used to provide various security features required for the system security or user authentication. In one embodiment, if the UE (e.g., the UE 301) includes a telephony function, the middleware 530 may further include a telephony manager for managing voice or video call features of the UE.

The middleware 530 may include a middleware module that forms a combination of various functions of the above components. The middleware 530 may provide a module that is specific to the type of the OS, to provide the differentiated function. The middleware 530 may dynamically remove some of the existing components, or add new components.

The API 560, which is a set of, for example, API programming functions, may be provided in different configurations depending on the OS. For example, the API 560 may provide one API set for each platform in Android or iOS, and provide two or more API sets for each platform in Tizen.

The application 570 may include one or more applications capable of providing functions such as, for example, home 571, dialer 572, Short Message Service (SMS)/Multimedia Messaging Service (MMS) 573, Instant Message (IM) 574, browser 575, camera 576, alarm 577, contact 578, voice dial 579, e-mail 580, calendar 581, media player 582, album 583, clock 584, healthcare (e.g., measuring of amount of exercise, blood glucose, etc.), and environmental information (e.g., providing of barometric pressure, moisture, or temperature information).

In one embodiment, the application 570 may include an application (hereinafter, referred to as an 'information exchange application' for convenience of description) supporting information exchange between the UE (e.g., the UE 301) and the external UE (e.g., UE 302 and 304). The information exchange application may include, for example, a notification relay application for relaying specific information to the external UE, or a device management application for managing the external UE, or may include NAI 210 for an access to the PWN 140.

For example, the notification relay application may include a function of sending notification information generated by other applications (e.g., the SMS/MMS application, E-mail application, healthcare application, environmental information application, or the like) in the UE to the external UE (e.g., UE 302 and 304). The notification relay application may, for example, receive notification information from the external UE, and provide the received notification information to the user. The device management application may, for example, manage the functions (e.g., the enablement/dis-enablement of the external UE itself or some components thereof, or the adjustment of the brightness or resolution of the display for at least a part of the external UE (e.g., the UE 304) communicating with the UE, or may manage (e.g., install, delete or update) the applications operating in the external UE or the services (e.g., a call service or a message service) provided by the external UE.

In one embodiment, the applications 570 may include applications (e.g., healthcare applications) that are specified depending on the properties (e.g., properties of UE, and the type of the UE is a mobile medical device) of the external UE (e.g., UE 302 and 304). In one embodiment, the applications 570 may include an application received from the external UE (e.g., server 306 or UE 302 and 304). In one embodiment, the applications 570 may include a preloaded application, or a third party application that can be downloaded from the server. The names of the components of the program module 510 according to the illustrated embodiment may vary depending on the type of the OS.

In various embodiments, at least a part of the program module 510 may be implemented by software, firmware and/or hardware. At least a part of the program module 510 may be implemented (or executed by), for example, a processor (e.g., the AP 410). At least a part of the program module 510 may include, for example, a module, a program, a routine, a set of instructions, or a process for performing one or more functions.

The term 'module' as used in herein may refer to a unit that includes any one or a combination of hardware, software and firmware. The term 'module' may be interchangeably used with a term such as, for example, 'unit', 'logic', 'logical block', 'component' or 'circuit'. The 'module' may be the minimum unit of an integrated component, or a part thereof. The 'module' may be the minimum unit of performing one or more functions, or a part thereof. The 'module' may be implemented mechanically or electronically. For example, the 'module' may include at least one of an Application-Specific Integrated Circuit (ASIC) chip, Field-Programmable Gate Arrays (FPGAs), and a programmable-logic device, each of which performs any operations that are known or to be developed in the future.

At least a part of the device (e.g., modules or functions thereof) or method (e.g., operations) according to various embodiments of the present disclosure may be implemented by, for example, instructions that are stored in computer-readable storage media in the form of a programming module. If an instruction is executed by one or more processors (e.g., the processor 320), the one or more processors may perform the function corresponding to the instruction. The computer-readable storage media may be, for example, the memory 430.

The computer-readable storage media may include magnetic media (e.g., hard disk, floppy disk, magnetic tape, etc.), optical media (e.g., Compact Disc Read Only Memory (CD-ROM), Digital Versatile Disc (DVD), etc.), magneto-optical media (e.g., floptical disk, etc.), and a hardware device (e.g., Read Only Memory (ROM), Random Access Memory (RAM), flash memory, etc.). The program instruction may include not only the machine code created by the compiler, but also a high-level language code that can be executed by the computer using an interpreter or the like. The hardware device may be configured to operate as one or more software modules to perform the operations in various embodiments of the present disclosure, and vice versa.

A module or program module according to various embodiments may include at least one of the above-described components, and the module or program module may exclude some of the components, or may include additional other components. The module or program module according to various embodiments, or the operations performed by other components may be executed in sequence, in parallel, repeatedly and/or heuristically. Some operations may be executed in a different order, or may be omitted, or other operations may be added.

Figure 6:
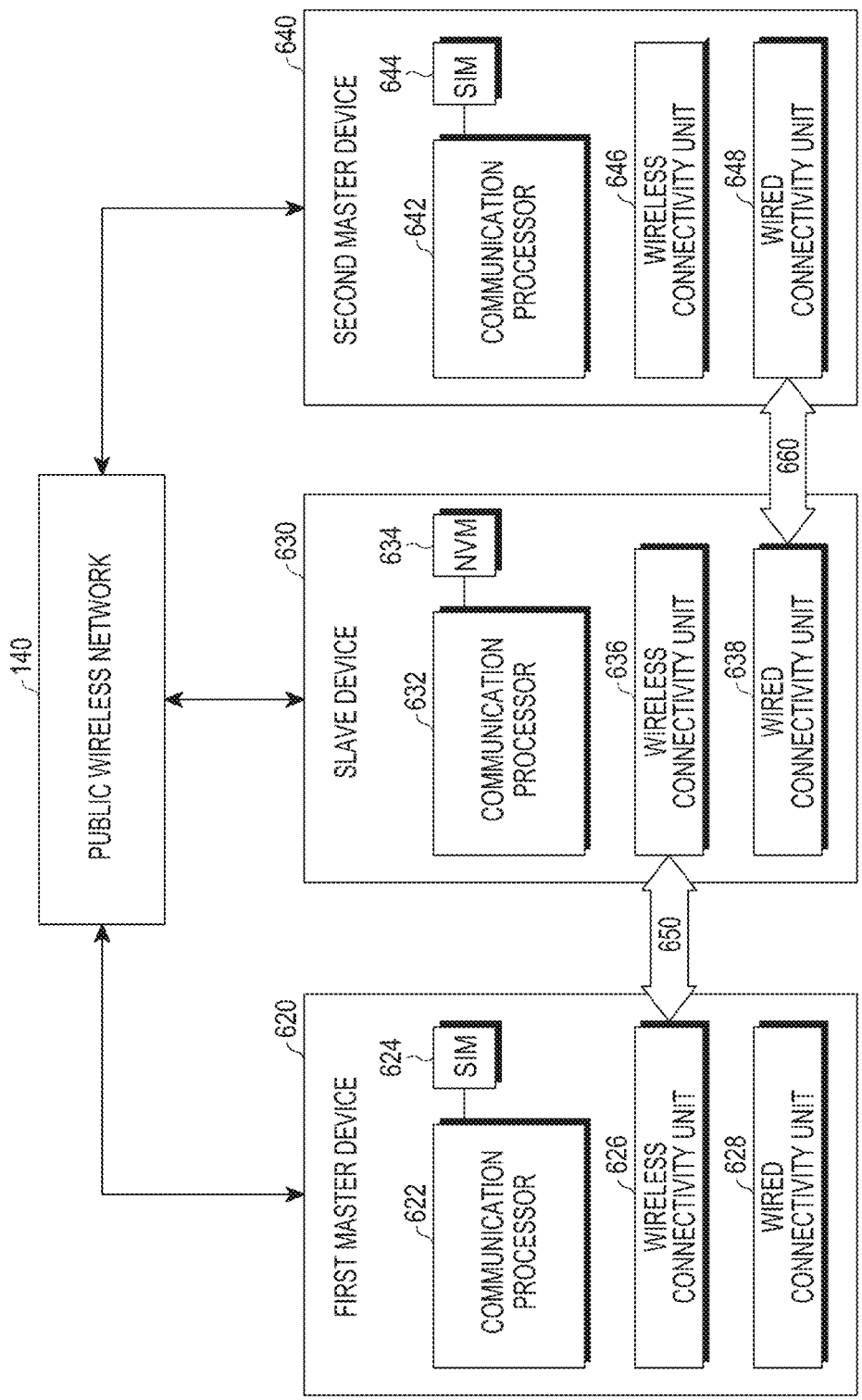
FIG. 6 is a block diagram illustrating in one example various connections between multiple user equipment (UE) and a public wireless network according to certain embodiments of the inventive concept.

FIG. 6 is a block diagram illustrating in one example various connections between multiple UE using a communication service over a PWN 140 according to embodiments of the inventive concept.

Referring to FIG. 6, the multiple UE include as examples a first master device 620, a slave device 630, and a second master device 640. The first master device 620 may contain a SIM 624, the second master device 640 may contain a SIM 644, and the slave device 630 may not have a SIM, but may have a NVM 634. The SIMs 624 and 644 may contain access authorization credentials (e.g., SII 220) to connect to a communication service over the PWN 140, but the slave device may internally lack access authorization credentials to connect to a communication service over the PWN 140.

The first master device 620 may have first SII (1SII) stored in the SIM 624 and may connect to a first communication service. The first master device 620 may generate first NSI (1NSI) associated with the connecting of the first communication service and may derive first NAI (1NAI) from the 1SII and 1NSI. The first master device 620 may establish a first communication link (e.g., wireless connectivity link 650) between the first master device 620 and slave device 630.

A second master device 640 may have second SII (1SII) stored in the SIM 644 and may connect to a second communication service. The second master device 640 may generate second NSI (2NSI) associated with the connecting of the second communication service and may derive second NAI (2NAI) from the 2SII and 2NSI. The second master device 640 may establish a second communication link (e.g., wired connectivity link 660) between the second master device 640 and slave device 630.

The first master device 620 may send the 1NAI to the slave device 630 via the first communication link (e.g., wireless communication link 650) and the slave device 630 may store the 1NAI in the slave device 630 (e.g., NVM 634). The second master device 640 may send the 2NAI to the slave device 630 via the second communication link (e.g., wired communication link 660) and the slave device 630 may store the 2NAI in the slave device 630 (e.g., NMV 634).

Thus, the slave device 630 may connect to the first communication service over the PWN 140 using the 1NAI and the first communication service may be terminated in the first master device 620. The PWN 140 will not allow multiple UE to access the PWN 140 using the same SII. The slave device 630 may generate updated 1NAI during connection to the first communication service in the slave device 630 and may synchronize the updated 1NAI between the slave device 630 and the first master device 620 via the first communication link (e.g., wireless communication link 650).

For example, the slave device 630 may receive data from the first communication service over the PWN 140 and the slave device 630 may relay the data from the slave device 630 to the first master device 620 via the first communication link (e.g., wireless communication link). The slave device 630 may connect to the second communication service over the PWN 140 using the 2NAI and the second communication service may terminate in the second master device 640. The slave device 630 may generate updated 2NAI during connection of the second communication service in the slave device 630 and may synchronize the updated 2NAI between the slave device 630 and the second master device 640 via second communication link (e.g., wired communication link 660).

Additionally, the second communication service may be terminated in the second master device 640, the slave device 630 may receive data from the first communication service, and the slave device may relay the data from the slave device to at least two devices including the first master device 620 via the first communication link and the second master device 640 via the second communication link. The first master device 620, the second master device 640, and the slave device 630 may support using a common communication service over the PWN 140.

Even though the slave device 630 is connected to the PWN 140 and the first master device 620 and second master device 640 are no longer connected to the PWN 140, the subscriber may still enjoy the communication service through the slave device by using the first master device 620 and second master device 640. The first master device 620 and the second master device 640 may enjoy the communication service through the slave device via communication links (e.g., wireless communication link 650, wired communication link 660).

If the two master devices 620 and 640 have the same SII 220, the slave device 630 may receive the NAI 210 from only one of the two master devices 620 and 640. In this case, if the slave device 630 has accessed the PWN 140, the access to the PWN 140 may be released or may not be permitted, for both of the two master devices 620 and 640.

As described above, the multiple UE 620, 630 and 640 may include communication processors 622, 632 and 642, respectively, and connectivity units. The connectivity units may include wireless connectivity units 626, 636 and 646, and wired connectivity units 628, 638 and 648.

The communication processors 622, 632 and 642 may support an operation of allowing their UE to use a communication service over the PWN 140. The wireless connectivity units 626, 636 and 646 each may support an operation in which the UE forms the wireless connectivity link 650 to another UE based on a predetermined wireless communication protocol, and transmit/receive information (e.g., NAI 210, NSI 230, modem status information, etc.) via the formed wireless connectivity link 650. The wired connectivity units 628, 638 and 648 each may support an operation in which the UE forms the wired connectivity link 660 to another UE based on a predetermined wired communication protocol, and transmit/receive information (e.g., NAI 210, NSI 230, modem status information, etc.) via the formed wired connectivity link 660. The wireless connectivity link 650 may be expressed as 'connectivity interface' or 'wireless interface.' The wired connectivity link 660 may be expressed as 'cable interface' or 'wired interface.'

The wireless connectivity unit 636 in the slave device 630 may provide NSI 230 (e.g., modem status information) to the master device 620 via the wireless connectivity link 650. The wired connectivity unit 638 in the slave device 630 may provide NSI 230 (e.g., modem status information) to the master device 640 via the wired connectivity link 660. The NSI 230 may be provided to the master devices 620 and 640, only if the NSI 230 is changed due to the communication service over the PWN 140.

For example, the NSI 230 may be provided to the master devices 620 and 640, upon occurrence of an event corresponding to at least one of an inter-cell handover, a change in cell identification information, a change in TMSI 223, a change in physical proximity between the master device and slave device, a change in a power condition for one of the master device and the slave device, and a change in communication link connectivity between the master device and the slave device.

The master devices 620 and 640 may update the existing NSI, using the NSI provided from the slave device 630.

Upon request for an access to the PWN 140, the master devices 620 and 640 may command the slave device 630 to terminate the communication service. In response to the command, the slave device 630 may release its access to the PWN 140. In this way, the master devices 620 and 640 may make an access to the PWN 140, using the updated NSI.

Figure 7:
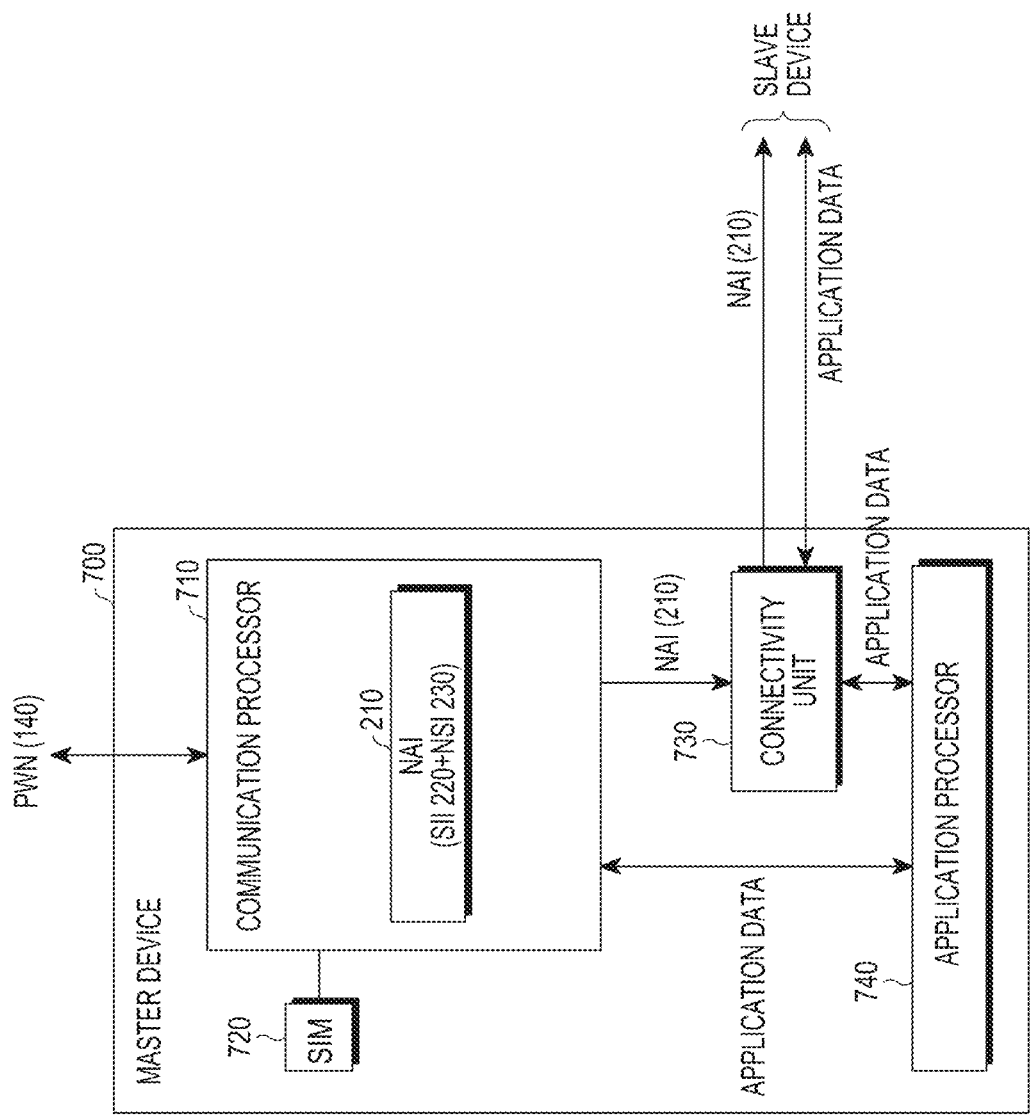
FIG. 7 is a block diagram illustrating certain components of a master device according to an embodiment of the inventive concept.

FIG. 7 is a block diagram illustrating in one example various components of a master device according to an embodiment of the inventive concept.

Referring to FIG. 7, a master device 700 may include a communication processor 710, a SIM card 720, a connectivity unit 730, and an application processor 740. The communication processor 710 may have information to be used to access the PWN 140. For example, the communication processor 710 may include NSI 230 (e.g., RRC status information 233, NAS information 237) and SII 220 (e.g., entire or partial SIM information), to connect to the communication service over the PWN 140. As for the components of the master device 700, only the components required for various embodiments of the present disclosure are illustrated in the drawing.

The communication processor 710 may access (or read) SII 220 recorded in the SIM card 720, and may access the PWN 140 using the read SII 220. The SIM card 720 may record, as SII 220, a variety of information, such as ICCID 225, IMSI 221, GUTI 229, and TMSI 223.

If the communication processor 710 is successfully connected to the communication service over the PWN 140, the communication processor 710 may transmit/receive information (e.g., application data, etc.) associated with the communication service over the PWN 140. The communication processor 710 may generate and update NSI 230 such as RRC status information 233 and NAS information 237, which corresponds to the access to the cellular network and the communication service over the connected communication service over the PWN 140.

The communication processor 710 may send the NSI 230 and the entire or partial SII 220 to the connectivity unit 730 so that the NAI 210 may be provided to the slave device.

The connectivity unit 730 may include a wireless communication module, a wired communication module, and the like. The wireless communication module may allow the master device 700 to form a wireless link to the slave device based on a predetermined wireless communication protocol, and transmit/receive information (e.g., NAI 210, NSI 230, modem status information, application data, etc.) via the formed wireless link. The wired communication module may allow the master device 700 to form a wired link to the slave device based on a predetermined wired communication protocol, and transmit/receive information (e.g., NAI 210, NSI 230, modem status information, application data, etc.) via the formed wired link.

The NAI 210 may be information that the connectivity unit 730 provides to the slave device. The NAI 210 may be configured by the connectivity unit 730 using the NSI 230 and the entire or partial SII 220, which are provided from the communication processor 710. The NSI may include RRC status information 233 and NAS information 237. The RRC status information 223 is to be used by the slave device to make a seamless connection to the PWN 140, and the NAS information 237 is to be used by the slave device, for authentication.

The modem status information may be an example of NSI 230 that the connectivity unit 730 has received from the slave device. The modem status information may be information related to the communication environment in which the slave device uses a communication service over the PWN 140. For example, the modem status information may include information about a change in communication environment, such as an inter-cell handover, a change in cell identification information, and a change in TMSI 223. The modem status information may be used by the master device, when the master device makes an access to the PWN 140 and/or uses a communication service over the PWN 140.

The application data may be data that the master device can provide or receive to/from the slave device. For example, as for the application data that the master device will provide to the slave device, the communication processor 710 may receive the application data from the PNW 140, and provide the received application data through the application processor 740. The application data that is provided to the slave device may include information based on which the master device 700 controls the slave device. The application data provided from the slave device may be provided to the application processor 740, or may be delivered to the communication processor 710 through the application processor 740. The application data received from the slave device may include information about the processing results of a certain operation by the slave device.

For the overall operation of the master device 700, the application processor 740 may control the components of the master device 700. The application processor 740 may perform a control operation of processing the information provided from the communication processor 710 and the information provided from the connectivity unit 730.

Figure 8:
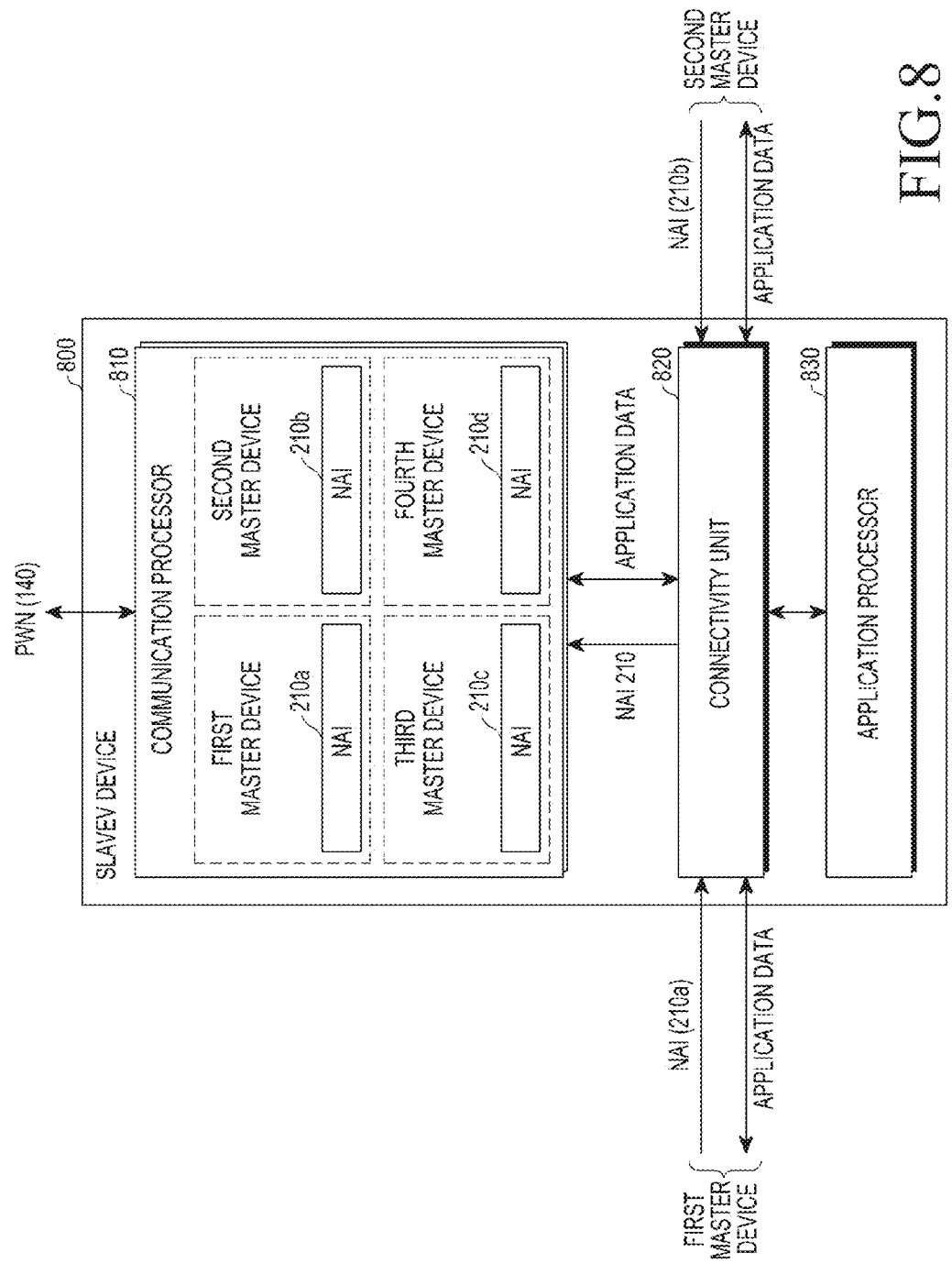
FIG. 8 is a block diagram illustrating certain components of a slave device according to an embodiment of the inventive concept.

FIG. 8 is a block diagram illustrating in one example various components of a slave device according to an embodiment of the inventive concept.

Referring to FIG. 8, a slave device 800 may include a communication processor 810, a connectivity unit 820, and an application processor 830. As for the components of the slave device 800, only the components required for various embodiments of the present disclosure are illustrated in the drawing.

The communication processor 810 may have at least one type of NAI 210 to be used for an access to the PWN 140. The communication processor 810 may include NAI 210 separately for each master device. As illustrated, it can be noted that the communication processor 810 may receive and manage NAI 210 (e.g., 210*a*, 210*b*, 210*c*, 210*d*) from four master devices. The communication processor 810 may receive the NAI 210 through the connectivity unit 820.

The communication processor 810 may select one of the stored NAI 210, and attempt an access to the PWN 140 using the selected NAI.

If the communication processor 810 is successfully connected to the PWN 140, the communication processor 810 may transmit/receive information (e.g., application data, etc.) associated with the communication service over the connected PWN 140. The communication processor 810 may generate and update NSI 230 such as RRC status information 233 and NAS information 237, which corresponds to the access to the cellular network and the common or different communication service over the connected PWN 140.

The connectivity unit 820 may include a wireless communication module, a wired communication module, and the like. The wireless communication module may allow the slave device 800 to form a wireless link to at least one master device based on a predetermined wireless communication protocol, and transmit/receive information (e.g., NAI 210, NSI 230, modem status information, application data, etc.) via the formed wireless link. The wired communication module may allow the slave device 800 to form a wired link to the master device based on a predetermined wired communication protocol, and transmit/receive information (e.g., NAI 210, NSI 230, modem status information, application data, etc.) via the formed wired link.

The NAI 210 may include NSI 230, entire or partial SII 220, and the like. The NSI 230 may include RRC status information 233 'RC info', NAS information 237 'NAS info', and the like. The RRC status information 233 is to be used by the slave device to make a seamless connection to the PWN 140, and the NAS information 237 is to be used by the slave device, for authentication. The entire or partial SII 220 may include an ICCID 225, an IMSI 221, a GUTI 229, a TMSI 223, and the like.

The modem status information may be an example of the NSI 230 that the connectivity unit 820 provides to the master device. The modem status information may be information related to the communication environment in which the slave device uses a communication service over the PWN 140. For example, the modem status information may include information about a change in communication environment, such as an inter-cell handover, a change in cell identification information, and a change in TMSI 223. The modem status information may be used by the master device to make an access to the PWN 140 and/or to use a communication service over the PWN 140.

The application data may be data that the connectivity unit 820 can provide or receive to/from the master device. For example, as for the application data that the slave device will provide to the master device, the application data may be received from the PWN 140 and delivered by the communication processor 810, or may be provided by the application processor 830. The application data that is provided to the master device may include information about the processing results of a certain operation by the slave device. The application data provided from the master device may be provided to the application processor 830 or the communication processor 810. The application data provided from the master device may include information based on which master device controls the slave device 800.

For the overall operation of the slave device 800, the application processor 830 may control the components of the slave device 800. The application processor 830 may perform a control operation of processing the information provided from the communication processor 810 and the information provided from the connectivity unit 820.

Figure 9:
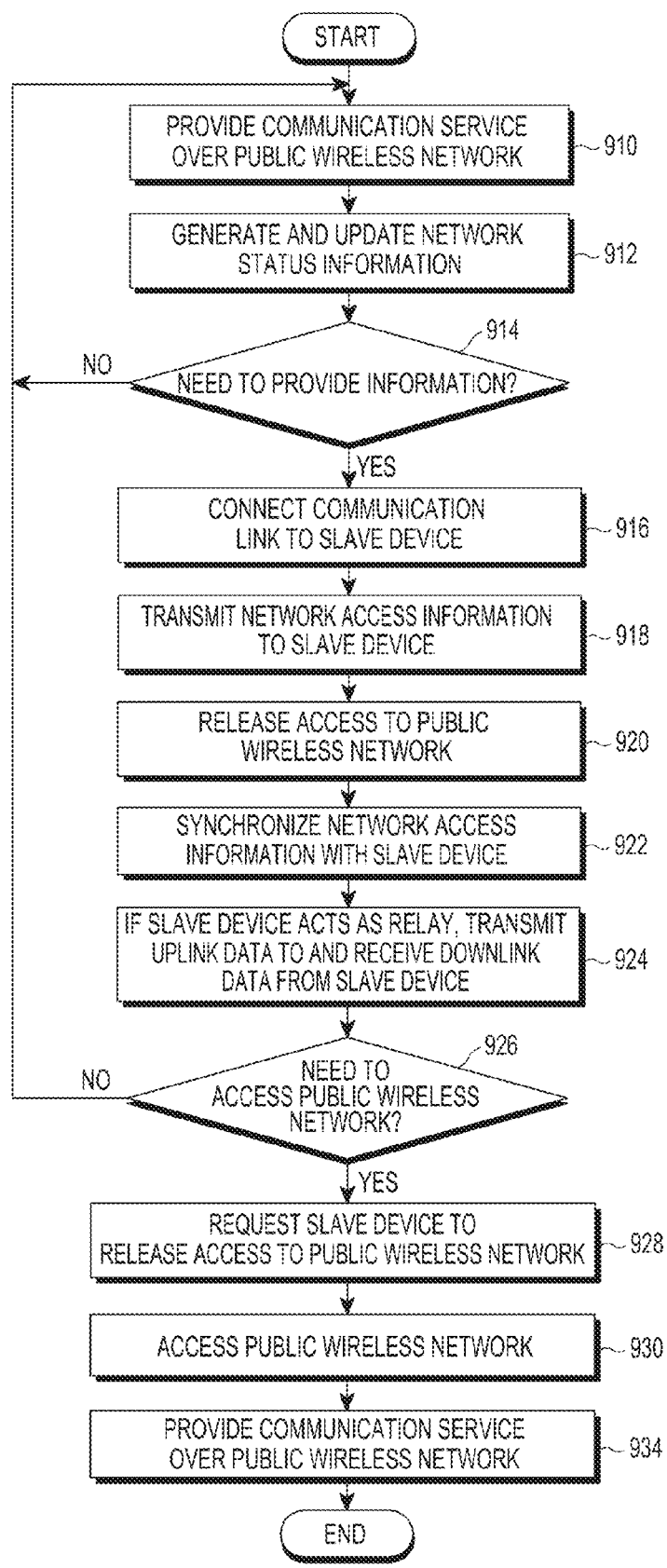
FIG. 9 is a flowchart summarizing a control flow in a master device according to an embodiment of the inventive concept.

FIG. 9 is a flowchart summarizing a control flow in a master device according to an embodiment of the inventive concept.

Referring to FIG. 9, in operation 910, the master device may access a PWN 140 and provide a communication service over the connected PWN 140. The master device may access the PWN 140 by connecting a SIM in the master device, reading SII 220 from the SIM, storing the SII 220 in the master device, and using the stored SII to connect to the communication service. The master device may access the PWN 140 by using stored access authorization credentials.

In operation 912, the master device may generate or update the NSI 230 associated with the provision of the communication service over the PWN 140. The NSI 230 may include physical information in addition to RRC information 233. The physical information may include cell identification information (cell ID) 231. Partial or entire SII 220 may be generated and updated in addition to the NSI 230. SII 220 may include paging information (IMSI 221 or TMSI 223), and the like. The master device may derive NAI 210 from the access authorization credentials (e.g., partial or entire SII 220) and the NSI 230. The master device may store the NSI 230 or NAI 210 in the master device before terminating the communication service in the master device.

In operation 914, the master device may determine whether there is a need to provide NAI 210 to a slave device. The determination may be made in response to the request from the user, the occurrence of a situation in which the master device can no longer provide the communication service, or the request from the slave device.

If there is a request for delivery of NAI 210, the master device may connect a communication link to at least one slave device in operation 916. For connection of a communication link, the master device may determine whether its connectivity unit and a connectivity unit mounted in the slave device are enabled. The communication link may include a wireless link that uses wireless resources, or a wired link that uses wired resources such as a cable. For example, the wireless link may be connected using a wireless communication protocol such as Wi-Fi, Bluetooth, and NFC.

If connectivity is not available in the master device, the master device may turn on connectivity. The master device may confirm if the correct slave device is connectable. If the correct slave device is connectable, the master device may set connectability (i.e., set connection in Wi-Fi or Bluetooth, locate both devices within connectable proximity in NFC).

The master device may receive a first signal that contains information whether the slave device is connectable to the master device via connectivity (Wi-Fi, BT, NRF, etc.). The master device may receive a second signal containing information whether the slave device has the capability to be connected to the PWN 140. The first signal and the second signal may be identical signals, may be distinct signals, or may be combined into one signal.

If a master device meets a predetermined condition, the master device may perform a communication link connecting procedure with a slave device in operation 916. Similarly, if the slave device meets a predetermined condition, the slave device may also perform a communication link connecting procedure with the master device.

In one embodiment, the predetermined condition may be a communication environment condition, in which the master device and the slave device may create a communication link, and exchange information via the formed communication link. The communication environment condition may vary depending on the type of the communication protocol to be used to form the communication link. The predetermined condition may be set in advance for each communication protocol to be used. For example, the communication protocol may be divided into a wired communication protocol and a wireless communication protocol. The wireless communication protocol, which is a protocol supporting a communication link, may be a protocol defined for Wi-Fi, NFC, BT, and the like.

To determine whether the communication environment meets a predetermined condition, the master device or the slave device may use its received signal strength, and at least one sensor thereof. In addition, the determining of whether the communication environment meets a predetermined condition may be replaced by monitoring whether a user's request is received.

As for the master device, if its communication link to at least one slave device is connected, the master device may deliver the operation data (downlink data) received from the PWN 140 to at least one slave device via the communication link. On the contrary, the master device may transmit the operation data (uplink data) that is received from the at least one slave device, to the PWN 140 via the communication link and relay this data or data derived from it. Hence, in one aspect of the inventive concept, a download relay may be understood as progressing from the PWN to slave device to master device, and an upload relay may be understood as progressing from a master device to a slave device to the PWN. For example, assuming a user wants to download a very large volume of data (e.g., a movie) from PWN to his/her master device, the downloading of corresponding data via powerful slave device may be better (e.g., more efficient) than downloading the corresponding data directly to the master device.

If the master device connects a communication link to at least one slave device, the master device may transmit NAI 210 via the connected communication link in operation 918. The NAI 210 may include NSI 230 and SII 220. The NSI 230 may include RRC status information 233, NAS status information 237, and the like. The RRC status information 233 is to be used by at least one slave device to make a seamless connection to the cellular network, and the NAS information 237 is to be used by at least one slave device, for authentication for an access to the PWN 140. The SII 220 may include the entire SII or partial SII, which is recorded in the SIM card of the master device. The partial SII may be any one of an ICCID 225, an IMSI 221, a GUTI 229, and a TMSI 223. The SII 220 may comprise information derived from at least one of the plurality of SII components. The SII 220 may comprise a TMSI 223 provided to the master device from the PWN 140 upon connecting the communication service in the master device.

The providing of the NAI 210 to the slave device may mean that the master device has approved the access to the PWN 140 by the slave device. In this case, the master device may block the communication service that the master device has been using over the PWN 140.

The NAI 210 sharing procedure may be initiated by a command of the master device, or by a request of the slave device.

After transmitting the NAI 210 to at least one slave device, the master device may release the access to the PWN 140 (e.g., terminate connection of the communication service in the master device) in operation 920. The reason why the master device releases the access to the PWN 140 is to prevent occurrence of a situation in which the master device attempts an access to the PWN 140, together with at least one slave device that has received the NAI 210. For example, the access to the PWN 140 may be released as the master device disables its communication processor or enters a sleep mode. After releasing the access to the PWN 140, the master device may use the communication service only via the communication link.

After terminating the communication service in the master device, the master device may listen to the communication service without transmitting over the communication service via the master device. Listening includes continuously monitoring whether there is a need to connect to the communication service in the master device.

In operation 922, the master device may synchronize one or more components of the NAI 210 (e.g., NSI 230, modem status information) updated by the slave device that accesses the PWN 140 and uses the communication service. The synchronization of the NAI 210 is an operation matching the NAI 210 stored in the master device to the NAI 210 stored in the slave device. To this end, the master device may receive NAI from the slave device via the communication link, and update the existing NAI using the received NAI. This operation can be synchronization for the NAI 210.

The synchronization for the NAI 210 may enable the master device to easily make a reconnection to the PWN 140. In other words, if the NAI 210 is synchronized, the master device may quickly re-access the PWN 140 using the NAI 210.

The synchronization for the NAI 210 may be performed periodically or upon occurrence of a predetermined event. The predetermined event may correspond to at least one of an inter-cell handover, a change in cell identification information 231, a change in TMSI 223, a change in physical proximity between the master device and slave device, a change in a power condition for one of the master device and the slave device, and a change in communication link connectivity between the master device and the slave device.

The slave device may be in stand-alone mode or relay mode. If the slave device is in stand-alone mode, the slave device replaces the master device and the slave device accesses the PWN 140 on behalf of the master device and the slave device receives data from the PWN 140. The NAI 210 is synchronized between the slave device and the master device, but data is not synchronized (e.g., uplink data, downlink data) between the slave device and master device.

In operation 924, if the slave device is in relay mode, the master device transmits uplink data to and receives downlink data from the slave device. This is in addition to the NAI 210 being synchronized between the slave device and the master device. The master device may transmit uplink data to slave device via the communication link, after which the slave device may relay the data to the communication service. The master device may receive downlink data from the slave device via the communication link that the slave device may have received from the communication service. The relay mode may allow multiple UE (e.g., master device) to uplink data to and downlink data from the PWN 140 through the slave device. The relay mode may allow a UE that has an inferior characteristics (e.g., lower performance receiver, transmitter, or battery) to access the PWN 140 through a device (e.g., slave device) that has superior characteristics (e.g., better performance receiver, transmitter, or battery).

In operation 926, the master device may continuously monitor whether there is a need for an access to the PWN 140. Although the master device is not transmitting directly over the PWN 140, the master device may be listening to the communication service without transmitting. The situation in which there is a need for an access to the PWN 140 may occur in response to the request by the user, the paging from the PWN 140, the request from the slave device, and the like.

In one embodiment, the master device may receive a report indicating termination of the communication service over the PWN 140 from the slave device, which was connected to the PWN 140. In this case, the master device may resume the blocked communication service over the PWN 140.

In one embodiment, the master device, on its own demand, may command the slave device to release its access to the PWN 140. The master device may send the command to release the access to the PWN 140, via the communication link connecting the master device to the slave device.

For example, upon occurrence of an event in which an access to the PWN 140 is required, the master device may command the slave device to release its access to the PWN 140. In response to the command, the slave device will terminate the communication service that the slave device has been using over the PWN 140. The slave device needs to report its termination of the communication service to the master device. Upon receiving the report indicating the termination of the communication service, the master device may attempt an access to the PWN 140. In this case, the master device may take into account the updated NSI 230.

The master device should be able to recover (or withdraw) the access rights to the PWN 140 by the slave device. As one example, the master device may send a command to terminate the communication service over the PWN 140, to the slave device via the communication link in operation 928. In response to the command, the master device may receive a report indicating termination of the communication service from the slave device.

In operation 930, the master device may re-access the PWN 140 using the NAI 210 or NSI 230 that is updated by the synchronization. If the re-access to the PWN 140 is made, the master device may provide the communication service over the PWN 140 in operation 934.

Although not illustrated in FIG. 9, the master device may resume the blocked communication service over the PWN 140, upon receiving the report indicating the termination of the communication service from the slave device.

In an embodiment, one master device shares NAI 210 with one slave device. It will be apparent to those of ordinary skill in the art that as another example, one master device may share NAI 210 with multiple slave devices according to the procedure illustrated in FIG. 9. In addition, it can be assumed that one slave device receives NAI 210 from each of multiple master devices. In this case, one slave device may select one of a variety of NAI 210, and take advantage of the communication service over the PWN 140 using the selected NAI 210. Although in the foregoing examples, there is only one physical slave device assumed, said slave device, in fact, be an operative combination of multiple slave devices, where multiple NAI is stored and selectively used to establish and maintain one or more communication services over the PWN. Moreover, it is also possible for one slave device to be used to establish multiple communication services on behalf of multiple master devices, each master device having transferred a corresponding NAI to the slave device. In this manner, a slave device may function as a powerful "public device" that has capability of relaying data for multiple users at a relatively high data rate.

Figure 10:
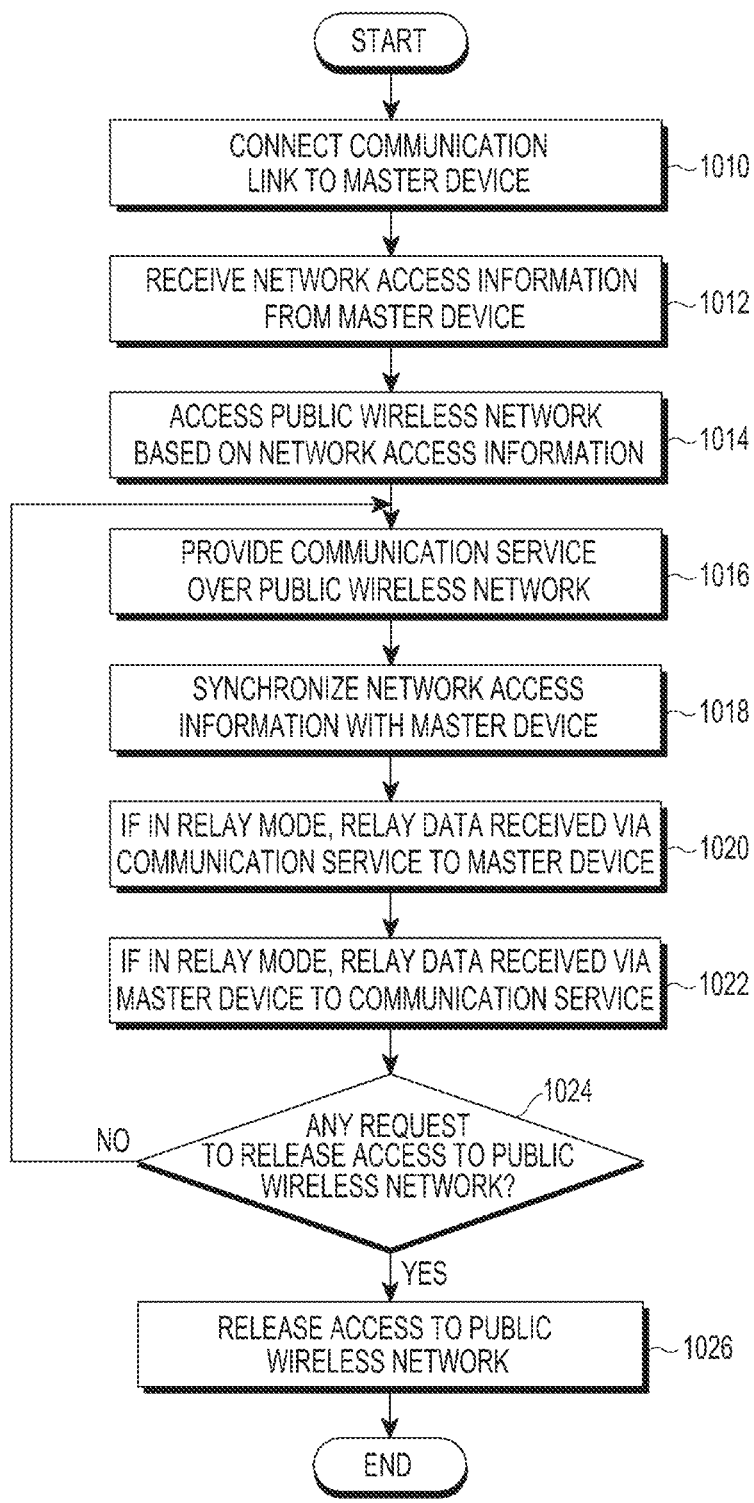
FIG. 10 is a flowchart summarizing a control flow in a slave device according to an embodiment of the inventive concept.

FIG. 10 is a flowchart summarizing a control flow for operation of a system according to an embodiment of the inventive concept.

Referring to FIG. 10, in operation 1010, the slave device may connect a communication link to the master device in response to a request of the user, or a request of the master device. For connection of the communication link, the slave device may determine whether its connectivity unit and a connectivity unit mounted in the master device are enabled. The slave device may determine whether the slave device is connectable to the master device. The communication link may include a wireless link that uses wireless resources, or a wired link that uses wired resources such as a cable. For example, the wireless link may be connected using a wireless communication protocol such as Wi-Fi, Bluetooth, and NFC.

The slave device may send a first signal that contains information whether the slave device is connectable to the master device via connectivity (Wi-Fi, BT, NRF, etc.). The slave device may send a second signal containing information whether the slave device has the capability to be connected to the PWN 140. The first signal and the second signal may be identical signals, may be distinct signals, or may be combined into one signal.

The slave device may be internally lacking access authorization credentials required to connect to the communication service. If the slave device connects the communication link to at least one master device, the slave device may receive NAI 210 via the connected communication link in operation 1012. The NAI 210 may include NSI 230 and SII 220. The NSI may include RRC status information 233, NAS status information 237, and the like. The slave device will use the RRC status information 233 to make a seamless connection to the PWN 140. The slave device will use the NAS information 237, during authentication for an access to the PWN 140. The SII 220 may include the entire SII or partial SII, which is recorded in the SIM card of the master device. The partial SII may be any one of an ICCID 225, an IMSI 221, a GUTI 229, and a TMSI 223. The slave device may store the NSI 230 or NAI 210 in the slave device.

Upon receiving the NAI 210 from at least one master device, the slave device may attempt an access to the PWN 140 using the received NAI in operation 1014. If the access to the PWN 140 is successful, the slave device may provide the communication service over the public PWN 140 in operation 1016.

Upon occurrence of a periodic or predetermined event, the slave device may perform synchronization on the changed NAI (e.g., NSI 230, modem status information) with the at least one master device in operation 1018. The slave device may generate and store updated NSI 230 in the slave device in accordance with the connection of the communication service over the PWN 140 in the slave device. The synchronization for the NAI 210 may be performed on the assumption that a communication link is connected between the slave device and the at least one master device. The predetermined event may correspond to at least one of an inter-cell handover, a change in cell identification information 231, a change in TMSI 223, a change in physical proximity between the master device and slave device, a change in a power condition for one of the master device and the slave device, and a change in communication link connectivity between the master device and the slave device.

The slave device may be in stand-alone mode or relay mode. If the slave device is in stand-alone mode, the slave device replaces the master device and the slave device accesses the PWN 140 on behalf of the master device and the slave device receives data from the PWN 140. The NAI 210 is synchronized between the slave device and the master device, but data is not synchronized (e.g., uplink data, downlink data) between the slave device and master device.

In operation 1020, if the slave device is in relay mode, the slave device relays data received via the communication service to the master device. In operation 1022, if the slave device is in relay mode, the slave device relays data received via the master device to the communication service. This is in addition to the NAI 210 being synchronized between the slave device and the master device. The relay mode may allow multiple UE (e.g., master device) to uplink data to and downlink data from the PWN 140 through the slave device. The relay mode may allow a UE that has an inferior characteristics (e.g., lower performance receiver, transmitter, or battery) to access the PWN 140 through a device (e.g., slave device) that has superior characteristics (e.g., better performance receiver, transmitter, or battery).

If the communication link to at least one master device is connected, the slave device may transmit the operation data (e.g., downlink data) received from the PWN 140 to at least one master device via the communication link. The slave device may transmit the operation data (e.g., uplink data) received from the at least one master device, to the PWN via the communication link.

In operation 1024, the slave device may monitor whether a request to release the access to the PWN 140 occurs. The release of the access to the PWN 140 may be requested by the user, requested by the master device, or requested through the PWN 140 (e.g., paging from the PWN). If the release of the access to the PWN 140 is requested by the master device, the slave device may report the release of the access to the PWN 140. The slave device may report the release of access by sending a termination indication to the master device via the communication link. Upon receiving an access release request, the slave device may release the access to the PWN 140 in operation 1022.

Figure 11:
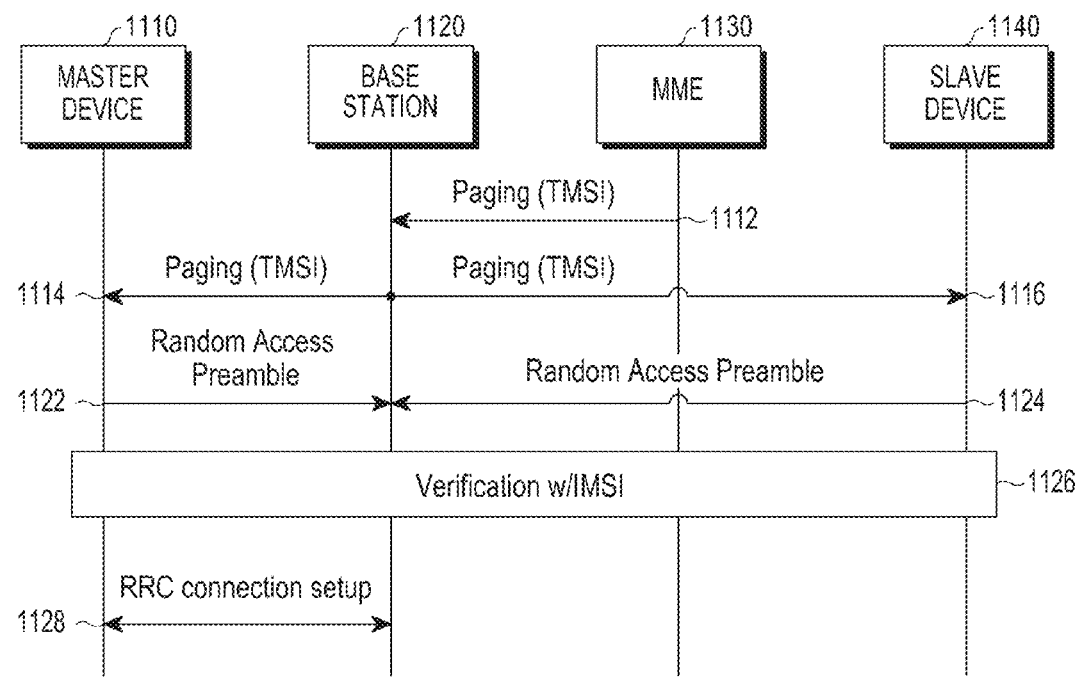
FIG. 11 is an operational diagram illustrating a call processing procedure that may be used in conjunction with certain embodiments of the inventive concept.

FIG. 11 is an operational diagram illustrating a call processing procedure that may be used in accordance with certain embodiments of the inventive concept.

Referring to FIG. 11, a scenario is considered in which multiple UE (e.g., one master device 1110 and one slave device 1140) respond to the paging of a specific subscriber by a base station 1120.

In operation 1112, the base station 1120 may receive paging from a Mobility Management Entity (MME) 1130. The paging may include SII 220 (e.g., TMSI 223) for identifying a UE to be paged. In operations 1114 and 1116, the base station 1120 may determine a UE to be paged based on the SII 220, and page the determined UE. The base station 1120 may handle only one paging based on the SII 220, instead of paging the master device 1110 and the slave device 1140 independently.

The master device 1110 and the slave device 1140 may both receive the paging by the base station 1120. To this end, it should be assumed that the master device 1110 provides the NAI 210 to the slave device 1140. For example, it can be assumed that the master device 1110 and the slave device 1140 have the same TMSI 223.

In operations 1122 and 1124, the master device 1110 and the slave device 1140 may transmit a random access preamble to the base station 1120 in response to the paging of the base station 1120.

Upon receiving the random access preamble from the multiple UE (e.g., one master device 1110 and one slave device 1140), the base station 1120 may determine one UE, to which it will create an RRC connection, from among the multiple UE in operation 1126. Only one UE may be able to access the base station 1120 with a single SII 220. In other words, if more than one UE attempt to connect to the PWN 140, only one will be allowed to connect to the PWN 140. The master device may have higher priority if the base station 1120 receives multiple responses from UE with the same SII 220. The base station 1120 may determine one UE using the information that only the master device 1110 has, from among the components of SII 220. The unique information that only the master device 1110 has may include an IMSI 221 and the like. To this end, it is preferable that the master device 1110 inserts the information (e.g., TMSI 223) temporarily generated for an access to the PWN 140 (e.g., the cellular network), rather than the unique information (e.g., IMSI 221) for the subscriber, into the NAI 210 provided to the slave device 1140.

If the base station selects one UE, the base station 1120 may create an RRC connection to the selected UE in operation 1128.

Figure 12:
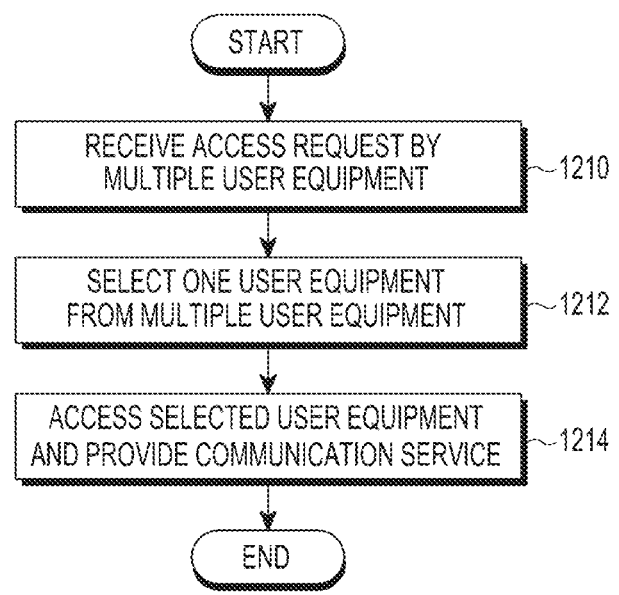
FIG. 12 is a general flowchart summarizing a control flow in a base station according to an embodiment of the inventive concept.

FIG. 12 is a general flowchart summarizing a control flow that may be used in conjunction with a base station in the context of certain embodiments of the inventive concept.

Referring to FIG. 12, in operation 1210, the base station may monitor whether a response is received from multiple UE in response to paging. The response may be considered as an access request from the multiple UE. In operation 1212, the base station may select one UE to which it will create an RRC connection, from among the multiple UE from which a response is received.

For example, the base station may determine one UE using the information that only the master device has. The unique information that only the master device has may include an IMSI 221 and the like. To this end, the master device may insert the information (e.g., TMSI 223) temporarily generated for an access to the PWN 140 (e.g., the cellular network), rather than the unique information (e.g., IMSI 221) for the subscriber, into the network access information provided to the slave device.

If the base station selects one UE, the base station may create an RRC connection to the selected UE and provide a communication service for the selected UE based on the created RRC connection, in operation 1214.

FIGS. 13A, 13B, 13C, 13D and 13E (collectively, FIGS. 13A to 13E) are respective block diagrams illustrating various components of a UE according to embodiments of the inventive concept.

Figure 13A:
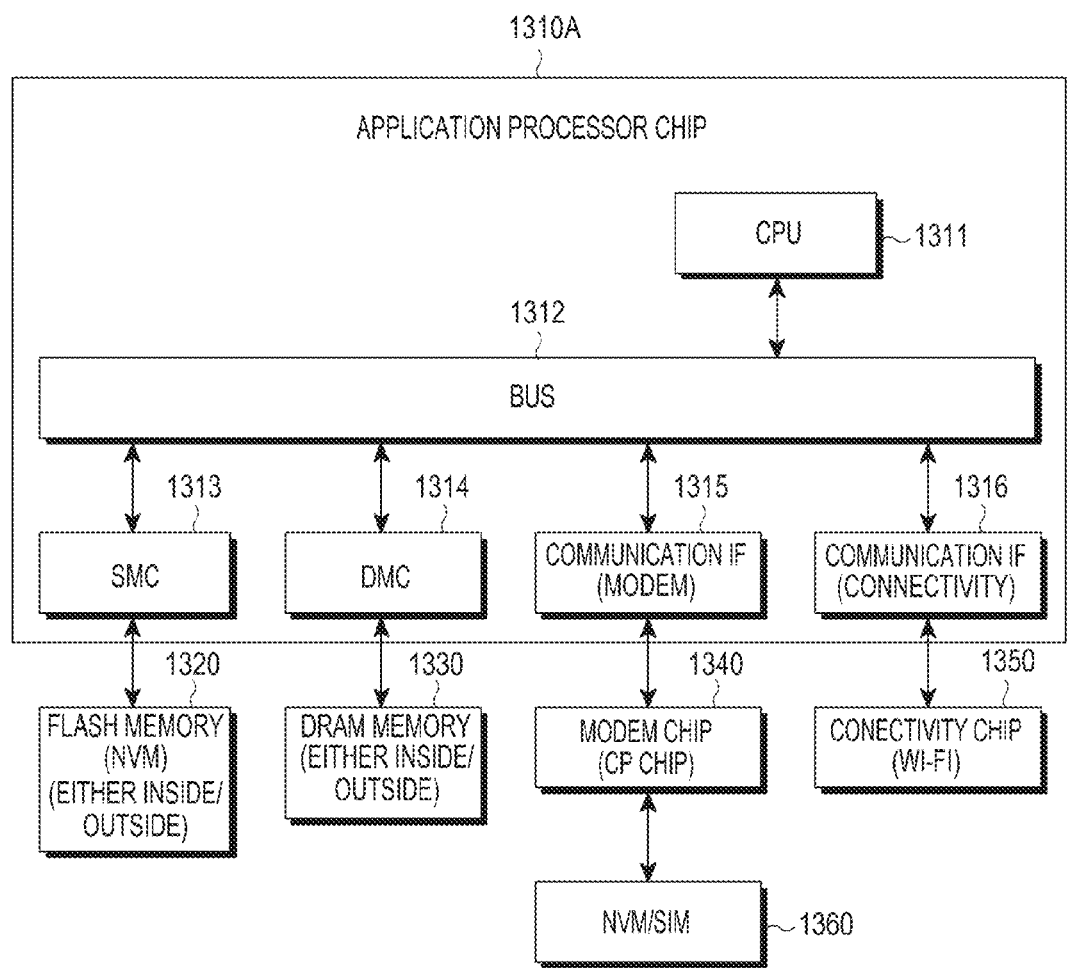
FIGS. 13A, 13B, 13C, 13D and 13E are block diagrams respectively illustrating components of user equipment according to various embodiments of the inventive concept.

FIGS. 13A to 13E illustrate examples of implementation for a device according to an embodiment of the present disclosure. For example, the components packaged in application processor (AP) chips 1310A, 1310B, 1310C and 1310D may differ depending on the examples of the implementation in FIGS. 13A to 13E. The AP chips 1310A, 1310B, 1310C and 1310D may each be one semiconductor chip. The AP chips 1310A, 1310B, 1310C and 1310D may each have a structure in which a CPU 1311 is combined with multiple units via a bus 1312. The units connected to the CPU 1311 via the BUS 1312 may be different from each other in FIGS. 13A to 13E. For example, the AP chip may or may not include a DRAM and a CP (e.g., a modem) as one package. FIG. 13A illustrates an example of the structure in which a DRAM and a CP (e.g., a modem) are disposed external to the AP chip, and FIGS. 13B to 13E illustrate examples of the structure in which a DRAM and a CP (e.g., a modem) are disposed internal to the AP chip. Although not illustrated, obviously, the device may have a structure in which only one of the DRAM and the CP (e.g., the modem) constitute one package together with the AP chip.

The four additional pictures according to the FIGS. 13B, 13C, 13D, and 13E are added for SoC-related contents supplement. It is applicable if there is a demand for the small form-factor chip in field of Wearable and IoT.

FIG. 13A illustrates an example of a device having a structure in which an AP, a DRAM and a CP (e.g., a modem) are separated, according to an embodiment of the present disclosure. However, a DRAM 1314 may constitute one package together with the AP chip 1310A.

Referring to FIG. 13A, the AP chip 1310A may have a structure in which the CPU 1311 is connected to an SMC 1313, a DMC 1314, and communication IFs 1315 and 1316 via the bus 1312. The communication IF 1315 may connect a modem chip (e.g., CP) 1340 disposed external to the AP chip 1310A to the CPU 1311, and the communication IF 1316 may connect a connectivity chip 1350 disposed internal to the AP chip 1310A to the CPU 1311. The SMC 1313 may connect a flash memory (or a non-volatile memory (NVM)) 1320 disposed external to the AP chip 1310A to the CPU 1311, and the DMC 1314 may connect a DRAM 1330 disposed internal to the AP chip 1301A to the CPU 1311.

The device having the proposed structure may operate as one of a master device and a slave device. The master device may have a SIM card, or have a structure replacing the SIM card, and may perform an operation of transmitting NAI to at least one slave device. The slave device may have a structure for managing NAI, and may perform an operation of accessing a specific public network using the NAI provided from the master device.

When the device operates as a master device, the modem chip 1340 may obtain NAI from the information written in an NVM/SIM 1360. The modem chip 1340 may deliver the obtained NAI to the communication IF 1315. The communication IF 1315 may deliver the NAI to the CPU 1311 via the bus 1312. The CPU 1311 may provide the NAI to the communication IF 1316 via the bus 1312. The communication IF 1316 may deliver the NAI to the connectivity chip 1350 that is provided outside the AP chip 1310A. The connectivity chip 1350 may transmit the NAI to at least one slave device based on a predetermined communication scheme (e.g., Wi-Fi).

When the device operates as a slave device, the connectivity chip 1350 may receive the NAI that is transmitted from the master device based on the predetermined communication scheme (e.g., Wi-Fi). The connectivity chip 1350 may deliver the received NAI to the communication IF 1316. The communication IF 1316 may deliver the NAI to the CPU 1311 via the bus 1312. The CPU 1311 may provide the NAI to the communication IF 1315 via the bus 1312. The communication IF 1315 may deliver the NAI to the modem chip 1340 that is provided outside the AP chip 1310A. The modem chip 1340 may write the NAI provided from the AP chip 1310A in the NVM 1360. In this case, the modem chip 1340 may obtain the NAI written in the NVM 1360, and access a specific public network using the obtained NAI.

In its operation the device of FIG. 13A may perform the following steps. (1) The communication processor (CP) disposed on the modem chip 1340 may initiate a network registration procedure using (e.g.,) the NAI stored in one of DRAM memory 1330, NVM 1320, or a register associated with the modem chip 11340. (2) Once the network registration procedure is successful, the CP may then store the successfully-used NAI in the NVM/SIM 1360. (3) Thereafter, upon receiving a mobility state transfer request in the AP chip 1310A, connectivity between the device and another device may be established via a communication link using the connectivity chip 1350. (4) In conjunction with the connectivity responsive to the mobility state transfer request, the stored NAI may be fetched from the NVM/SIM 1360. (5) Then, the CP of the modem chip 1340 may transfer the NAI to the another device via the communication module IF 1315, the bus 1312, the CPU 1311, the connectivity interface 1316, the connectivity chip 1350 and ultimately the communication link established between the device of FIG. 13A and the another device.

Figure 13B:
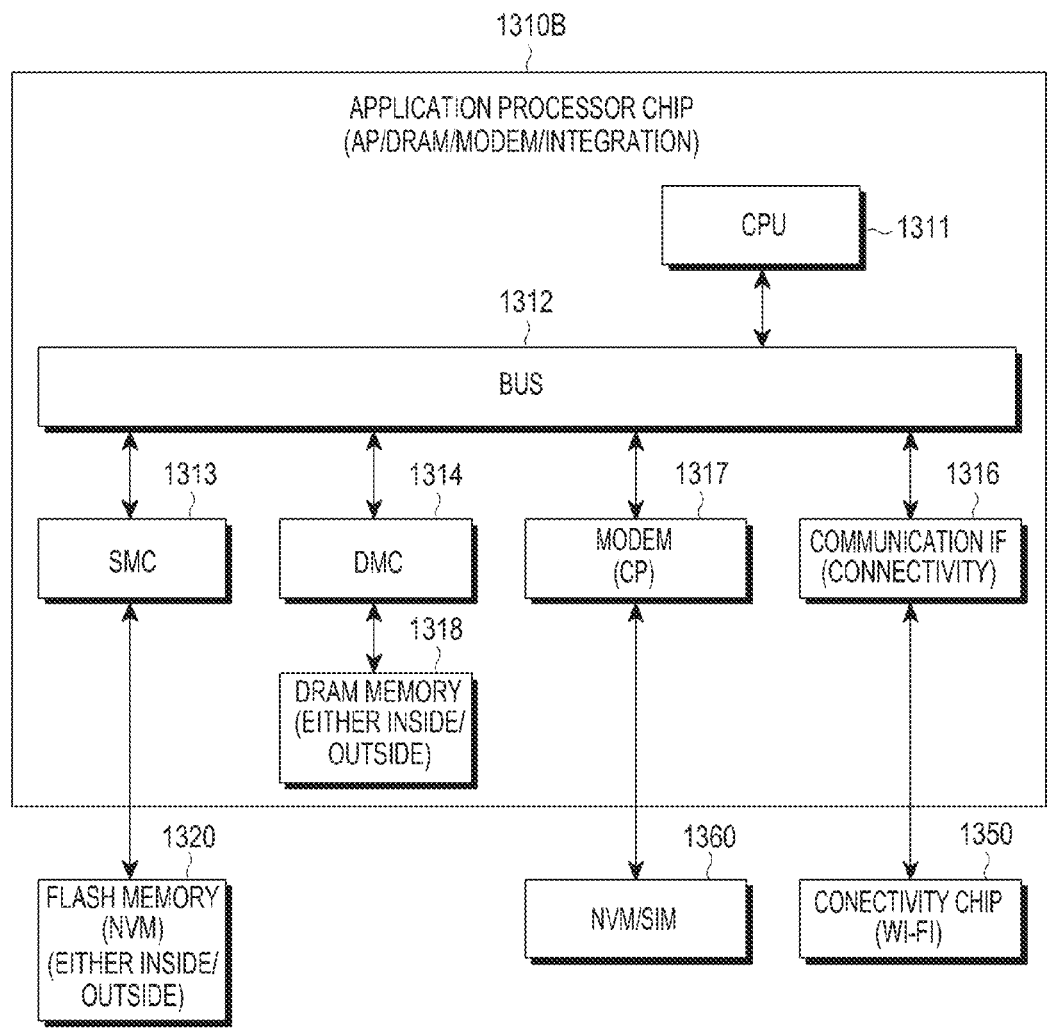

FIG. 13B illustrates an example of a device having a structure in which an AP chip includes a DRAM and a CP (e.g., a modem) according to an embodiment of the present disclosure. However, a DRAM 1318 may be disposed external to the AP chip 1310B.

Referring to FIG. 13B, the AP chip 1310B may have a structure in which the CPU 1311 is connected to the SMC 1313, the DMC 1314, the modem (e.g., CP) 1317 and the communication IF 1316 via the bus 1312. The communication IF 1316 may connect the connectivity chip 1350 disposed external to the AP chip 1310B to the CPU 1311. The modem (e.g., CP) 1317 may connect the NVM/SIM 1360 disposed external to the AP chip 1310B to the CPU 1311. The SMC 1313 may connect the flash memory (or the non-volatile memory (NVM)) 1320 disposed external to the AP chip 1310B to the CPU 1311. The DMC 1314 may connect the DRAM 1318 disposed internal to the AP chip 1310B to the CPU 1311. Alternatively, the DRAM 1318 may be disposed external to the AP chip 1310B.

The device having the proposed structure may operate as one of a master device and a slave device. The master device may have a SIM card, or have a structure replacing the SIM card, and may perform an operation of transmitting NAI to at least one slave device. The slave device may have a structure for managing NAI, and may perform an operation of accessing a specific public network using the NAI provided from the master device.

When the device operates as a master device, the modem 1317 may obtain NAI from the information written in an NVM/SIM 1360 that is disposed external to the AP chip 1310B. The modem 1317 may deliver the obtained NAI to the CPU 1311 via the bus 1312. The CPU 1311 may provide the NAI to the communication IF 1316 via the bus 1312. The communication IF 1316 may deliver the NAI to the connectivity chip 1350 that is provided outside the AP chip 1310B. The connectivity chip 1350 may transmit the NAI to at least one slave device based on a predetermined communication scheme (e.g., Wi-Fi).

The other case, the modem 1317 may obtain NAI from the information written in the NVM/SIM 1360. The modem 1317 may deliver the obtained NAI to the communication IF 1316 via the bus 1312. The communication IF 1316 may deliver the NAI to the connectivity chip 1350 that is provided outside the AP chip 1310B. The connectivity chip 1350 may transmit the NAI to at least one slave device based on a predetermined communication scheme (e.g., Wi-Fi).

When the device operates as a slave device, the connectivity chip 1350 may receive the NAI that is transmitted from the master device based on the predetermined communication scheme (e.g., Wi-Fi). The connectivity chip 1350 may deliver the received NAI to the communication IF 1316. The communication IF 1316 may deliver the NAI to the CPU 1311 via the bus 1312. The CPU 1311 may deliver the NAI to the modem 1317 via the bus 1312. The modem 1317 may write the received NAI in the NVM 1360 that is provided outside the AP chip 1310B. In this case, the CPU 1311 may obtain the NAI written in the NVM 1360 via the modem 1317 that is provided internal to the AP chip 1310B, and access a specific public network using the obtained NAI.

The other case, the connectivity chip 1350 may receive the NAI that is transmitted from the master device based on the predetermined communication scheme (e.g., Wi-Fi). The connectivity chip 1350 may deliver the received NAI to the communication IF 1316. The communication IF 1316 may deliver the NAI to the modem 1317 via the bus 1312.

The modem 1317 may obtain NAI from the information written in the NVM/SIM 1360, and access a specific public network using the obtained NAI.

Figure 13C:
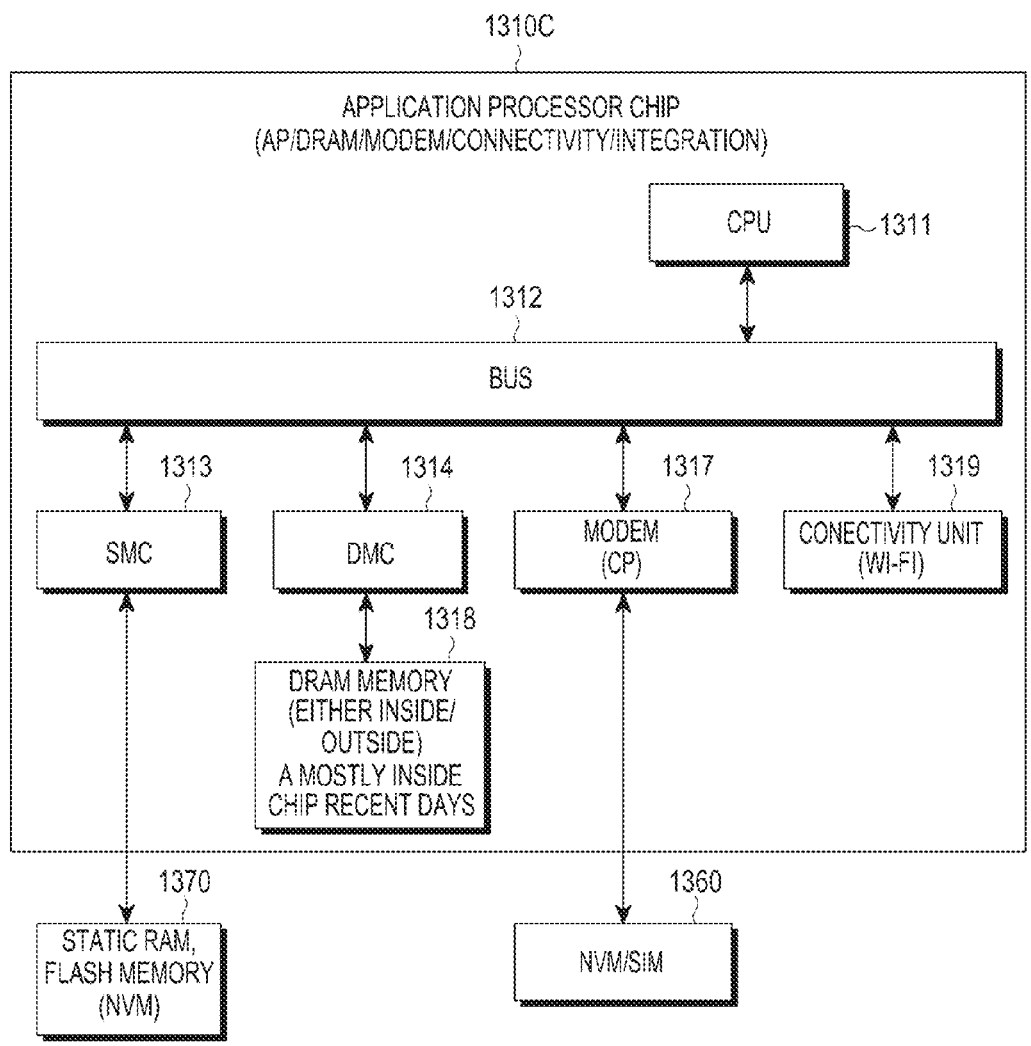

FIG. 13C illustrates another example of a device having a structure in which an AP chip includes a DRAM and a CP (e.g., a modem) according to an embodiment of the present disclosure. However, a DRAM 1318 may be disposed external to the AP chip 1310C.

Referring to FIG. 13C, the AP chip 1310C may have a structure in which the CPU 1311 is connected to the SMC 1313, the DMC 1314, the modem (e.g., CP) 1317 and the connectivity unit 1319 via the bus 1312. The modem (e.g., CP) 1317 may connect the NVM/SIM 1360 disposed external to the AP chip 1310C to the CPU 1311. The SMC 1313 may connect the flash memory (or a non-volatile memory (NVM)) 1320 disposed external to the AP chip 1310C to the CPU 1311. The DMC 1314 may connect the DRAM 1318 disposed internal to the AP chip 1310C to the CPU 1311. Alternatively, the DRAM 1318 may be disposed external to the AP chip 1310C.

The device having the proposed structure may operate as one of a master device and a slave device. The master device may have a SIM card, or have a structure replacing the SIM card, and may perform an operation of transmitting NAI to at least one slave device. The slave device may have a structure for managing NAI, and may perform an operation of accessing a specific public network using the NAI provided from the master device.

When the device operates as a master device, the modem 1317 may obtain NAI from the information written in an NVM/SIM 1360 that is disposed external to the AP chip 1310C. The modem 1317 may deliver the obtained NAI to the CPU 1311 via the bus 1312. The CPU 1311 may provide the NAI to the connectivity unit 1319 via the bus 1312. The connectivity unit 1319 may transmit the NAI to at least one slave device based on a predetermined communication scheme (e.g., Wi-Fi).

The other case, the modem 1317 may obtain NAI from the information written in an NVM/SIM 1360 that is disposed external to the AP chip 1310C. The modem 1317 may deliver the obtained NAI to the connectivity unit 1319 via the bus 1312. The connectivity unit 1319 may transmit the NAI to at least one slave device based on a predetermined communication scheme (e.g., Wi-Fi).

When the device operates as a slave device, the connectivity unit 1319 may receive the NAI that is transmitted from the master device based on the predetermined communication scheme (e.g., Wi-Fi). The connectivity unit 1319 may deliver the received NAI to the CPU 1311 via the bus 1312. The CPU 1311 may deliver the NAI to the modem 1317 via the bus 1312. The modem 1317 may write the received NAI in the NVM 1360 that is provided outside the AP chip 1310C. In this case, the CPU 1311 may obtain the NAI written in the NVM 1360 via the modem 1317 that is provided internal to the AP chip 1310C, and access a specific public network using the obtained NAI.

The other case, the connectivity unit 1319 may receive the NAI that is transmitted from the master device based on the predetermined communication scheme (e.g., Wi-Fi). The connectivity unit 1319 may deliver the received NAI to the modem 1317 via the bus 1312. The modem 1317 may write the received NAI in the NVM 1360 that is provided outside the AP chip 1310C. In this case, the modem 1317 may obtain the NAI written in the NVM 1360, and access a specific public network using the obtained NAI.

Figure 13D:
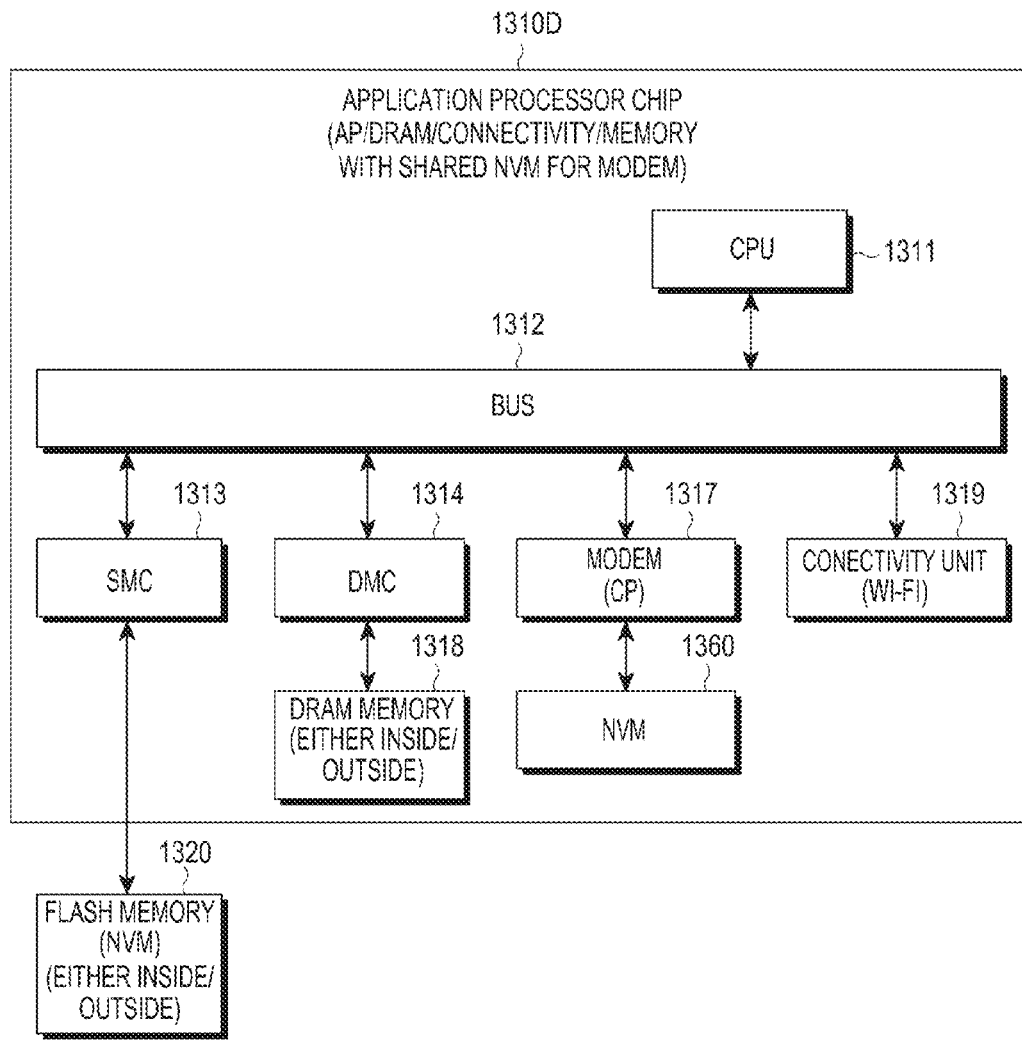

FIG. 13D illustrates another example of a device having a structure in which an AP chip includes a DRAM and a CP (e.g., a modem) according to an embodiment of the present disclosure. However, a DRAM 1318 may be disposed external to the AP chip 1310D.

Referring to FIG. 13D, the AP chip 1310D may have a structure in which the CPU 1311 is connected to the SMC 1313, the DMC 1314, the modem (e.g., the CP) 1317, and the connectivity unit 1319 via the bus 1312. The modem (e.g., CP) 1317 may connect the NVM 1360 disposed internal to the AP chip 1310D to the CPU 1311. The SMC 1313 may connect the flash memory (non-volatile memory (NVM)) 1320 disposed external to the AP chip 1310D to the CPU 1311. The DMC 1314 may connect the DRAM 1318 disposed internal to the AP chip 1310D to the CPU 1311. Alternatively, the DRAM 1318 may be disposed external to the AP chip 1310D.

The device having the proposed structure may operate as one of a master device and a slave device. When the device operates as a master device, the master device may perform an operation of transmitting NAI to at least one slave device by using the NVM 1360 on behalf of the SIM card. The slave device may have a structure for managing the NAI, and perform an operation of accessing a specific public network using the NAI provided from the master device.

When the device operates as a master device, the modem 1317 may obtain NAI from the information written in the NVM 1360 that is provided internal to the AP chip 1310D. The modem 1317 may deliver the obtained NAI to the CPU 1311 via the bus 1312. The CPU 1311 may provide the NAI to the connectivity unit 1319 via the bus 1312. The connectivity unit 1319 may transmit the NAI to at least one slave device based on a predetermined communication scheme (e.g., Wi-Fi).

The other case, the modem 1317 may obtain NAI from the information written in the NVM 1360 that is provided internal to the AP chip 1310D. The modem 1317 may deliver the obtained NAI to the connectivity unit 1319 via the bus 1312. The connectivity unit 1319 may transmit the NAI to at least one slave device based on a predetermined communication scheme (e.g., Wi-Fi).

When the device operates as a slave device, the connectivity unit 1319 may receive the NAI that is transmitted from the master device based on the predetermined communication scheme (e.g., Wi-Fi). The connectivity unit 1319 may deliver the received NAI to the CPU 1311 via the bus 1312. The CPU 1311 may deliver the NAI to the modem 1317 via the bus 1312. The modem 1317 may write the received NAI in the NVM 1360 that is provided internal to the AP chip 1310D. In this case, the CPU 1311 may obtain the NAI written in the NVM 1360 via the modem 1317 that is provided internal to the AP chip 1310D, and access a specific public network using the obtained NAI.

The other case, the connectivity unit 1319 may receive the NAI that is transmitted from the master device based on the predetermined communication scheme (e.g., Wi-Fi). The connectivity unit 1319 may deliver the received NAI to the modem 1317 via the bus 1312. The modem 1317 may write the received NAI in the NVM 1360 that is provided internal to the AP chip 1310D. In this case, the modem 1317 may obtain the NAI written in the NVM 1360, and access a specific public network using the obtained NAI.

Figure 13E:
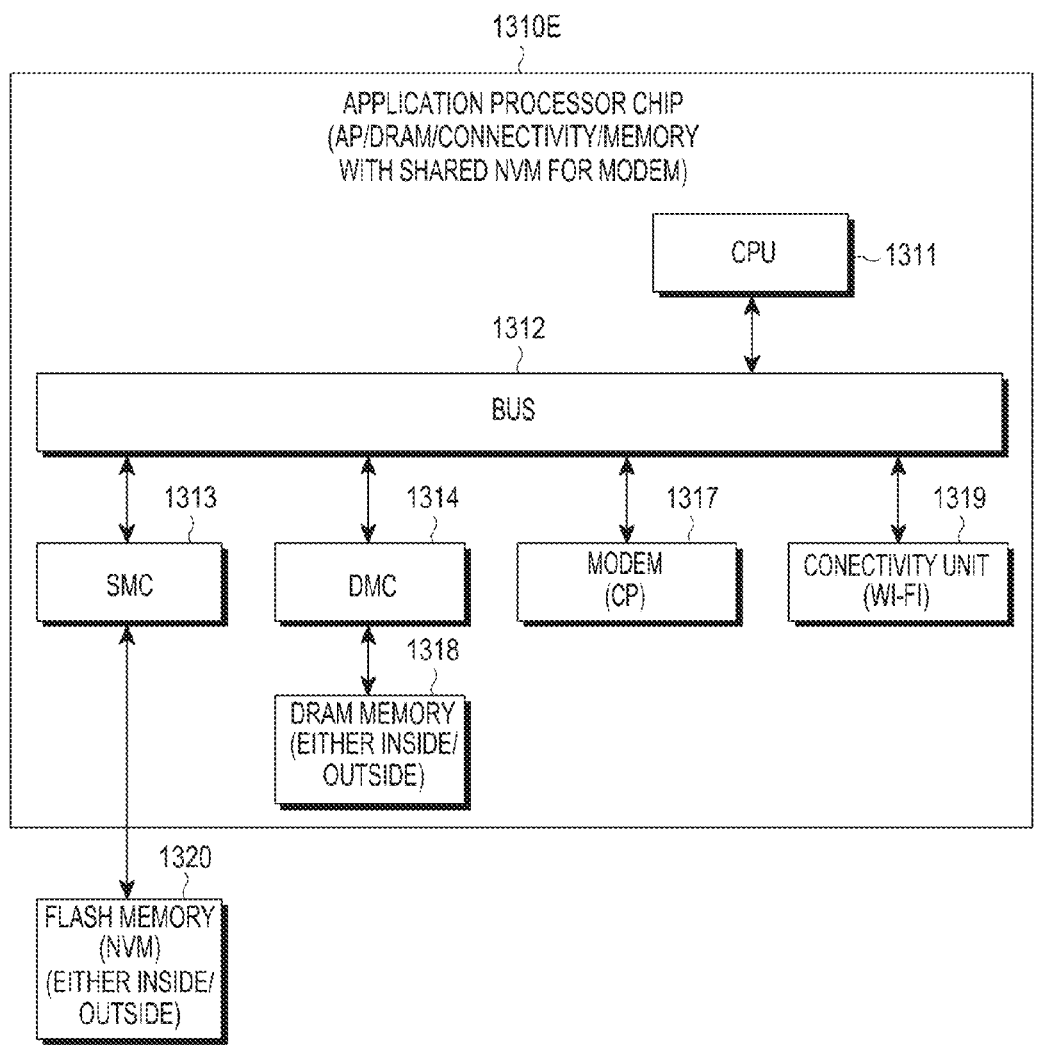

FIG. 13E illustrates another example of a device having a structure in which an AP chip includes a DRAM and a CP (e.g., a modem) according to an embodiment of the present disclosure. However, a DRAM 1318 may be disposed external to the AP chip 1310E.

The device shown in FIG. 13E may be the same in structure as the device shown in FIG. 13D. However, the NVM/SIM may be provided internal to the AP chip 1310E, and/or external to the AP chip 1310E. In this case, another component (e.g., the DRAM 1318 and the like) may perform the function corresponding to the NVM/SIM. In this case, the detailed operations in which the device operates as a master device or a slave device may be the same as described above, so a detailed description thereof will be omitted.

Figure 14:
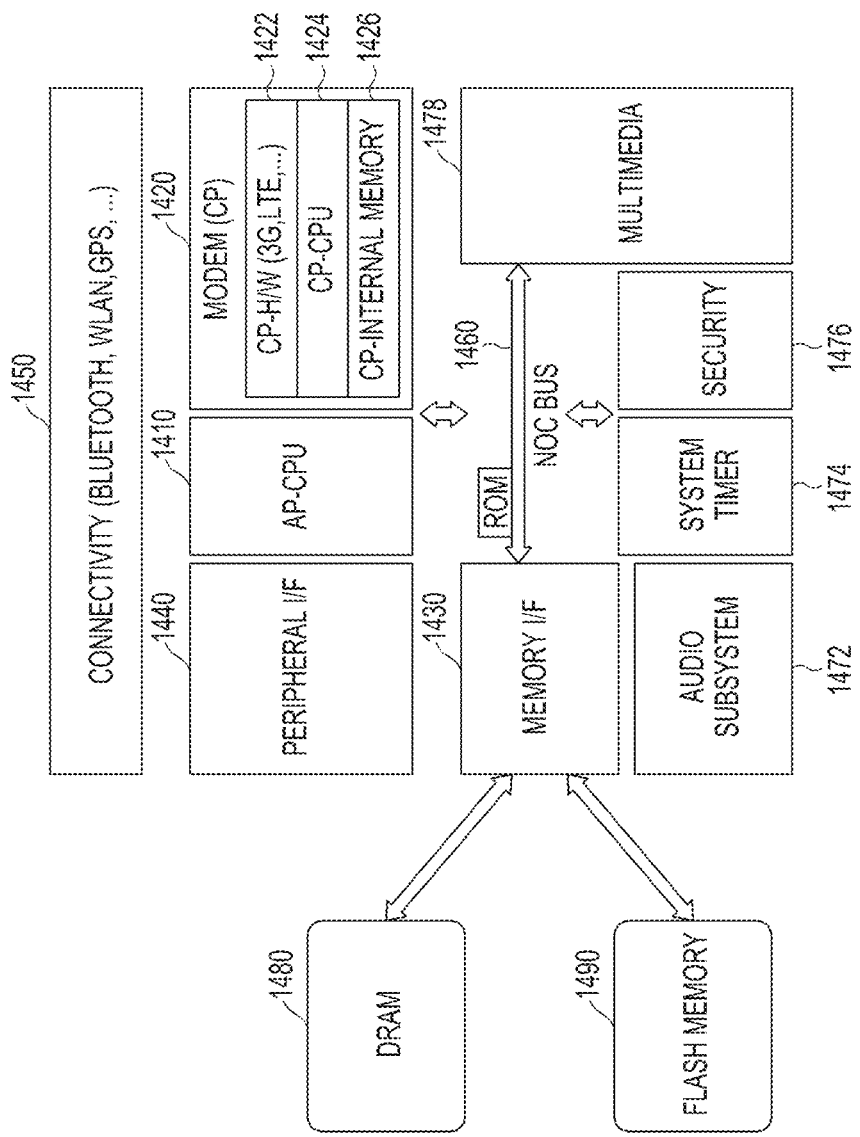
FIG. 14 is a conceptual diagram illustrating in one example a protocol stack that may be used in conjunction with user equipment according to various embodiments of the inventive concept.

FIG. 14 illustrates an example of an SoC corresponding to an IoT device according to an embodiment of the present disclosure.

Referring to FIG. 14, in the SoC corresponding to the IoT device, all of the function blocks or a combination of some of the function blocks may be configured as one chip. Herein, a modem 1422, a connectivity module 1450, a DRAM 1480, a flash memory (NVM) 1490 and the like may be configured by a separate chip.

An AP 1410 may control an operation by the components included in the SoC. The modem 1422 may perform the overall operation for cellular communication such as 3G, LTE and the like. The modem 1422 may include a CP 1424, an internal memory 1426 and other H/W. The internal memory 1426 may support a fast operation of a communication protocol.

A memory interface 1430 may perform the overall operation for information exchange with the DRAM 1480 and/or the flash memory (NVM) 1490. A peripheral interface 1440 may perform communication with at least one external device. The connectivity module 1450 may perform wireless communication with at least one external device based on a predetermined wireless protocol. A communication scheme defined by the predetermined wireless protocol may include Bluetooth, WLAN, GPS and the like. A Network on Chip (NOC) 1460 may serve as an interface for information exchange between the components included in the SoC.

In addition, the SoC may further include thereon an audio subsystem 1472, a system timer 1474, a security module 1476, a multimedia module 1478 and the like.

Figure 15:
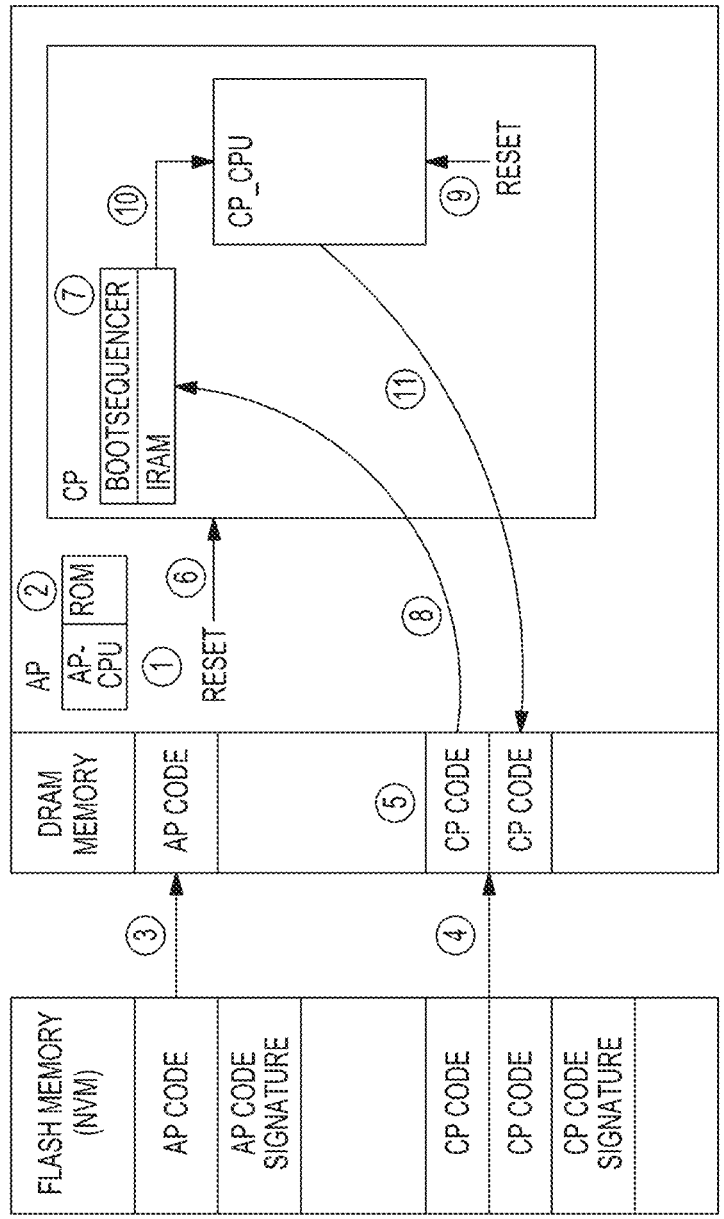
FIG. 15 is a conceptual diagram illustrating in one example an M2M mobile state transfer protocol via the mobile state transfer layer that may be used in conjunction with certain embodiments of the inventive concept.

FIG. 15 illustrates an example of a boot sequence operation in an SoC according to an embodiment of the present disclosure.

Referring to FIG. 15, an AP may initialize an internal ROM code (e.g., clock and/or stack) after initiating its operation (①), and hold a reset signal for at least one CP (②).

The AP may copy images of bootloaders BL1 and BL2 of APs from an external memory (e.g., flash memory) to an internal memory (e.g., SRAM) (③). The external boot device (e.g., flash, USB, serial flash and the like) may set the environment by Operating Mode (OM) pins. The images may be checked based on an AP code signature. In the BL1 or BL2, the AP_CPU may initialize a DRM controller. The images may be moved to a DRAM. After booted, the AP_CPU may initiate the use of the DRAM.

The AP_CPU may copy CP codes from the external memory (e.g., flash memory) to the internal memory (i.e., internal SRAM) (④). The AP_CPU may allocate a memory area for CP code/data/heap (⑤). The AP may generate a CP rest signal (⑥). At least one CP boot sequencer may initiate the CP system (⑦). The at least one CP boot sequencer may copy a CP bootloader code from the CP Internal SRAM (IRAM) to a private area of the DRAM (⑧).

A CP_PMU may generate a CP_CPU reset signal (⑨). The CP_CPU may start an operation of a CP bootloader code from the IRAM of the CP side (⑩). The CP_CPU may drive the CP code with data in the private area of the DRAM (⑪).

An operation in the CP_CPU will be described in detail below to allow a slave device to connect with the PWN based on the above-described SoC and boot sequence operation according to an embodiment of the present disclosure.

In order for the slave device to connect with the PWN, NAI (all or some of RRC, NSI, SII and the like) may be required. To this end, a CP_CPU of the master device may run an operation of delivering the NAI to the slave device using a mobile state transfer layer (CP's code). In the slave device, the NAI of the master device, which is required for connection to the PWN, may be stored even in SIM, NVM or DRAM.

In order to deliver the NAI to the slave device using the mobile state transfer layer (CP's code), the CP_CPU may use one of the following boot sequence methods of the SoC.

In a first method, the master device may load the mobile state transfer layer (CP's code) in accordance with the processes ④ and ⑤, and then additionally load it into the CP through the processes ⑥, ⑦ and ⑧. If it is necessary to deliver the NAI to the slave device, the master device may deliver the NAI to the slave device through the processes ⑨ and ⑩. The processes ⑨ and ⑩ correspond to a process in which the CP_CPU may operate the mobile state transfer layer (CP's code) that is loaded on the IRAM through the processes ⑥, ⑦ and ⑧.

In a second method, the master device may load the mobile state transfer layer (CP's code) that is written in the flash memory, into a predetermined area of the DRAM or the internal memory through the processes ④ and ⑤. If it is necessary to deliver the NAI to the slave device, the master device may deliver the NAI to the slave device through the process ⑪. The process ⑪ corresponds to a process in which the CP_CPU may drive the mobile state transfer layer (CP's code) that is loaded on the DRAM after the process ⑤.

In a third method, if it is necessary to deliver the NAI to the slave device while the mobile state transfer layer (CP's code) is not loaded on the DRAM (a memory in which a program can be run), the master device may deliver the NAI to the slave device in accordance with the proposal in the second method.

For the delivery of the NAI in accordance with the proposed three methods, a method of outputting an output signal including the NAI generated by the CP_CPU to the outside using the mobile state transfer layer (CP's code) may be used. For example, in the CP_CPU, the NAI may be output to the outside of the modem (or SoC) through the connectivity or cable, without passing through the AP. In addition, in the CP_CPU, the NAI may be output to the outside of the modem (or SoC) through the connectivity or cable, passing through the AP. As described above, if the delivery of the NAI (all or some of RRC, NSI, SII and the like) from the master device to the slave device is required in order for the slave device to connect with the PWN, the mobile state transfer layer (CP's code) stored in the NVM may be run by the CP or the CP_CPU of the SoC. In order to run the mobile state transfer layer (CP's code) stored in the NVM, the proposed approaches (a), (b) and (c) may be used. Through the running of the mobile state transfer layer (CP's code) by the CP or the CP_CPU of the SoC, the NAI may be delivered from the master device to the slave device in the form of a signal. For the delivery of the signal including the NAI, the mobile state transfer layer (CP's code) may be used.

Figure 16:
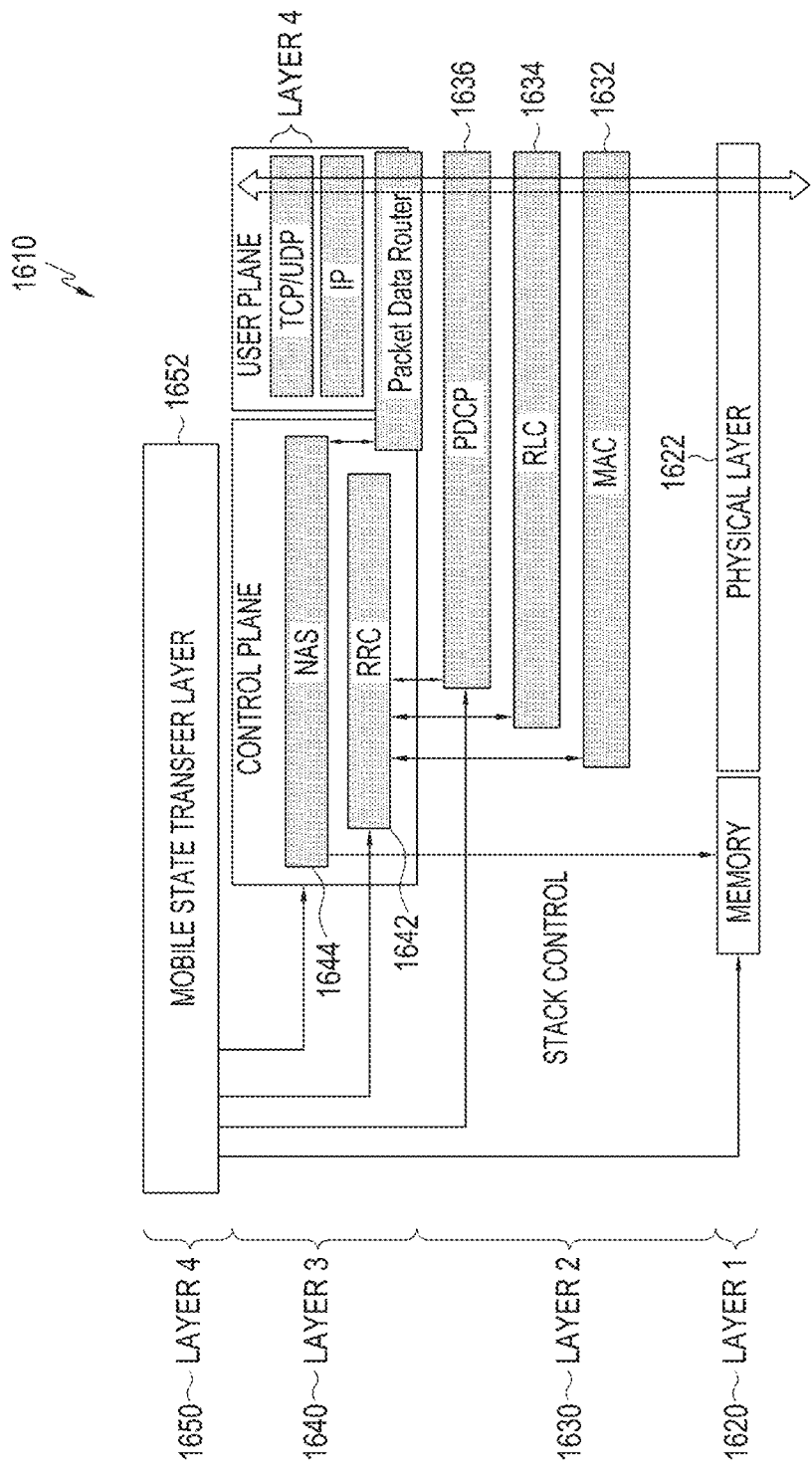
FIG. 16 is a conceptual diagram illustrating various examples of control and data planes of a slave device operating in stand-alone mode verses a relay mode.

FIG. 16 is a conceptual diagram illustrating in one example various protocol stack layers of a UE according to certain embodiments of the inventive concept.

Referring to FIG. 16, an example 1610 of protocol stack components of a UE is shown. The protocol stack components may include one or more of a first layer 1620, a second layer 1630, a third layer 1640, and a fourth layer 1650.

The first layer 1620 may comprise a physical layer 1622 that may carry all information from the medium access layer (MAC) transport channels over the air interface.

The second layer 1630 may comprise one or more of a MAC 1632, a radio link control (RLC) 1634, and a packet data convergence control (PDCP) 1636. The MAC 1632 may be responsible for mapping between logical channels and transport channels. The RLC 1634 may be responsible for transfer of upper layer PDUs, error correction through ARQ, concatenation, segmentation, and reassembly of RLC SDUs. The PDCP 1636 may be responsible for header compression and decompression of IP data, transfer of data (e.g., user plane or control plane), and maintenance of PDCP sequence numbers (SNs).

A third layer 1640 may comprise one or more of the RRC 1642 and the NAS 237. The RRC 1642 may include broadcast of system information related to NAS 237, AS, paging, establishment, maintenance and release of an RRC 1642 connection between the UE, security functions including key management, establishment, configuration, maintenance, and release of point to point radio bearers. The NAS 1644 may be the highest stratum of the control plane before the mobile state transfer layer between the UE and MME 1130. The NAS 1644 may support the mobility of the UE and the session management procedures to establish and maintain IP connectivity between the UE and a PWN 140.

A fourth layer 1650 may comprise the mobile state transfer layer 1652. If the UE is a master device, the mobile state transfer layer 1652 may transfer the NAI 210 saved in the SIM of the master device to a slave device. If the UE is a slave device, the mobile state transfer layer 1652 may receive the NAI 210 from a master device to save in the NVM of the slave device.

Figure 17:
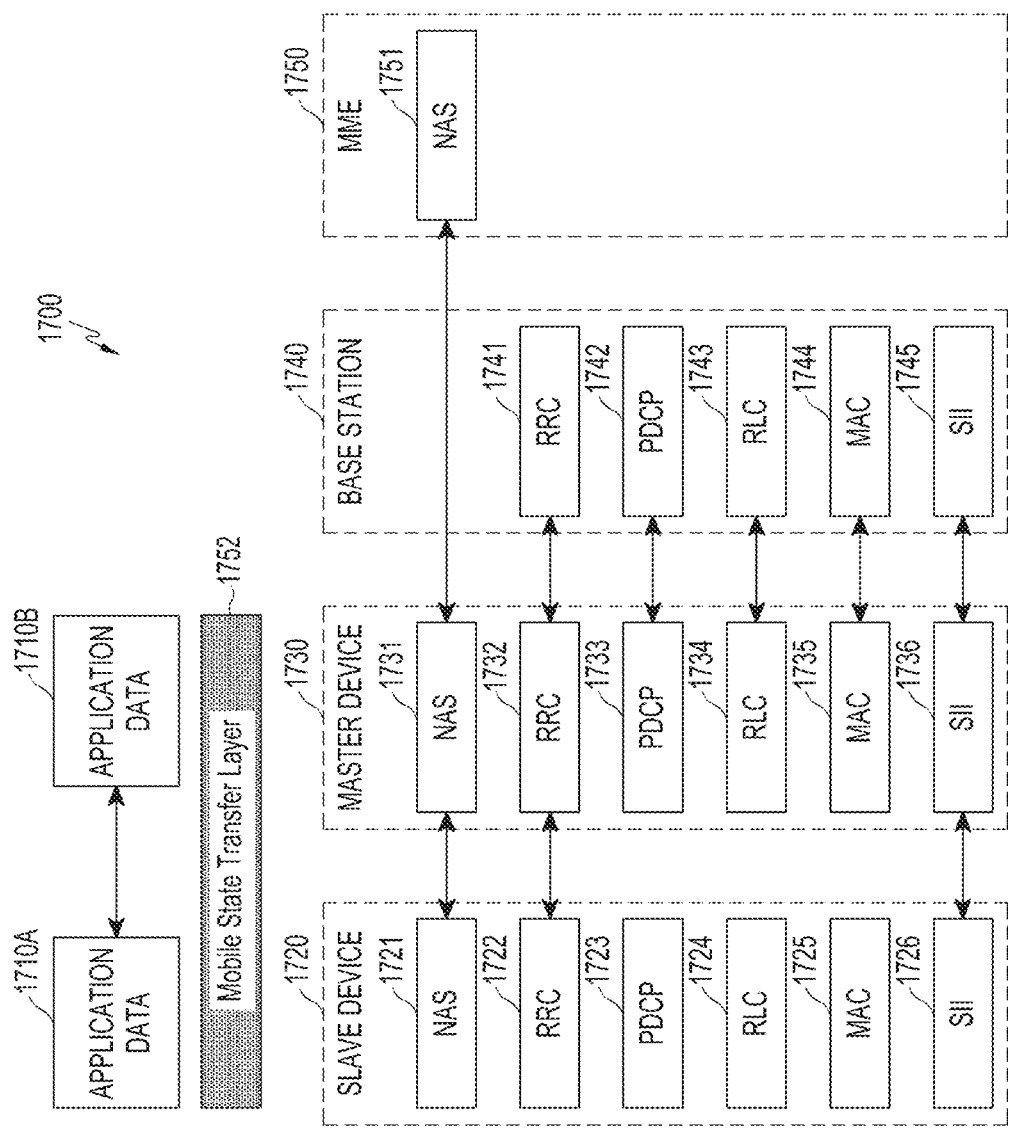
FIG. 17 is a block diagram illustrating in one example a M2M mobile state transfer protocol 1700 via the mobile state transfer layer according to an embodiment of the inventive concept.

FIG. 17 is a block diagram illustrating in one example a M2M mobile state transfer protocol 1700 via the mobile state transfer layer according to an embodiment of the inventive concept.

Referring to FIG. 17, an example of M2M mobile state transfer protocol 1700 includes a slave device 1720, a master device 1730, a base station 1740 (e.g., eNB), and MME 1750.

The master device 1730 is connects to the base station 1740 with the RRC 1732, 1741, PDCP 1733, 1742, RLC 1734, 1743, MAC 1735, 1744, and SII 1736, 1745. The master device 1730 connects to the MME 1750 with the NAS 1731, 1751. The mobile state transfer layer 1752 transfers the NAS 1721, 1731, 1751, RRC 1722, 1732, 1741, SII 1726, 1736, 1745, and application data 1710A, 1710B from the master device 1730 to the slave device 1720 via the communication link (e.g., Wi-Fi, BT, NFC). The slave device 1720 then contains the NAI 210 in order to connect to the PWN 140.

Figure 18A:
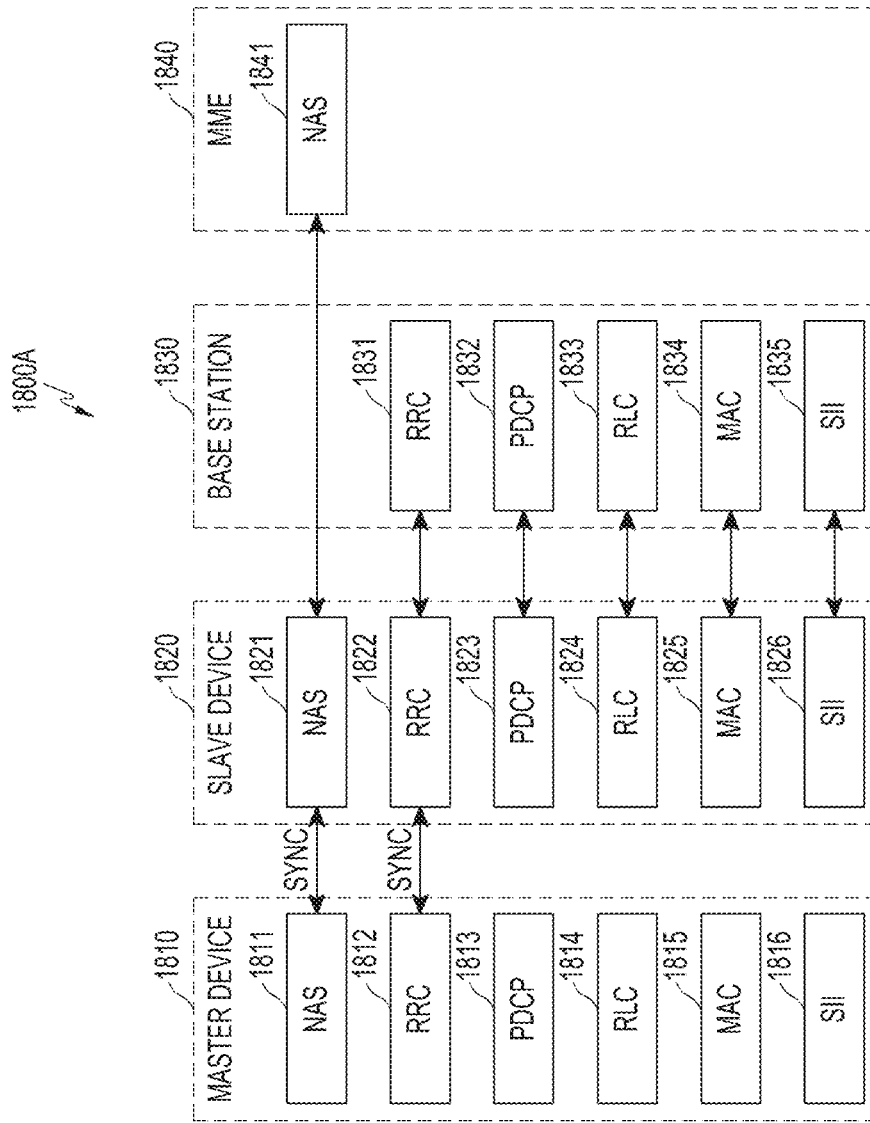
FIGS. 18A, 18B and 18C are respective examples of control and data planes of a slave device 1820 operating in stand-alone mode and relay mode in accordance with certain embodiments of the inventive concept.
Figure 18B:
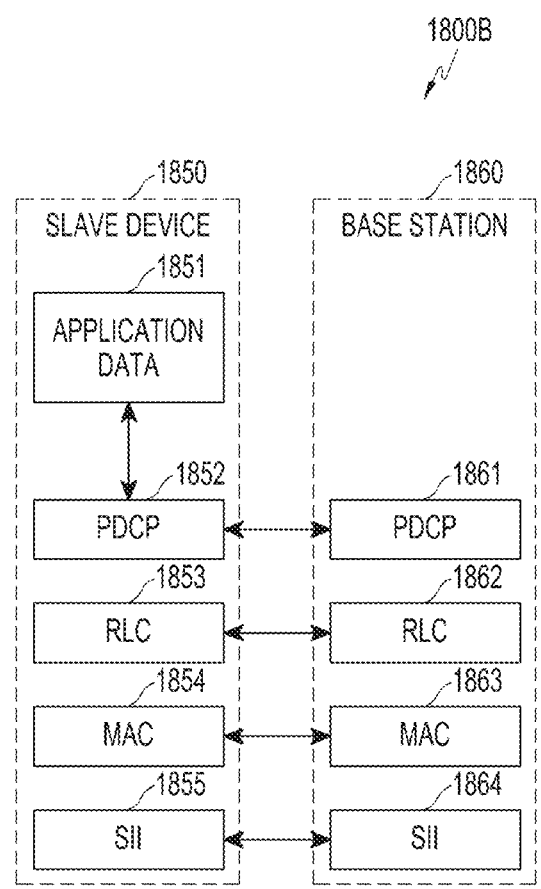
Figure 18C:
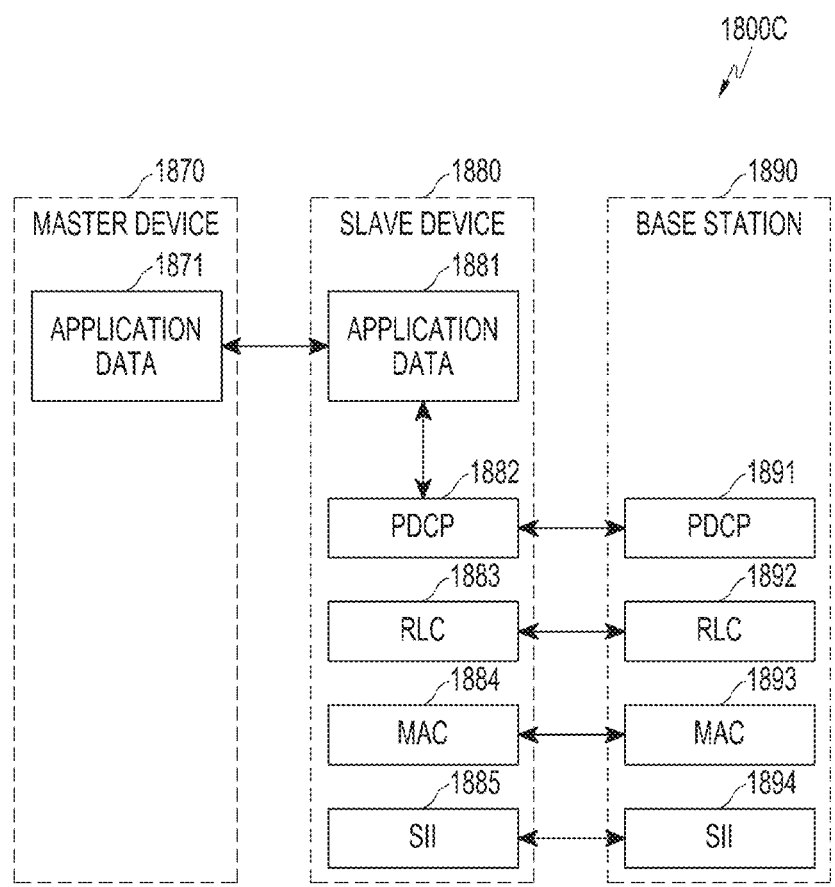

FIGS. 18A, 18B and 18C are respective examples of control and data planes of a slave device 1820 operating in stand-alone mode and relay mode in accordance with certain embodiments of the inventive concept.

Referring to FIG. 18A, 1800A is an example of the control plane of the slave device 1820 in either stand-alone or relay mode. One the master device 1810 has transferred the NAI 210 (e.g., NAS 1811, 1821, RRC 1812, 1822, and SII 1816, 1826) to the slave device 1820, the slave device 1820 may replace the master device 1810. Example 1800A shows the control plane of the slave device 1820 in both stand-alone mode and relay mode. The slave device 1820 is connected to the base station 1830 with the RRC 1822, 1831, PDCP 1823, 1832, RLC 1824, 1833, MAC 1825, 1834, and SII 1826, 1835 and the slave device 1820 is connected to the MME 1840 with the NAS 1821, 1841. The slave device 1820 accesses the PWN 140 (e.g., base station 1830, MME 1840) on behalf of the master device 1810. The slave device 1820 sends updated NAS 1811, 1821 and RRC 1812, 1822 to the master device 1810.

Referring to FIG. 18B, 1800B is an example of the data plane of the data plane of the slave device in stand-alone mode. The slave device 1850 receives application data 1851 from the PWN 140 (e.g., base station 1860, MME). The slave device 1850 does not relay application data 1851 to the master device.

Referring to FIG. 18C, 1800C is an example of the data plane of the data plane of the slave device in relay mode. The slave device 1880 receives application data 1881 from the PWN 140 (e.g., base station 1890, MME). The slave device 1880 transfers application data 1881 from the PWN 140 (e.g., base station 1890, MME) via the communication link (e.g., Wi-Fi, BT, NFC, etc.) to the master device 1870. The slave device 1880 acts as a moving base-station.

If the slave is in relay mode, the mobile state transfer layer 1652 transfers application data 1881, 1871 between the slave device 1880 and the master device 1870 via the communication link. If the slave device is in stand-alone mode, the mobile state transfer layer 1652 does not transfer application data 1881, 1871 between the slave device 1880 and the master device 1870.

Figure 19:
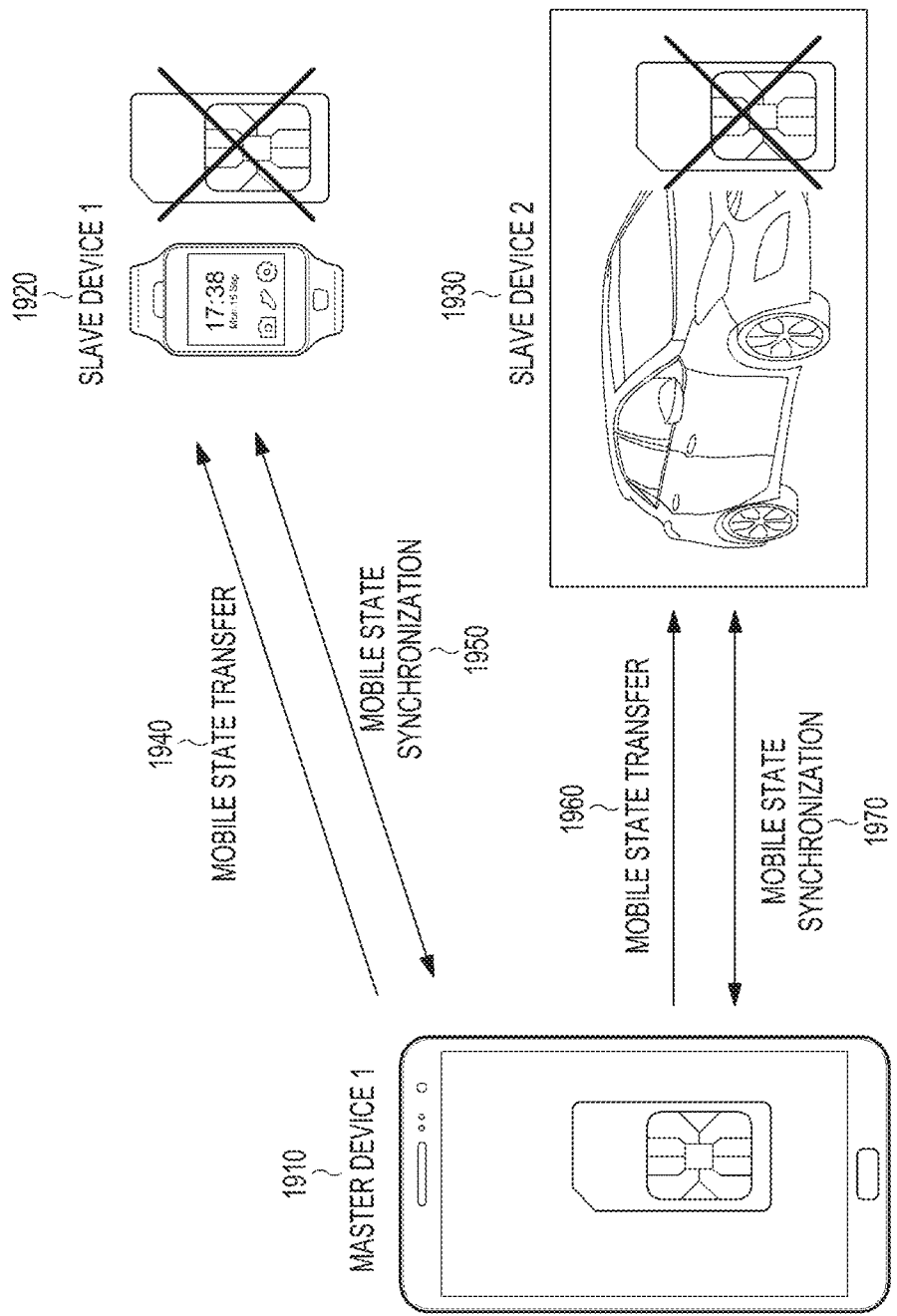
FIG. 19 illustrates an example of implementation in which one NAI is shared by multiple devices according to an embodiment of the present disclosure.

FIG. 19 illustrates an example of implementation in which one NAI is shared by multiple devices according to an embodiment of the present disclosure.

Referring to FIG. 19, one master device 1910 may have a SIM card including subscriber identification information and the like, and two slave devices 1920 and 1930 may not have a SIM card. The one master device 1910 and the two slave devices 1920 and 1930 are each assumed to support D2D communication. Among the two slave devices, the first slave device 1920 may be a smart watch, and the second slave device 1930 may be a vehicle.

The master device 1910 may hand over the mobile state to the first and/or second slave devices 1920 and 1930 in operations 1940 and 1960. For example, handing over the mobile state may correspond to an operation that the master device 1910 provides the NAI to the slave devices.

Upon receiving the mobile state that is handed over, the first and/or second slave devices 1920 and 1930 may perform mobile state synchronization with the master device 1910 in operations 1950 and 1970, which allows the master device 1910 and the first and second slave devices 1920 and 1930 to shave their operation states with each other.

Figure 20:
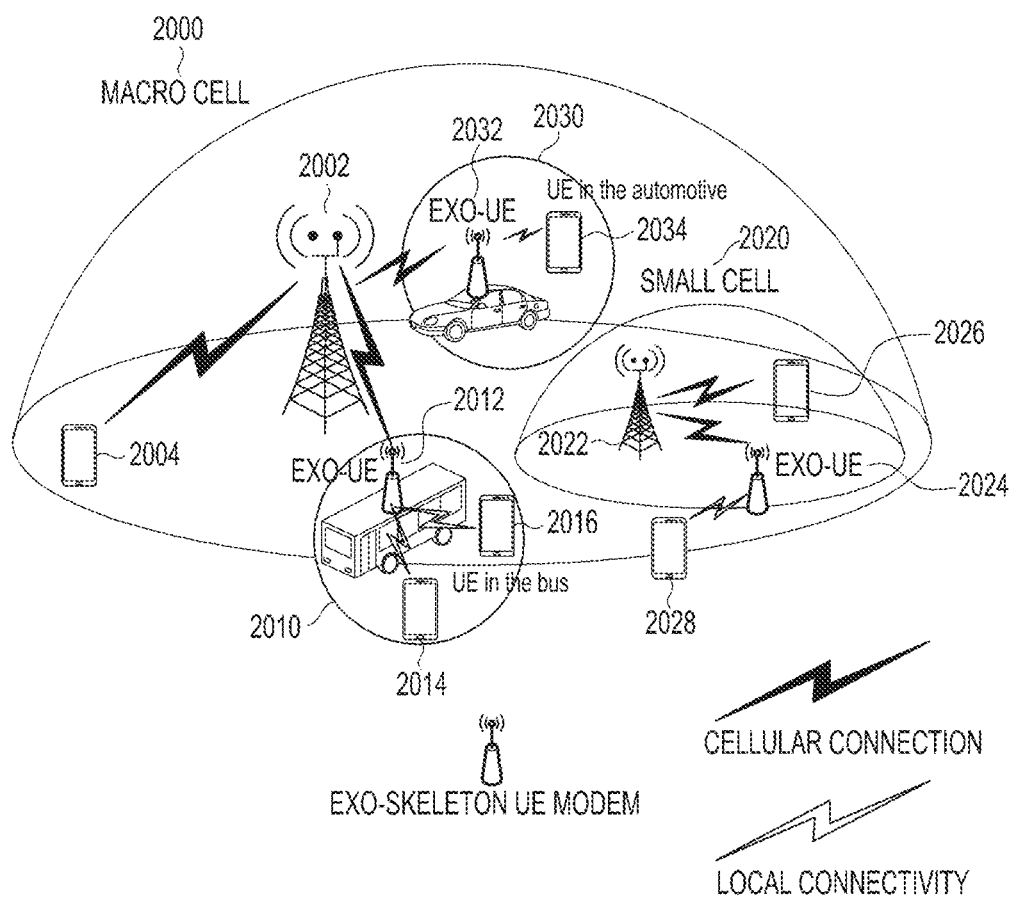
FIG. 20 illustrates examples of various implementations according to an embodiment of the present disclosure.

FIG. 20 illustrates examples of various implementations according to an embodiment of the present disclosure.

Referring to FIG. 20, a base station 2002 may form one macro cell 2000 as a service area. Heterogeneous devices may be present in the macro cell 2000. A device (e.g., a master device) with a USIM card mounted therein may perform communication with the base station 2002 through direct or indirect path.

It is shown that a master device 2004 performs direct communication with the base station 2002. In addition, there are shown three cases in which the master device 2004 performs communication with the base station 2002 through an indirect path.

The first case is an example of implementation in which the master device corresponds to a UE located in a bus. For example, master devices 2014 and 2016 may be located in a bus. Each of the master devices 2014 and 2016 may be connected by the D2D scheme and a relay device (EXO-US) 2012 mounted in the bus. Each of the master devices 2014 and 2016 may provide its own USIM information to the relay device (EXO-US) 2012 through a D2D connection. In this case, the relay device (EXO-US) 2012 may connect the master devices 2014 and 2016 to the base station 2002 using the USIM information provided from each of the master devices 2014 and 2016. In other words, the relay device (EXO-US) 2012 may operate as a slave device of the master devices 2014 and 2016.

A second case is an example of implementation in which the master device corresponds to UE 2026 and 2028 located in a small cell 2020. For example, a relay device 2022 may form the small cell 2020 as a service area. Obviously, the relay device 2022 may perform cellular communication with the base station 2002.

The first master device 2026 may be connected to the relay device 2022 based on a predetermined wireless communication scheme to provide its own USIM information to the relay device 2022. In this case, the relay device 2022 may be a slave device of the first master device 2026, and the relay device 2022 may connect the first master device 2026 to the base station 2002 using the USIM information.

A heterogeneous device (EXO-UE) 2024 may be present in the small cell 2020. The heterogeneous device (EXO-UE) 2024 may be connected to the small cell 2020 based on a communication scheme such as D2D.

The second master device 2028 may be connected to the heterogeneous device (EXO-UE) 2024 based on a predetermined wireless communication scheme to provide its own USIM information to the heterogeneous device (EXO-UE) 2024. In this case, the heterogeneous device (EXO-UE) 2024 may connect the second master device 2028 to the base station 2002 through the relay device 2022 using the USIM information.

A third case is an example of implementation in which the master device corresponds to a UE located in a vehicle. For example, a master device 2034 may be located in a vehicle. The master device 2034 may be connected to a slave device (EXO-US) 2032 mounted in the vehicle by the D2D scheme. The master device 2034 may provide its own USIM information to the slave device (EXO-US) 2032 through a D2D connection. In this case, the slave device (EXO-US) 2032 may connect the master device 2034 to the base station 2002 using the USIM information that is provided from the master device 2034.

In one embodiment, the base station 2002, the slave devices 2012, 2022 and 2032, the relay device 2022 forming the small cell 2020, and the slave device 2024 may have a cellular connectivity. The slave devices 2012, 2022, 2032 and 2024 and the master devices 2014, 2016, 2028 and 2034 may have a local connectivity.

Figure 21:
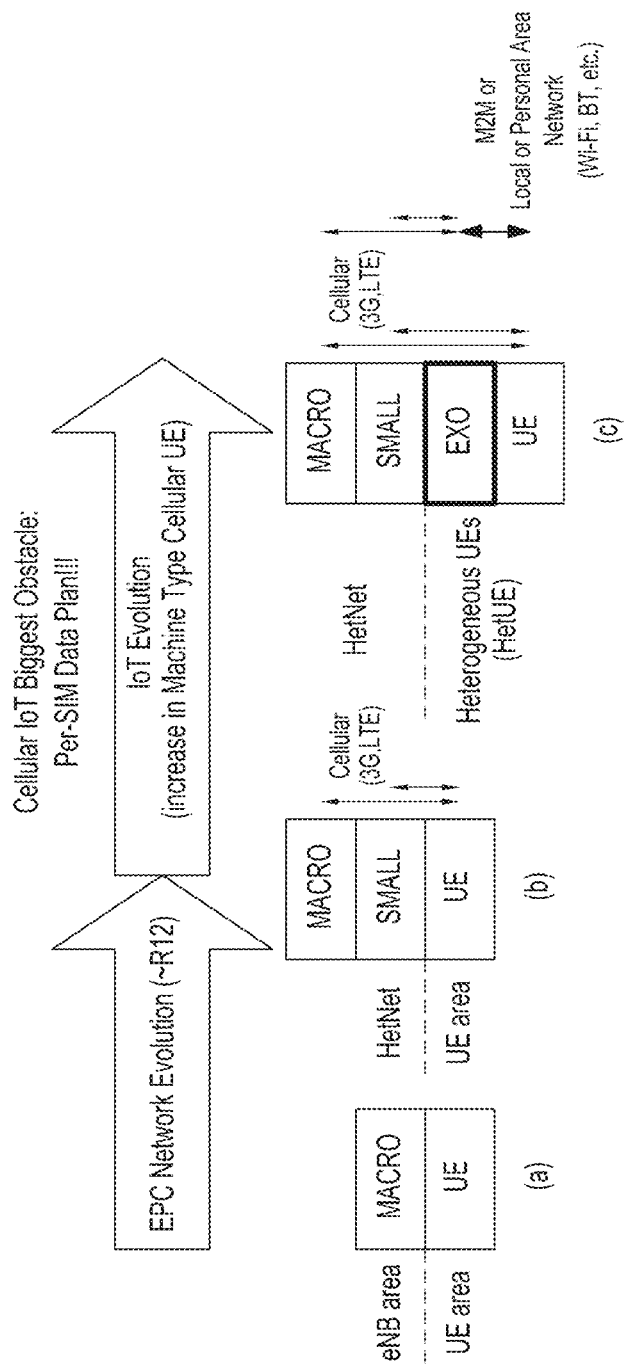
FIG. 21 illustrates a network structure in which an embodiment of the present disclosure may be implemented.

FIG. 21 illustrates a network structure in which an embodiment of the present disclosure may be implemented.

Referring to FIG. 21, the network structure may include (a) a structure in which a UE may directly access a macro cell, (b) a structure in which a UE may access a macro cell via a small cell, and (c) a structure in which a UE may access a small cell via a slave device (e.g., heterogeneous UE (HetUE)), and access a macro cell via the small cell. The UE and the HetUE may be connected to each other based on M2M, or local or personal area network (e.g., Wi-Fi, BT, etc), and the other components may be connected to each other based on a cellular network (e.g., 3G, LTE, etc).

FIG. 22 illustrates the effects expected by an embodiment of the present disclosure, i.e., illustrates the gains from the perspective of heterogeneous UE (HetUE) 2200, subscribers 2210, operators 2220, and chipset venders and UE manufacturers 2230.

Referring to FIG. 22, the subscribers 2210 may reduce the costs of utilizing the communication network such as the cellular network, and may enjoy data services with low-cost devices. In addition, the subscribers 2210 may not only increase the user's throughput and reduce the power consumption of portable devices, but also simplify the on-demand installation and reselect devices without interruption.

The chipset venders &UE manufacturers 2230 may enable discriminatory selection for the Exo-skeleton features, may not require changes in silicon, and may improve the UE performances (w.o. less stringent battery & size limits).

The operators 2220 may obtain high revenue due to the increase in traffic, and support data services for low-cost devices. In addition, the operators 2220 may enable the higher spectral efficiency, the low deployment cost, no impact on the network and the possible fast technology adoption.

Obviously, various embodiments proposed in the present disclosure may be applied based on Internet of Tings (IoT) devices. The IoT devices may be any devices that can exchange information with at least one other device. The IoT devices may have no limitation on the type of resources that the IoT devices can use for information exchange with other devices. In other words, the IoT devices may support information exchange based on at least one of wired resources and wireless resources.

The IoT devices may include an accessible interface, for information exchange. The accessible interface may include a modem communication interface that can access at least one of a wired local area network (LAN), a wireless local area network and a mobile cellular network. The wireless local area network may be a network that can support Bluetooth (BT), Wireless Fidelity (Wi-Fi), Zigbee and the like, and the mobile cellular network may be a network that can support 3rd Generation (3G), Long Term Evolution (LTE) and the like.

Figure 23A:
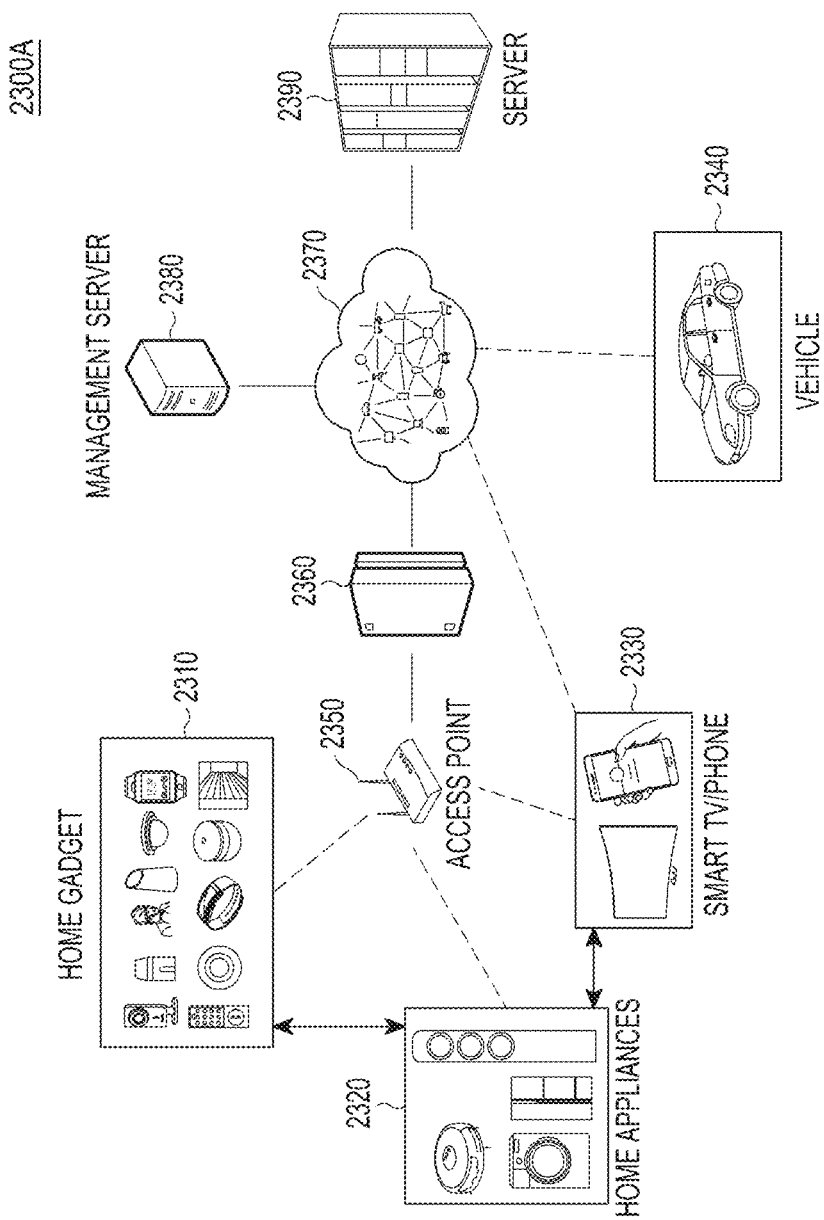
FIGS. 23A and 23B illustrate an example of an IoT system according to various embodiments of the present disclosure.
Figure 23B:
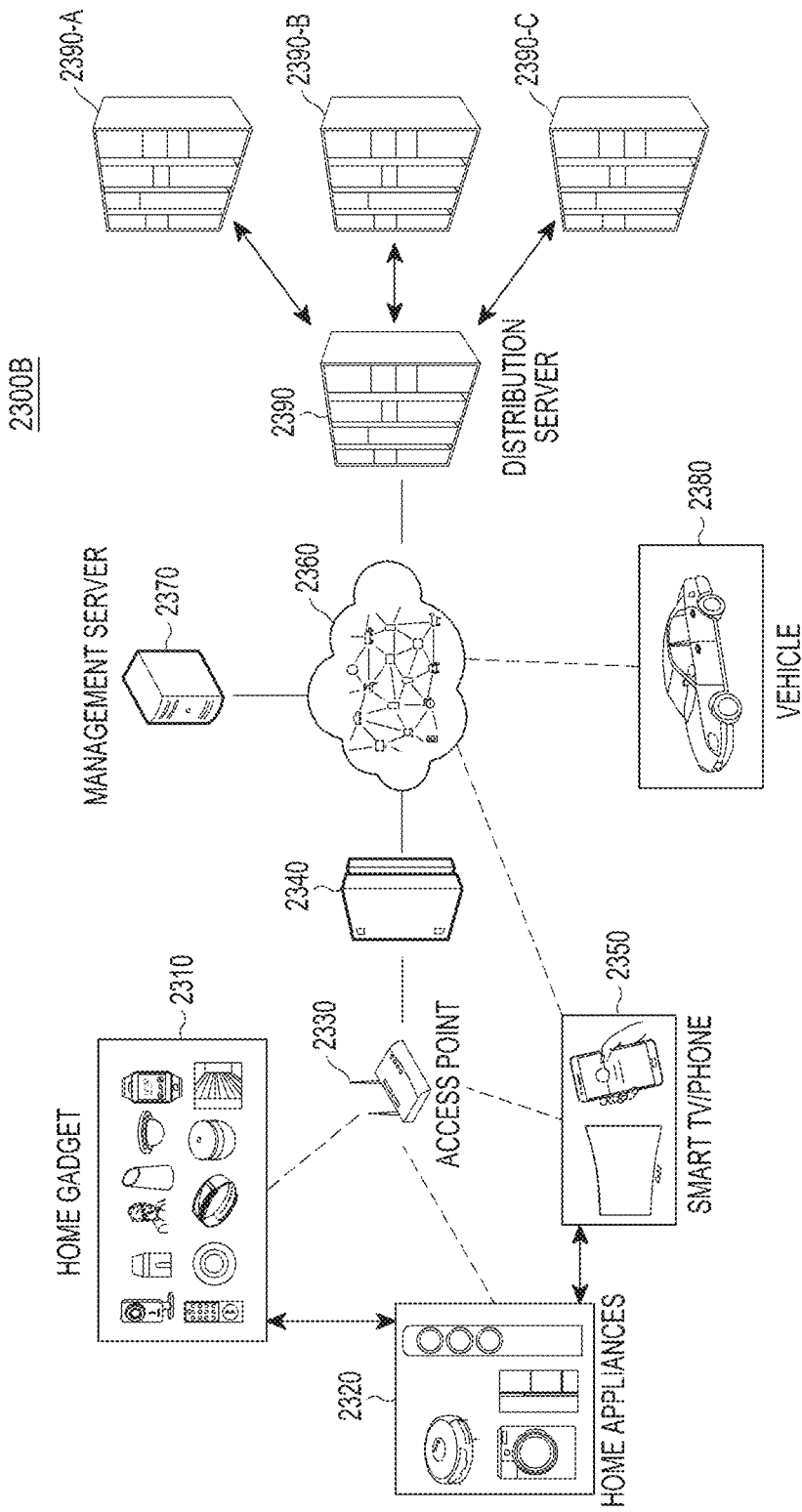

FIGS. 23A and 23B illustrate an example of an IoT system according to various embodiments of the present disclosure.

Referring to FIG. 23A, an IoT system 2300A may include multiple IoT devices 2310, 2320, 2330 and 2340, an access point (AP) 2350, a gateway (GW) 2360, a communication network (CN) 2370, at least one server, and the like. The at least one server may include a management server 2380.

The multiple IoT devices 2310, 2320, 2330 and 2340 may be divided into active devices and passive devices. The active devices may be devices that can generate an operating voltage by themselves, and operate based thereon. For example, the active devices may be refrigerators, air conditioners, telephones, cars and the like. The passive devices may be devices that operate based on the power applied by external devices and the like. For example, the passive devices may include Radio Frequency Identification (RFID) tags or NFC tags.

According to one embodiment, the IoT devices 2310, 2320, 2330 and 2340 may collect data using sensors, and transmit the collected data to external devices based on a predetermined communication protocol. The IoT devices 2310, 2320, 2330 and 2340 may receive control information and/or data based on a predetermined communication protocol. The predetermined communication protocol may be a protocol that supports communication services based on the wired/wireless local area network, the Internet, or the mobile cellular network.

The IoT devices 2310, 2320, 2330 and 2340 may directly access the communication network without the help of other devices in accordance with the predetermined communication protocol. For example, the IoT device 2340 such as a vehicle may directly access the communication network 2370 based on the predetermined communication protocol. The other IoT devices 2310, 2320 and 2330 may access the communication network 2370 with the help of other devices. Among the IoT devices 2310, 2320 and 2330 that can access the communication network 2370 with the help of other devices, the easy-to-move IoT device 2330 such as a smart phone, a tablet PC and the like may support a communication protocol that is used to directly access the communication network 2370.

The AP 2330 may connect the multiple IoT devices 2310, 2320 and 2330 to the communication network 2370 via the GW 2360, or may connect them to at least one other IoT device. The AP 2330 may be provided independently, or may be embedded in another IoT device.

As an example, the AP 2330 may be embedded in a television. In this case, the user may monitor or control at least one IoT device connected to the AP 2330, on a display of the television.

As another example, a smart phone may perform a function of an AP in addition to its own unique function. In this case, the smart phone may be connected to the communication network 2370 in order to perform its own unique function, and may also connect the IoT device to the communication network 2370 or other IoT devices.

The GW 2360 may change the protocol so as to connect the AP 2350 to the external communication network 2370 (e.g., the Internet or the public communication network). The GW 2360 may connect at least one IoT device that is connected via the AP 2350, to the external communication network 2370. The GW 2360, together with the AP 2350, may be configured as one device, or may be incorporated into one device. The AP 2350 may perform a function of a first gateway, and the GW 2360 may perform a function of a second gateway.

The GW 2360 may be provided independently, or may be embedded in another IoT device. As an example, the smart phone may perform a function of a GW in addition to its own unique function. In this case, the smart phone may be connected to the communication network 2370 in order to perform its own unique function, and may also connect the IoT device to the communication network 2370.

The communication network 2370 may include the Internet and/or the public communication network. The public communication network may be classified into a wired communication network and a wireless communication network depending on the type of the resources supported by the public communication network. The public communication network may include a mobile cellular network. As an example, the communication network 2370 may provide a path (e.g., a channel or the like) via which the communication network 2370 can deliver the information collected by the IoT devices 2310, 2320, 2330 and 2340 to a server 2390 or thither devices.

The server 2390 may collect the information provided by the IoT devices 2310, 2320, 2330 and 2340 through the communication network 2370. The server 2390 may store and manage the collected information based on a predetermined format, or reproduce the information through analysis. The server 2390 may provide the analysis result and/or the reproduced information to another server and/or IoT device through the communication network 2370.

For example, the server 2390 may collect information about the user's blood glucose from the IoT device in real time. In this case, the server 2390 may analyze the user's health condition based on the collected blood glucose information, and manage the analysis result and/or report the analysis result to the IoT device. In order to analyze the user's health condition, the server 2390 may refer to a predetermined glucose threshold and the existing health condition analysis results. As a result of the analysis, if it is determined that the user is in a critical state, the server 2390 may transmit information indicating the user's risk situation to a pre-registered IoT device.

The management server 2380 may operate the communication network 2370 and/or perform subscriber management and the like. For example, the management server 2380 may operate and manage the public communication network, and allow only the IoT device of a previously allowed subscriber to access the public communication network operated by the management server 2380.

The multiple IoT devices 2310, 2320, 2330 and 2340 may be grouped. As an example, the multiple IoT devices 2310, 2320, 2330 and 2340 may be grouped in consideration of their unique characteristics. In other words, the multiple IoT devices 2310, 2320, 2330 and 2340 may be grouped as a home gadget group 2310, an household appliance group 2320, an entertainment group 2330, a transport group (or vehicle group) 2340, and the like. In addition, the multiple IoT devices 2310, 2320, 2330 and 2340 may be grouped as a temperature control group for controlling the room temperature, a home appliance group (that is divided into a large home appliance group and a small home appliance group depending on the power consumption), a cleaning group for controlling room clearing (e.g., air cleaning and floor cleaning), a lighting group for controlling indoor lightings, and an entertainment group for controlling entertainment devices (e.g., a TV, an audio device and the like). The temperature control group may include air conditioners, electric windows, electric curtains and the like.

The IoT devices may belong to one group or multiple groups. For example, the air conditioner may belong to the large home appliance group and the temperature control group. The smart phone may belong to the home gadget group 2310 and the entertainment group 2330.

FIG. 23B illustrates an example of an IoT system that further includes a distributed server in addition to the IoT device in FIG. 23A.

Referring to FIG. 23B, an IoT network system 2300B may include various components included in the IoT network system 2300A shown in FIG. 23A. For example, the IoT network system 2300B may further include a distributed server 2390 in addition to the IoT network system 2300A. Since the components substantially the same as those in FIG. 23A are substantially the same in configuration and operation, a detailed description thereof will be omitted herein for convenience.

The distributed server 2390 may include multiple sub-servers 2390-A, 2390-B and 2390-C, or may be connected to the multiple sub-servers 2390-A, 2390-B and 2390-C via a backhaul link and the like. The distributed server 2390 may distribute the job to be processed, to at least one sub-server 2390-A, 2390-B or 2390-C. In other words, the distributed server 2390 may process the job to be processed, by the sub-servers 2390-A, 2390-B and 2390-C in a distributed manner, and may perform scheduling for the distributed processing.

For example, the distributed server 2390 may analyze the request that is transmitted through the communication network 2360 by the scheduling, and may predict the amount of associated data and the amount of job based on the analysis result. The distributed server 2390 may distribute the requested job by communicating with at least one of the multiple sub-servers 2390-A, 2390-B and 2390-C depending on the prediction result. In this case, the distributed server 2390 may receive status information for each of the multiple sub-servers 2390-A, 2390-B and 2390-C, and reflect the received status information during scheduling. The distributed sever 2390 may improve the overall performance of the IoT network system by scheduling.

In one embodiment in which reference is made to FIGS. 23A and 23B, among the multiple IoT devices 2310, 2320, 2330 and 2340, an IoT device that is allowed to access the multiple communication network 2370 may deliver network access information to the AP 2350 or at least one IoT device. In this case, the AP 2350 or at least one IoT device may succeed in connecting with the communication network 2370 based on the network access information.

For example, if the AP 2350 succeeds in connecting with the communication network 2370 based on the network access information, the AP 2350 may connect at least one IoT device that is connected to the AP 2350, to the communication network 2370. In this case, the at least one IoT device that is connected to the AP 2350 should not necessarily have the network access information.

If multiple IoT devices request their connections to the communication network 2370, the AP 2350 may schedule the connections. For example, the AP 2350 may determine the connection order for the multiple IoT devices that have requested their connections to the communication network 2370, in consideration of the priority and the like.

The AP 2350 may monitor whether the IoT device that has provided the network access information is out of its service area, and control the AP device 2350 or other IoT devices to connect with the communication network 2370, based on the monitoring result. For example, if the communication link to the IoT device that has provided the network access information is cut off (or lost), the AP 2350 may discard the network access information that the AP 2350 has held. In this case, the AP 2350 may no longer be allowed to access the communication network 2370.

Figure 24:
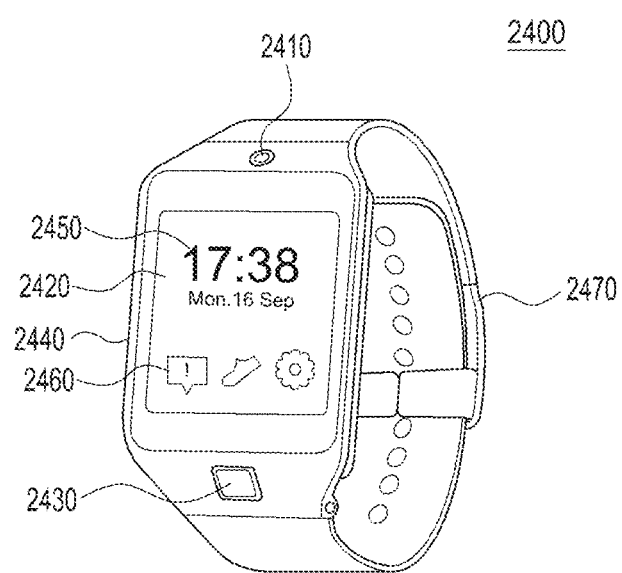
FIG. 24 illustrates an appearance of a smart watch as an example of an IoT device according to an embodiment of the present disclosure.

FIG. 24 illustrates an appearance of a smart watch as an example of an IoT device according to an embodiment of the present disclosure.

Referring to FIG. 24, an IoT device 2400 may include at least one sensor 2410 for connecting information about the surrounding. The sensor 2410 may sense at least one of ambient temperature, illuminance, UV index, speed, image information and the like. Preferably, the position where the sensor 2410 is mounted may be determined depending on the sensing required conditions.

For example, if the sensor 2410 is a sensor for measuring the user's heart rate, the sensor 2410 should be mounted in the position where the sensor 2410 can be attached to the body part at which the user's heart rate can be measured. If the sensor 2410 is a UV sensor for measuring a UV index, the sensor 2410 should be mounted in such a manner that it is able to sense the surrounding light environment.

The IoT device 2400 may include a display 2420. The display 2420 may display internal state information 2450 of the IoT device 2400. The display 2420 may include a touch sensor (not shown). In this case, the display 2420 may detect the touch point, touch direction and touch type by the user, using the touch sensor.

The display 2420 may have an input/output function and appearance for user interface. For example, the display 2420 may display at least one icon 2460 and an input/output menu on its screen. In this case, the user may control the IoT device 2400 through the touch sensor and the user interface.

The IoT device 2400 may further include a button 2430 as an input device. In this case, the user may change the state of the IoT device 2400 to an active state or turn on the display 2420, using the button 2430. The display 2420 may be used to display the top menu of the user interface.

The IoT device 2400 may further include a package 2440 supporting at least one of the sensor 2410, the display 2420 and the button 2430. The package 2440 may be attached to a particular target, using a support 2470. For example, the support 2470 may be a wrist band.

The IoT device 2400 may have a slot (not shown) into which a SIM card can be inserted. The user may access the communication network based on the information (e.g., subscriber identification information and the like) written on the SIM card inserted into the slot of the IoT device 2400, or the network access information provided from another IoT device.

Figure 25:
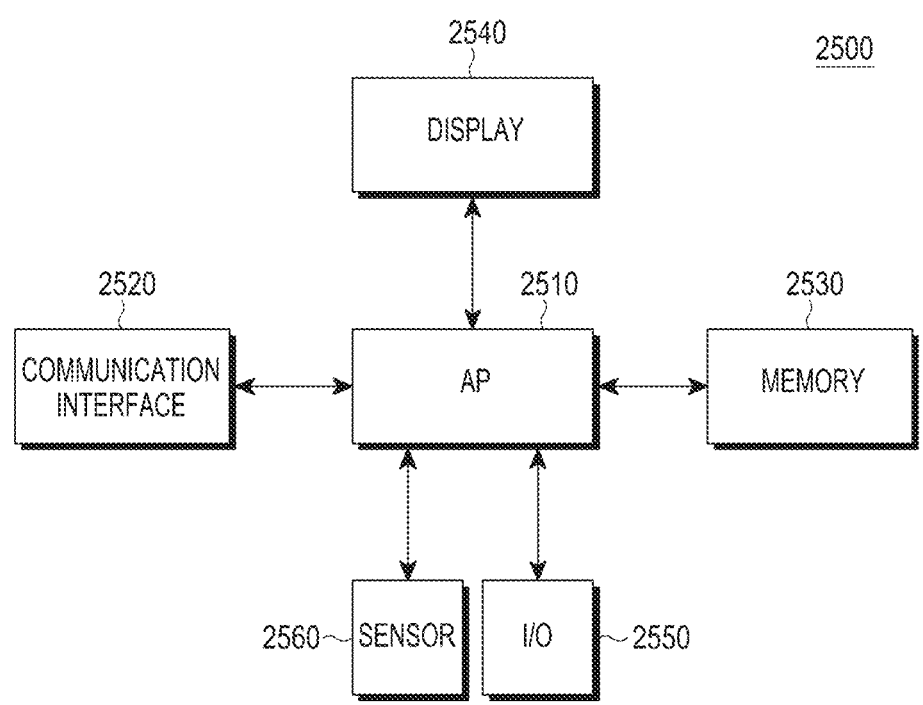
FIG. 25 illustrates an example of a configuration of an IoT device according to an embodiment of the present disclosure.

FIG. 25 illustrates an example of a configuration of an IoT device according to an embodiment of the present disclosure.

Referring to FIG. 25, an IoT device 2500 may include a processor (e.g., application processor (AP)) 2510, a transmitter/receiver 2520, a memory 2530, a display 2540, an I/O interface 2550, and a sensor 2560. The IoT device 2500 may have a built-in battery for internally supplying power, or further include a power supply for externally supplying power.

The transmitter/receiver 2520, which corresponds to a communication interface, may perform communication with external devices. The communication interface 2520 may be a wireless local communication interface such as a local area network (LAN), Bluetooth, wireless fidelity (Wi-Fi), Zigbee and the like, or a modem communication interface that can access a mobile cellular network such as 3rd generation (3G), long term evolution (LTE) and the like.

The communication interface 2520 may include a transmitter and/or receiver. The transmitter and/or receiver may transmit and/or receive information through an AP or a GW. The IoT device 2500 may transmit and/or receive control information or data by communicating with the user or other IoT devices. In other words, the IoT device 2500 may transmit an internal state and/or data to the outside through the transmitter, and receive a control command and/or data from the outside through the receiver.

The processor may perform an operation for information processing. For example, the AP 2510, which is one of the processors, may run applications installed in the IoT device 2500 and process an operation corresponding thereto.

The display 2540 may provide a UI to the user. In this case, the user may control the IoT device 2500 based on the UI provided on the display 2540.

The memory 2530 may store a control command code for controlling the IoT device 2500, control data or user data. The memory 2530 may include at least one of a volatile memory or a nonvolatile memory. The nonvolatile memory may include at least one of various memories such as a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM) and the like. The volatile memory may include at least one of various memories such as dynamic RAM (DRAM), static RAM (SRAM), synchronous DRAM (SDRAM), phase-change RAM (PRAM), magnetic RAM (MRAM), resistive RAM (RRAM), ferroelectric RAM (Fe-RAM) and the like.

The IoT device 2500 may further include a storage device in addition to the memory 2530. The storage device may be a nonvolatile medium such as a hard disk drive (HDD), a solid state drive (SSD), an embedded multimedia card (eMMC), a universal flash storage (UFS) and the like. The storage device may store user information, collected sensing information and the like.

Figure 26:
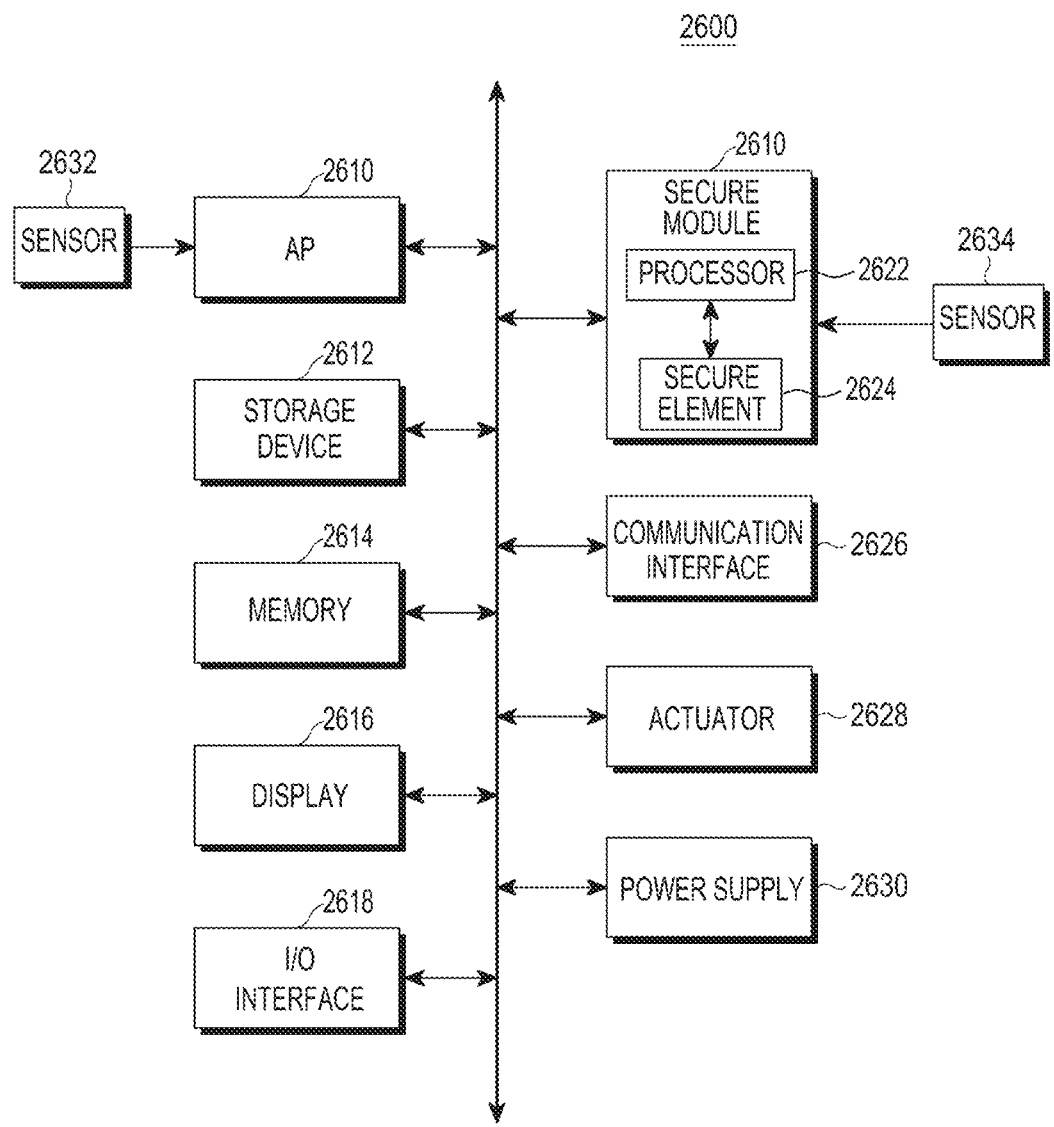
FIG. 26 illustrates another example of a configuration of an IoT device according to an embodiment of the present disclosure.

FIG. 26 illustrates another example of a configuration of an IoT device according to an embodiment of the present disclosure.

Referring to FIG. 26, an IoT device 2600 may include an AP 2610, a communication interface 2626, a secure module 2620, a storage device 2612, a memory 2614, a display 2616, an I/O interface 2618, a data bus 2636, a power supply 2630 and/or at least one sensor 2632 and 2634.

The AP 2610 may control the overall operation of the IoT device 2600. The AP 2610 may run applications that provide Internet browser, games, videos and the like. According to an embodiment of the present disclosure, the AP 2610 may include a single-core processor, or multi-core processor. For example, the AP 2610 may include a multi-core processor such as a dual-core processor, a quad-core processor and a hexa-core processor. According to the illustrated embodiment of FIG. 26, the AP 2610 may further include a cache memory that is disposed external to and/or internal to the AP 2610.

The secure module 2620 may include a processor 2622 and a secure element 2624. The secure module 2620 including the processor 2622 and the secure element 2624 may be formed as one package. An internal bus INT_BUS connecting the processor 2622 to the secure element 2624 may be formed internal to the package. The secure element 2624 may include a function capable of defending the attacks (e.g., lab attacks) from the outside. Therefore, the secure element 2624 may securely store the security data. The processor 2622 may be connected to the AP 2610.

The sensor 2632 may be an image sensor for sensing images and the like. If the sensor 2632 is connected to the AP 2610, the sensor 2632 may transmit the image information generated by image sensing to the AP 2610. The image sensor 2634 may be a biosensor for sensing biometric information and the like. For example, the sensor 2634 may detect a fingerprint, an iris pattern, a vein pattern, a heart rate, blood glucose and the like, and generate sensing data corresponding to the detection, and may provide the generated sensing data to the processor 2622 included in the secure module 2620. However, the sensor 2632 and the sensor 2634 are not limited to a specific sensor (e.g., an image sensor or a biosensor), and may be any sensor such as an illuminance sensor, an acoustic sensor, an acceleration sensor and the like.

The secure module 2620 and the AP 2610 may generate a session key through mutual authentication. For example, the secure module 2620 and the AP 2610 may perform mutual authentication using a first certificate CT1 stored in the secure element 2624, a second certificate CT2 stored in the AP 2610, and a public key CA_PB of the certification authority, which is stored in common in the AP 2610 and the secure element 2624.

Upon succeeding in the mutual authentication, the secure module 2620 and the AP 2610 may generate a session key using a first private key PR1 stored in the secure element 2624 and a second private key PR2 stored in the AP 2610.

The secure module 2620 may encode sensing data SSD using the generated session key, and transmit the encoded sensing data SSD to the AP 2610. The AP 2610 may acquire sensing data SSD by decoding the sending data encoded by the secure module 2620, using the generated session key.

Due to the above-described operation, the IoT device 2600 may improve the security level in accordance with the data transmission. The secure element 2624, together with the AP 2610, may be formed as one package.

The secure module 2620 may further include the processor 2622. The processor 2622 may encrypt the sensing data SSD provided from the sensor 2634. The processor 2622 may control communication between the AP 2610 and the secure element 2624. In this case, the secure element 2624, together with the processor 2622, may be formed as one package.

The storage device 2612 may store a boot image for booting the IoT device 2600. For example, the storage device 2612 may include a nonvolatile memory device such as a flash memory device, an SSD and the like.

The memory 2614 may store the data required for operation of the IoT device 2600. For example, the memory 2614 may include a volatile memory such as DRAM, SRAM and the like.

The I/O interface 2618 may include an input means such as a touch pad, a keypad, an input button and the like, and an output means such as a display, a speaker and the like. The power supply 2630 may supply an operating voltage required for operation of the IoT device 2600. The power supply 2630 may include a power supply unit and/or a battery.

According to an embodiment of the present disclosure, the IoT device 2600 may be any mobile system such as a mobile phone, a smart phone, a personal digital assistant (PDA), a portable multimedia player (PMP), a digital camera, a music player, a portable game console, a navigation system, a laptop computer and the like.

Figure 27:
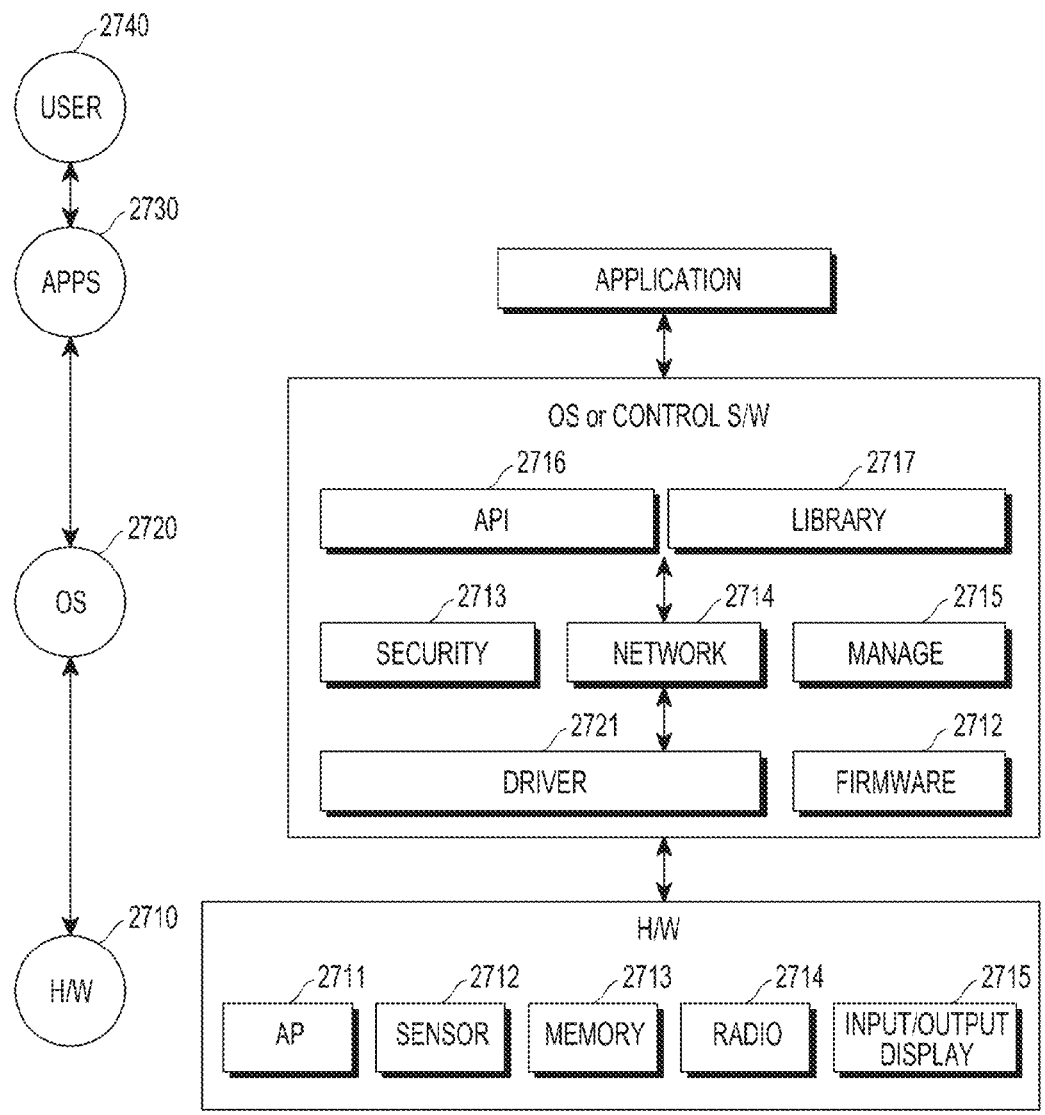
FIG. 27 conceptually illustrates the hardware (HW) and software (SW) structure of an IoT device according to an embodiment of the present disclosure.

FIG. 27 conceptually illustrates the hardware (HW) and software (SW) structure of an IoT device according to an embodiment of the present disclosure.

Referring to FIG. 27, the IoT device may define an operation among the layers of hardware (HW) 2710, an operating system (OS) 2720, an application (APPS) 2730 and a user 2740.

The hardware 2710 of the IoT device may include multiple components. The hardware 2710 of the IoT device may include an AP 2711, a sensor 2712, a memory 2713, a communication interface 2714, an I/O interface & display 2715 and the like. For example, the AP 2711, the sensor 2712, the memory 2713 and the communication interface 2714 may correspond to the AP 2510, the sensor 2560, the memory 2530 and the communication interface 2520 shown in FIG. 25, respectively. The I/O interface & display 2715 may corresponds to the I/O interface 2618 and the display 2616 shown in FIG. 26. The IoT device may further include the OS 2720 and/or the application (Apps) 2730.

The application 2730 means software (s/w) and service that implement a particular function. The user 2740 means an object that uses the application 2730. The user 2740 may communicate with the application 2730 through user experience (UX). The application 2730 may be made on the basis of each service purpose, and may communicate with the user 2740 through the UI corresponding to each purpose. The application 2730 may perform the operation requested by the user 2740. The application 2730 may call contents of an application protocol interface (API) 2716 and a library 2717 under the necessity.

The API 2716 and the library 2717 may perform a macro operation that is responsible for a specific function, and provide an interface if communication with the lower layer is required. If the application 2730 requests an operation from the lower layer through the API 2716 and the library 2717, the API 2716 and the library 2717 may classify the incoming requests into fields of security 2713, network 2714 and manage 2715.

The API 2716 and the library 2717 may operate the required layer depending on the requested field. For example, when requesting a function related to the network 2714, the API 2716 may transmit a required parameter to the layer of the network 2714, and call the related function. The network 2714 may communicate with the lower layer to perform the requested operation. If the lower layer is not present, the API 2716 and the library 2717 may directly perform the operation requested for the network 2714.

A driver 2721 included in the OS 2720 may serve to deliver, to the layer of the H/W 2710, the request that is classified in an upper layer, while managing the H/W 2710 and checking the status. If the driver 2721 requests an operation from the layer of the H/W 2710, a firmware 2712 included in the OS 2720 may convert the request so that the layer of the H/W 2710 may accept the request. The firmware 2712 for converting a request and delivering the converted request to the H/W 2710 may be implemented to be incorporated into the driver 2721 or the H/W 2710.

The IoT device may include the driver 2721 and the firmware 2712 from the API 2716, and may have the OS 2720 built therein for managing the whole of the IoT device. The OS 2720 may be stored in the memory 2713 in the form of a control command code and data. As an example, since a low-cost IoT device with a simple function is small in size of the memory, the low-cost IoT device may include control software instead of the OS.

The H/W 2710 may perform in-order or out-of-order processing on the requests (or commands) delivered by the driver 2721 and the firmware 2712, and store the processing results in a register in the H/W 2701, or in the memory 2713 connected to the H/W 2710. The stored processing results may be returned to the driver 2721 and the firmware 2712.

The H/W 2710 may request the operation required in the upper layer by generation an interrupt. If the interrupt occurs, the part of the manage 2715 in the OS 2720 may check the interrupt, and then process the interrupt by communicating with the core part of the H/W 2710. For example, if a character 'R' is input through a keyboard constituting the H/W 2710, the interrupt may be delivered to the manage 2715 in the OS 2720, or may directly delivered to the core of the H/W 2710. The core part of the H/W 2710 may output a value 'R' to the display through a predetermined function block.

Figure 28:
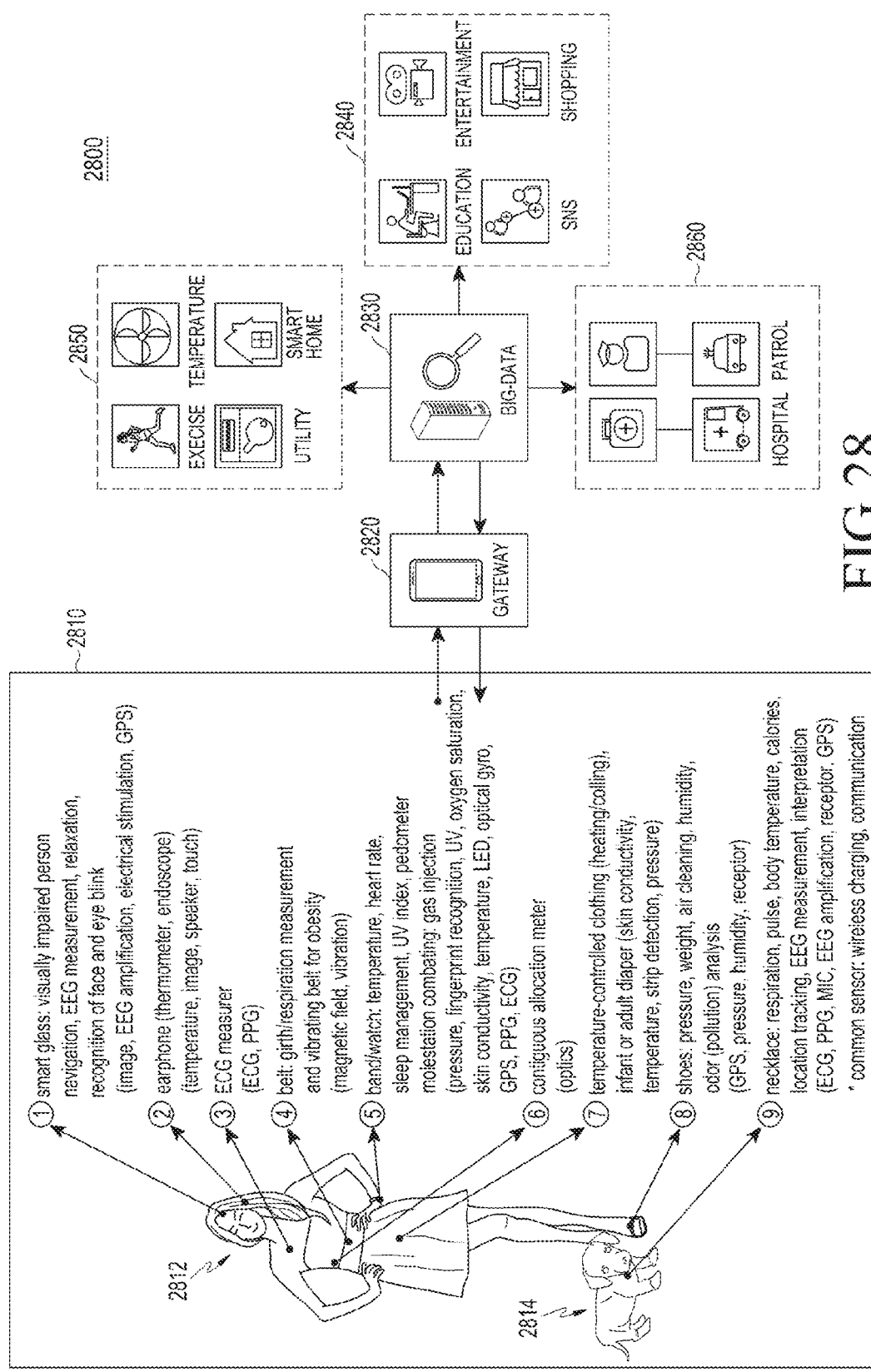
FIG. 28 illustrates examples of services that utilize an IoT device according to an embodiment of the present disclosure. Here, the IoT device will be assumed as a wearable IoT device.

FIG. 28 illustrates examples of services that utilize an IoT device according to an embodiment of the present disclosure. Here, the IoT device will be assumed as a wearable IoT device.

Referring to FIG. 28, the scenarios in which IoT devices are used may include a health service, a personal safety service, a social network service (SNS) service, an information service, a smart home service and the like. To this end, an IoT service system 2800 may include at least one IoT device 2810, a GW 2820, a server 2830 and at least one service provider 2840, 2850 or 2860.

The IoT device 2810 may be implemented by wearable IoT devices such as a smart glass, an earphone, an electro-cardiograph/photoplethysmograph (ECG/PPG) measurer, a belt, a band/watch, a blood glucose level tester, temperature-controlled clothing, shoes, a necklace and the like. The wearable IoT devices may include a sensor for sensing the status of a user 2812, the surroundings and/or the user's command. The IoT device 2810 may have a built-in battery or include a wireless charging function, for power supply.

The IoT device 2810 may include a wireless communication function for communication with the outside.

The GW 2820 may transmit the information collected by the sensor to the server 2830 over the communication network, or transmit the analysis information transmitted from the server 2830 to the IoT device. For example, the GW 2820 may be connected to the IoT device through a short-range wireless communication protocol, and a smart phone capable of connecting with the wireless communication network such as Wi-Fi, 3G or LTE may be used as the GW 2820. The GW 2820 may be connected to the server 2830 over the Internet or the wireless communication network.

The server 2830 may generate related service information by storing or analyzing the collected information, or provide the stored information and/or analyzed information to the service provider 2840, 2850 or 2860.

The service provider 2840, 2850 or 2860 may analyze the collected information and provide the analyzed information to the user 2812. Here, the service may refer to providing useful information, alarm and personal protection for the user 2812, or providing control information of the wearable IoT device 2810.

Among the service providers, the smart home service provider 2850 may authenticate the user information received from the user 2812, and control the IoT devices provided in the home of the user 2812 based on the value set in the server. For example, the smart home service provider 2850 may provide a smart home service for controlling heating/cooling-related IoT devices installed in the home of the user 2812, IoT devices related to energy resources such as gas, water and electricity, IoT devices related to indoor conditions such as lighting, humidity and air cleaning, and/or IoT devices related the exercise prescription determined in consideration of the daily activity of the user 2812.

The leisure service provider 2840 may provide a service related to the leisure activities of the user 2812. For example, the leisure service provider 2840 may recommend the food and shopping information, restaurants and the like by receiving information about the physical condition or location of the user 2812.

The health and safety service provider 2860 may provide an emergency medical/policing service based on the status information of the user 2812. In addition, the health and safety service provider 2860 may send an alarm to the user 2812, or deliver notes to the user 2812 based on information about the virus spread, and may also recommend the food and diet information that the user 2812 should pay attention for health.

The smart glass may be worn on the face of the user 2812. The smart glass may sense the surroundings of the user 2812, the status (or condition) of the user 2812 and a command of the user 2812 by using a dry eye sensor, an eye blink sensor, an image sensor, an electroencephalogram (EEG) sensor, a touch sensor, a voice recognition sensor, a GPS and the like. The information sensed by the smart glass may be transmitted to the server 2830.

The server 2830 may provide a valid service to the user 2812 based on the sensed information. For example, the server 2830 may send, to the user 2812, electrical stimulation information, based on which the abnormal brain waves can be treated, based on the received EEG information of the user 2812. In this case, the smart glass may treat the abnormal brain waves of the user 2812 or adjust the mood of the user 2812, by using the electrical stimulation information.

The earphone may be worn by the user 2812 in such a manner that the earphone is inserted into the ears or cover the ears. The earphone may sense the body information and command of the user 2812 by using a temperature sensor, an image sensor, a touch sensor and the like.

The ECG/PPG measurer may measure the ECG of the user 2812 using an ECG sensor. The belt may include a sensor for measuring the waist, respiration or obesity of the user 2812, and may also include a vibration function or an electrical stimulation function for treatment of the obesity or pain. The band/watch may include sensors related to user's body temperature, heart rate, sleep, pressure, UV, oxygen saturation, optics, gyro, GPS, PPG, ECG, skin conductivity, pedometer and the like. The band/watch may include a gas injection function or the like for molestation combating.

The blood glucose level tester may include a sensor for measuring the blood glucose level of the user 2812. The sensor for measuring a blood glucose level may be a non-invasive sensor. The measured blood glucose level may be transmitted to the server 2830 via the smart phone of the user 2812 or the GW 2820.

The temperature-controlled clothing may include a sensor for measuring the body temperature or ambient temperature of the user 2812. The temperature-controlled clothing may control the heating/cooling function by comparing the measured temperature with a predetermined temperature. The temperature-controlled clothing may be, for example, infant or adult diaper or underwear. The diaper or underwear may sense the status of the user 2812 by embedding therein a skin conductivity sensor, a temperature sensor, a strip detection sensor or a pressure sensor, and notify the replacement time of the diaper or underwear or run the heating/cooling function based on the sensing results. The diaper or underwear may embed therein thin hot wires or cooling pipes, for heating/cooling.

The shoes may include sensors for the weight of the user 2812, the pressure in each part of the sole, the air pollution in the shoes, humidity, odors, GPS and the like. The information collected by these sensors may be transmitted to the server 2830. The server 2830 may transmit, to the user 2812, the information such as an alarm for notifying the posture correction of the user 2812 and the cleaning or replacement of the shoes. An application installed in the smart phone may perform these operations on behalf of the server 2830.

The necklace may include a sensor for sensing the respiration, pulse, body temperature, exercise, calories burned, GPS, EEG, voice, ECG, PPG and the like of the user 2812. The information collected by the sensor may be analyzed in the IoT device by itself, or transmitted to the server 2830.

The service providers 2840, 2850 and 2860 may provide the related services to the user 2812 based on the user information provided through the server 2830. For example, upon sensing the voice of the dog through a necklace mounted around the neck of the dog, the service provider may provide a voice translation service based on the sensed information. The information provided by the voice translation service may be played by a speaker built in the necklace.

The foregoing embodiment has been described merely for some usage scenarios regarding health, smart home, leisure and the like. However, the proposed IoT service system 2800 may be used in a wide range of industry, without being limited thereto. For example, obviously, the IoT service system 2800 may be applied even to the services for E-commerce, logistics, building management and the like.

Multiple IoT devices for the proposed embodiment may share single subscriber identification information or network access information that replaces the subscriber identification information. For example, it can be assumed that a smart phone is equipped with a SIM card having subscriber identification information and a communication link is formed between the smart phone and various IoT devices shown in FIG. 28. The smart phone may share its subscriber identification information or network access information with the various IoT devices via the communication link. In this case, the various IoT devices may access the communication network based on the shared network access information, and exchange information with the sever 2830 over the communication network.

In order for the various IoT devices to access the communication network based on the shared network access information, scheduling for the use may be applied. By doing so, it is possible to prevent one subscriber from connecting multiple IoT devices to the communication network at the same time based on the same subscriber identification information.

Figure 29:
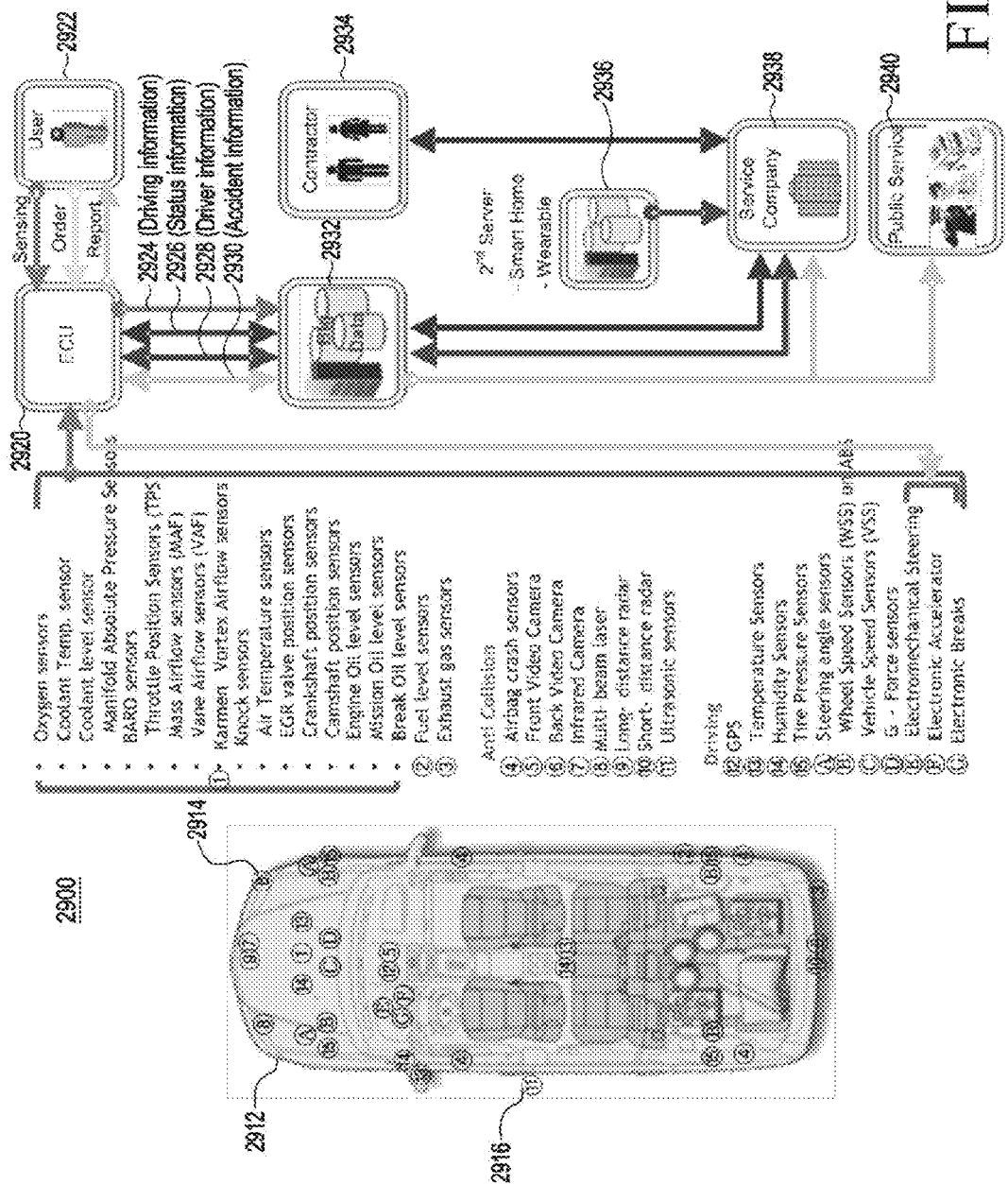
FIG. 29 illustrates examples of services that utilize IoT devices according to an embodiment of the present disclosure.

FIG. 29 illustrates examples of services that utilize IoT devices according to an embodiment of the present disclosure. It will be assumed herein that the IoT devices are IoT devices that can be applied to vehicles.

Referring to FIG. 29, the IoT device applied to vehicles may provide usage scenarios regarding vehicle management, collision avoidance, vehicle operation service and the like. To this end, an IoT service system 2900 may include one vehicle 2912 having multiple sensors. The IoT service system 2900 may include an engine control unit (ECU) 2920, a server 2932 and at least one service provider 2938 or 2940.

The vehicle 2912 may include multiple sensors such as engine parts sensors, collision avoidance sensors, vehicle operation sensors and the like. The engine parts sensors may include at least one of an oxygen sensor, a coolant temperature sensor, a coolant level sensor, a manifold absolute pressure sensor (or a MAP sensor), a BARO pressure sensor (BPS), a throttle position pressure sensor (TPS), a mass airflow sensors (MAF), a vane airflow sensor, a Karman vortex airflow sensor, a knock sensor, an air temperature sensor, an exhaust gas recirculation valve position sensor (EGR), a crankshaft position sensor (CKP), a camshaft position sensor, an engine oil level sensor, a mission oil level sensor, a break oil level sensor.

The BPS may measure the pressure of the air and provide the measured air pressure to the ECU 2920. The ECU 2920 may correct the fuel injection quantity, ignition timing and the like in consideration of the air pressure measured by the BPS. The MAP sensor may provide volume information to the ECU 2920 using the pressure of the intake manifold. The MAF sensor may provide information about the mass of the intake air to the ECU 2920. The ECU 2920 may determine the amount of fuel using the information about the mass of the intake air, which is provided by the MAF sensor.

The vane airflow sensor is a sensor that is provided by connecting the moving vane to a variable resistor in the engine air intake system. The Karman vortex airflow sensor is an airflow sensor of a hot wire type or a hot film type. The knock sensor, which is a sensor for detecting the knocking that occurs in the engine, may be a kind of an acceleration sensor. As for the exhaust gas recirculation valve position sensor (EGR), if the combustion gas has a lot of CO or HC, the oxygen sensor may provide a signal value to the ECU 2920. The ECU 2920 may deliver the signal value to an EGR solenoid valve so that the exhaust gas may be recycled.

The crankshaft position sensor (CKP) is a sensor for detecting the number of revolutions of the engine and the exact position the piston. The camshaft position sensor is a sensor for controlling the fuel injection timing and ignition timing.

The collision avoidance sensors may include at least one of an airbag crash sensor, a front video camera, a back video camera, an infrared camera, a multi beam laser, a long-distance radar, a short-distance radar, and a ultrasonic sensor.

The vehicle operation sensors may include at least one of GPS, a temperature sensor, a humidity sensor, a tire pressure sensor, a steering angle sensor, a wheel speed sensor (WSS or ABS), a vehicle speed sensor (VSS), a G-force sensor, an electromechanical steering system, an electronic accelerator, and an electronic breaks.

The ECU 2920 may collect vehicle driving information 2924 received from multiple sensors, and transmit the collected vehicle driving information 2924 to the server 2932 over the communication network. The ECU 2920 and the server 2932 may communicate (or exchange) vehicle status information 2926, driver information 2928 and/or accident history information 2930 with each other.

The service company 2938 may provide various services such as analysis information and alarms for the vehicle, referring to the vehicle status information 2926, the driver information 2928 and/or the accident history information 2930 stored in the server 2932. For example, the various services may include at least one of a road accident information service, a quick direction service, an accident handling notification service, an accident insurance premium calculation information service, a fault ratio decision information service, an emergency roadside service and the like. The service company 2938 may share the vehicle-related information stored in the server 2932 with a contract user 2934. The contract user 2934 may enter into a contract with the service company 2938 based on the shared information.

The contract user 2934 may be a vehicle manufacturer. In this case, the vehicle manufacturer may perform tasks such as vehicle recall, and establishment of a vehicle advertising plan, based on the information provided from the service company 2938. The service company 2938 may be a car-sharing/transportation company. In this case, the service company 2938 may provide vehicle information to the contract user 2934 and provide a vehicle so that the contract user 2934 may drive the vehicle, or may provide a boarding service so that the contract user 2934 may board the vehicle.

The service company 2938 may enable access control and service functions for the vehicle owned by a driver 2922 by receiving personal information of the driver 2922, which is stored in a second server 2936. For example, the service company 2938 may receive NFC tag information stored in a watch of the driver 2922, and compare the received NFC tag information with NFC tag information stored in the server to release the locking device of the vehicle. In addition, when the vehicle arrives at home of the driver 2922, the service company 2938 may transmit vehicle arrival information to the home of the driver 2922.

The public service provider 2940 may provide road accident information, roundabout information, disaster alert and the like to multiple drivers, referring to the accident history information 2930 stored in the serve 2932. The public service provider 2940 may develop a plan to build a secure infrastructure based on the collected vehicle driving information.

According to an embodiment of the present disclosure, multiple IoT devices mounted in the vehicle may share single subscriber identification information or network access information that replaces the subscriber identification information. For example, it can be assumed that a smart phone of the driver is equipped with a SIM card having subscriber identification information and a communication link is formed between the smart phone and various IoT devices mounted in the vehicle. The smart phone may share its subscriber identification information or network access information with the various IoT devices via the communication link. In this case, the various IoT devices may access the communication network based on the shared network access information, and exchange information with the sever 2932 over the communication network.

In order for the various IoT devices to access the communication network based on the shared network access information, scheduling for the use may be applied. By doing so, it is possible to prevent one subscriber from connecting multiple IoT devices to the communication network at the same time based on the same subscriber identification information.

Figure 30:
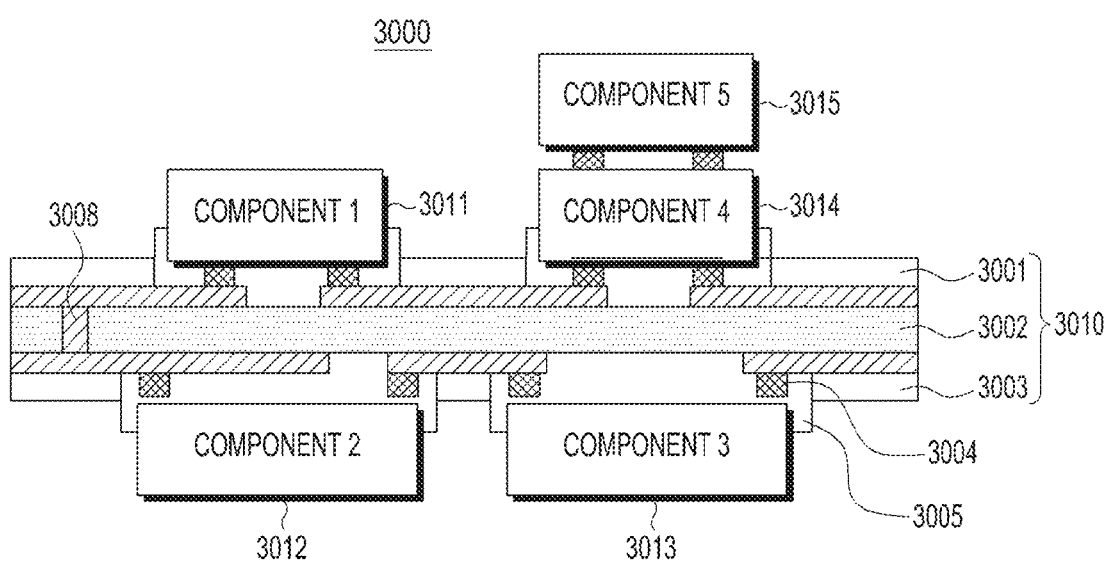
FIG. 30 schematically illustrates a package of an IoT device according to an embodiment of the present disclosure.

FIG. 30 schematically illustrates a package of an IoT device according to an embodiment of the present disclosure.

Referring to FIG. 30, a flexible package device 3000 may correspond to an IoT device 2500 or 2600 shown in FIG. 25 or 26. The flexible package device 3000 may include a flexible package substrate 3010 and first to fifth components 3011 to 3015.

The first component 3011 may include a secure module (e.g., 2620 in FIG. 26). In this case, the first component 3011 may be a system-in-package (SiP) on which a processor and a secure element are stacked. The fourth component 3014 and the fifth component 3015 may include an AP, a memory and/or a storage device. For example, the AP, the memory and/or the storage device that can be included in the fourth component 3014 and the fifth component 3015 may correspond to the AP 2610, the memory 2614 and/or the storage device 2612 shown in FIG. 26, respectively. The third component 3013 may include a sensor (e.g., 2632 and/or 2634 in FIG. 26).

At least one of the first to fifth components 3011 to 3015 may be any one of the communication interface 2626, the actuator 2628, the power supply 2620 or the passive element (not shown) shown in FIG. 26.

The flexible package substrate 3010 is a flexible printed circuit board that can easily be bent and can be employed in a wearable IT device and the like, and the flexible package substrate 3010 may be an organic substrate or a tape substrate. The flexible package substrate 3010 may include, for example, a core board 3002 having upper and lower surfaces and a resin layer 3001 that is formed on the upper and lower surfaces.

The resin layer 3001 may be formed in a multi-layer structure. Between the multi-layer structures may be interposed a signal layer, a ground layer or a power supply layer constituting a wiring pattern 3003. A separate wiring pattern may be formed on the resin layer 3001. In the drawing, fine patterns shown on the flexible package substrate 3010 may mean the wiring pattern 3003 or multiple passive elements (not shown).

A solder bump 3004 that is one of the means connecting the flexible package substrate 3010 and the components 3011 to 3015 may be added. An under ill material 3005 may be inserted around the solder bump 3004. The under ill material 3005 may protect the solder bump 3004 from the physical stress. The flexible package substrate 3010 and the components 3011 to 3015 may be connected by a thermal compression bonding method that uses the metallic materials, for example, Cu, Au and the like, instead of the solder bump 3004.

The components 3011 to 3015 may each be mounted through an external connection member and the like on the flexible package substrate 3010, but not limited thereto. In other words, more semiconductor chips may be mounted on the flexible package substrate 3010, and the semiconductor chips may be vertically stacked on each other using a suitable connection means in order to reduce the mounting area.

The foregoing is illustrative of embodiments and is not to be construed as limiting thereof. Although a few embodiments have been described, those skilled in the art will readily appreciate that many modifications are possible in the embodiments without materially departing from the scope of the inventive concept. Accordingly, all such modifications are intended to be included within the scope of the inventive concept as defined by the following claims.

What is claimed is:

1. A method enabling connection of at least one communication service over a public wireless network (PWN) by a slave device internally lacking access authorization credentials required to connect to the at least one communication service, the method comprising:
    connecting a first communication service in a first master device storing first access authorization credentials;
    generating first network status information (1NSI) in the first master device associated with the connecting of the first communication service;
    deriving first network accessing information (1NAI) in a first master device from the first access authorization credentials and the 1NSI;
    establishing a first communication link between the first master device and slave device;
    connecting a second communication service in a second master device storing second access authorization credentials;
    generating second network status information (2NSI) in the second master device associated with the connecting of the second communication service;
    deriving second network accessing information (2NAI) in the second master device from the second access authorization credentials and the 2NSI;
    establishing a second communication link between the second master device and the slave device;
    sending the 1NAI from the first master device to the slave device via the first communication link and storing the 1NAI in the slave device;
    sending the 2NAI from the second master device to the slave device via the second communication link and storing the 2NAI in the slave device;
    connecting the first communication service in the slave device using the 1NAI; and
    terminating the first communication service in the first master device.

2. The method of claim 1, further comprising:
    generating updated 1NAI in the slave device during connection of the first communication service in the slave device; and
    synchronizing the updated 1NAI between the slave device and the first master device via the first communication link.

3. The method of claim 2, further comprising:
    terminating the second communication service in the second master device;

receiving data in the slave device from the first communication service; and relaying the data from the slave device to at least two electronic devices including the first master device via the first communication link and the second master device via the second communication link, wherein the at least two electronic devices and the slave device support using a common communication service over the PWN.

4. The method of claim 1, further comprising:

connecting the second communication service in the slave device using the 2NAI;

terminating the second communication service in the second master device;

generating updated 2NAI in the slave device during connection of the second communication service in the slave device; and synchronizing the updated 2NAI between the slave device and the second master device via the second communication link.

5. The method of claim 1, wherein each one of the first communication link and the second communication link is one of a hard-wired communication link and a wireless communication link.

6. The method of claim 1, further comprising:

receiving data in the slave device from the first communication service; and relaying the data from the slave device to the first master device via the first communication link.

7. A method for accessing wireless network, comprising:

using subscriber identification information (SII) stored in a master device to connect a communication service over a public wireless network (PWN) in the master device;

establishing a communication link between the master device and a slave device;

generating network access information (NAI) associated with the communication service in the master device;

sending the NAI from the master device to the slave device via the communication link;

directly connecting the communication service in the slave device over the PWN using the NAI, after terminating the connection of the communication service in the master device, generating and storing updated NSI in the slave device in accordance with the connection of the communication service in the slave device;

sending the updated NSI to the master device via the communication link; and updating the NSI stored in the master device with the updated NSI.

8. The method of claim 7, further comprising:

terminating the connection of the communication service over the PWN in the master device.

9. The method of claim 8, wherein connecting the communication service in the master device generates corresponding network status information (NSI), and the NAI comprises the NSI, the method further comprising:

storing the NSI in the master device before terminating the connection of the communication service in the master device, and storing the NSI in the slave device when the NAI is sent from the master device to the slave device.

10. The method of claim 9, wherein the NSI comprises at least one of: PWN cell identification information, radio resource control (RRC) status information, non-access stratum (NAS) status information, and subscriber tracking area (TA) information.

11. The method of claim 8, wherein the master device is a portable electronic device, the communication service is a cellular voice/data service, and the connecting of the communication service in the master device comprises registering the master device with a mobility management entity (MME) of the PWN.

12. The method of claim 7, further comprising:

connecting a subscriber identity module (SIM) in the master device, reading the SII from the SIM, and storing the SII in the master device, wherein the SII comprises a plurality of SII components and the NAI comprises at least one of the plurality of SII components, or information derived from at least one of the plurality of SII components, and wherein the NAI comprises a temporary mobile subscriber identity (TMSI) provided to the master device from the PWN upon connecting the communication service in the master device.

13. The method of claim 7, wherein the SII comprises at least one of: a temporary mobile subscriber identity (TMSI), a globally unique temporary identifier (GUTI), an integrated circuit card identification (ICCID), an international mobile subscriber identity (IMSI), and a master key (K).

14. The method of claim 7, wherein the communication link comprises at least one of local area network (LAN), Wi-Fi, near field communication (NFC), radio frequency (RF), wired communication, a cellular link, Bluetooth (BT), and a global positioning system (GPS).

15. A method enabling connection of a communication service over a public wireless network (PWN) by a slave device internally lacking access authorization credentials required to connect the communication service, the method comprising:

connecting the communication service in a master device storing the access authorization credentials;

generating network status information (NSI) in the master device associated with the connecting of the communication service;

deriving network access information (NAI) in the master device from the access authorization credentials and the NSI;

establishing a communication link between the master device and slave device;

sending the NAI from the master device to the slave device via the communication link;

connecting the communication service in the slave device using the NAI;

terminating the communication service in the master device;

generating updated NAI in the slave device during connection of the communication service in the slave device; and synchronizing the updated NAI between the slave device and the master device via the communication link, wherein the synchronizing of the updated NAI occurs either periodically or in response to an event.

16. The method of claim 15, wherein the event is one selected from a group consisting of: an inter-cell handover, a change in cell identification information, a change in TMSI, a change in physical proximity between the master device and slave device, a change in a power condition for one of the master device and the slave device, and a change in communication link connectivity between the master device and the slave device.

17. The method of claim 15, further comprising:
receiving data in the slave device via the PWN during connection of the communication service by the slave device;
relaying the data from the slave device to the master device via the communication link; and
upon re-connecting the communication service in the master device over the PWN using the updated NAI, maintaining coherency of the data in the master device as relayed from the slave device.

18. The method of claim 15, further comprising:
receiving data in the slave device from the master device via the communication link; and
relaying the data from the slave device to another device via a communication link.

* * * * *